(12) United States Patent
Bennett et al.

(10) Patent No.: US 9,124,885 B2
(45) Date of Patent: Sep. 1, 2015

(54) OPERATING SYSTEM SUPPORTING MIXED 2D, STEREOSCOPIC 3D AND MULTI-VIEW 3D DISPLAYS

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 771 days.

(21) Appl. No.: 12/982,124

(22) Filed: Dec. 30, 2010

(65) Prior Publication Data

US 2011/0157169 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/04* (2006.01)
(Continued)

(52) U.S. Cl.
CPC ............ *H04N 13/0456* (2013.01); *G03B 35/24* (2013.01); *G06F 3/14* (2013.01); *G09G 3/003* (2013.01); *G09G 3/20* (2013.01); *H04N 13/00* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01);
(Continued)

(58) Field of Classification Search
CPC ......... G03H 1/2205; G03H 2210/20–2210/30; H04N 13/0018
USPC .......... 345/102, 419; 348/51, 55, 59, 564, 56; 349/15
See application file for complete search history.

(56) References Cited

U.S. PATENT DOCUMENTS 4,829,365 A 5/1989 Eichenlaub
5,493,427 A 2/1996 Nomura et al.
(Continued)

FOREIGN PATENT DOCUMENTS

EP 0833183 A1 4/1998
EP 1662808 A1 5/2006
(Continued)

OTHER PUBLICATIONS

European Search Report received for European Patent application No. 10015984.7, mailed on May 3, 2011, 3 pages.
(Continued)

*Primary Examiner* — Phu K Nguyen
(74) *Attorney, Agent, or Firm* — Fiala & Weaver P.L.L.C.

(57) ABSTRACT

Operating systems are described that interface applications and display screens capable of displaying two-dimensional and three-dimensional content. In one aspect, an operating system includes an application programming interface (API), a display driver interface, and a display driver. The API enables one or more applications to deliver requests that define a screen region and either a two-dimension indicator or a three-dimension indicator. The display driver interface passes configuration commands corresponding to the requests. The display driver is associated with a display screen. The display driver receives the configuration commands and responds by generating screen control signals to adjust the display screen to support the screen region.

20 Claims, 25 Drawing Sheets

(51) Int. Cl.
*H04N 13/00* (2006.01)
*G06F 3/14* (2006.01)
*G09G 3/00* (2006.01)
*G09G 3/20* (2006.01)
*H04N 21/235* (2011.01)
*H04N 21/41* (2011.01)
*H04N 21/435* (2011.01)
*G03B 35/24* (2006.01)
*H04S 7/00* (2006.01)
*G06F 3/0346* (2013.01)
*G02B 6/00* (2006.01)
*G09G 5/00* (2006.01)
*G09G 5/14* (2006.01)

(52) U.S. Cl.
CPC ........ *H04N13/0411* (2013.01); *H04N 13/0413* (2013.01); *H04N 13/0429* (2013.01); *H04N 13/0447* (2013.01); *H04N 13/0454* (2013.01); *H04N 13/0468* (2013.01); *H04N 13/0484* (2013.01); *H04N 13/0497* (2013.01); *H04N 21/235* (2013.01); *H04N 21/4122* (2013.01); *H04N 21/435* (2013.01); *H04S 7/303* (2013.01); *G02B 6/00* (2013.01); *G06F 3/0346* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

(56) References Cited

U.S. PATENT DOCUMENTS

| | | |
|---|---|---|
| 5,615,046 A | 3/1997 | Gilchrist |
| 5,855,425 A | 1/1999 | Hamagishi |
| 5,945,965 A | 8/1999 | Inoguchi et al. |
| 5,959,597 A | 9/1999 | Yamada et al. |
| 5,969,850 A | 10/1999 | Harrold et al. |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,285,368 B1 | 9/2001 | Sudo |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,091,471 B2 | 8/2006 | Wenstrand et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,389,214 B1 | 6/2008 | Yelich et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,692,859 B2 | 4/2010 | Redert et al. |
| 7,885,079 B2 | 2/2011 | Chen et al. |
| 7,911,442 B2 | 3/2011 | Wang et al. |
| 7,924,456 B1 | 4/2011 | Kahn et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,044,983 B2 | 10/2011 | Nonaka et al. |
| 8,049,710 B2 * | 11/2011 | Shestak et al. ............... 345/102 |
| 8,072,411 B2 | 12/2011 | Chen et al. |
| 8,139,024 B2 * | 3/2012 | Daiku ............... 345/102 |
| 8,154,686 B2 | 4/2012 | Mather et al. |
| 8,154,799 B2 | 4/2012 | Kim et al. |
| 8,174,564 B2 | 5/2012 | Kim et al. |
| 8,183,788 B2 | 5/2012 | Ma |
| 8,209,396 B1 | 6/2012 | Raman et al. |
| 8,233,034 B2 | 7/2012 | Sharp et al. |
| 8,284,119 B2 | 10/2012 | Kim et al. |
| 8,310,527 B2 | 11/2012 | Ko et al. |
| 8,334,933 B2 | 12/2012 | Tsukada et al. |
| 8,363,928 B1 | 1/2013 | Sharp |
| 8,368,745 B2 | 2/2013 | Nam et al. |
| 8,384,774 B2 | 2/2013 | Gallagher |
| 8,400,392 B2 | 3/2013 | Kimura et al. |
| 8,411,746 B2 | 4/2013 | Chen et al. |
| 8,438,601 B2 | 5/2013 | Putterman et al. |
| 8,441,430 B2 | 5/2013 | Lee |
| 8,466,869 B2 | 6/2013 | Kobayashi et al. |
| 8,482,512 B2 | 7/2013 | Adachi et al. |
| 8,487,863 B2 | 7/2013 | Park et al. |
| 8,525,942 B2 | 9/2013 | Robinson et al. |
| 8,587,642 B2 * | 11/2013 | Shestak et al. ............... 348/56 |
| 8,587,736 B2 | 11/2013 | Kang |
| 8,605,136 B2 * | 12/2013 | Yu et al. ............... 348/51 |
| 8,687,042 B2 | 4/2014 | Karaoguz et al. |
| 8,736,659 B2 | 5/2014 | Liu |
| 8,766,905 B2 | 7/2014 | Adachi |
| 8,788,676 B2 | 7/2014 | Alameh et al. |
| 8,823,782 B2 | 9/2014 | Karaoguz et al. |
| 8,854,531 B2 | 10/2014 | Karaoguz et al. |
| 8,885,026 B2 | 11/2014 | Endo |
| 8,922,545 B2 | 12/2014 | Bennett et al. |
| 8,964,013 B2 | 2/2015 | Bennett et al. |
| 8,988,506 B2 | 3/2015 | Bennett et al. |
| 2002/0010798 A1 | 1/2002 | Ben-Shaul et al. |
| 2002/0037037 A1 | 3/2002 | Van Der Schaar |
| 2002/0167862 A1 | 11/2002 | Tomasi et al. |
| 2002/0171666 A1 | 11/2002 | Endo et al. |
| 2002/0194604 A1 | 12/2002 | Sanchez et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0081302 A1 | 4/2004 | Kim et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2004/0255337 A1 | 12/2004 | Doyle et al. |
| 2005/0044489 A1 | 2/2005 | Yamagami et al. |
| 2005/0073472 A1 | 4/2005 | Kim et al. |
| 2005/0128353 A1 | 6/2005 | Young et al. |
| 2005/0185515 A1 | 8/2005 | Berstis et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0050785 A1 | 3/2006 | Watanabe et al. |
| 2006/0087556 A1 | 4/2006 | Era |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |
| 2007/0147827 A1 | 6/2007 | Sheynman et al. |

(56) References Cited

U.S. PATENT DOCUMENTS

| | | |
|---|---|---|
| 2007/0153122 A1 | 7/2007 | Ayite et al. |
| 2007/0153916 A1 | 7/2007 | Demircin et al. |
| 2007/0162392 A1 | 7/2007 | McEnroe et al. |
| 2007/0225994 A1 | 9/2007 | Moore |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0244266 A1 | 10/2009 | Brigham |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2015/0015668 A1 | 1/2015 | Bennett et al. |

FOREIGN PATENT DOCUMENTS

| | | |
|---|---|---|
| EP | 1816510 A1 | 8/2007 |
| EP | 1993294 A2 | 11/2008 |
| GB | 2454771 A | 5/2009 |
| TW | 200938878 A | 9/2009 |
| WO | 2005/045488 A1 | 5/2005 |
| WO | 2007/024118 A1 | 3/2007 |
| WO | 2008/126557 A1 | 10/2008 |
| WO | 2009031872 A2 | 3/2009 |
| WO | 2009/098622 A2 | 8/2009 |

OTHER PUBLICATIONS

European search Report received for European Patent application No. 10016055.5, mailed on Apr. 12, 2011, 3 pages.

Office Action received for European Patent Application No. 10016055.5, mailed on Apr. 5, 2013, 6 pages.

"How Browsers Work", retrieved from <http://taligarsiel.com/Projects/howbrowserswork1.htm> on Oct. 21, 2010, 54 pages.

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", retrieved on Aug. 16, 2012, 4 pages.

Peterka, "Dynallax: Dynamic Parallax Barrier Autostereoscopic Display", Ph.D. Dissertation, University of Illinois at Chicago, 2007, 134 pages.

(56) References Cited

OTHER PUBLICATIONS

Shan et al., "Principles and Evaluation of Autostereoscopic Photogrammetric Measurement", Photogrammetric Engineering and Remote Sensing, vol. 72, No. 4, Apr. 2006, pp. 365-372.

Yanagisawa et al., "A Focus Distance Controlled 3DTV", SPIE, vol. 3012, Stereoscopic Displays and Virtual Reality Systems IV, May 15, 1997, pp. 256-261.

Yanaka, "Stereoscopic Display Technique for Web3D Images", SIGGRAPH 2009, New Orleans, Louisiana, Aug. 3-7, 2009, 1 page.

Fono, et al.,"EyeWindows: Evaluation of Eye-Controlled Zooming Windows for Focus Selection",CHI 2005, Papers: Eyes on Interaction, Portland, Oregon, Apr. 2-7, 2005, pp. 151-160.

Kumar et al.,"Eye Point: Practical Pointing and Selection Using Gaze and Keyboard",CHI 2007, Apr. 28-May 3, 2007,10 pages.

"Displaying Stereoscopic 3D (S3D) with Intel HD Graphics Processors for Software Developers", Intel, Aug. 2011, pp. 1-10.

Liao, et al.,"The Design and Application of High-Resolution 3D Stereoscopic graphics Display on PC", Purdue University School of Science, 2000, 7 pages.

Office Action received for Chinese Patent Application No. 201010619649.3, mailed on Oct. 11, 2014, 5 pages (Official Copy only).

Office Action received for Chinese Patent Application No. 201010619646.X, mailed on Mar. 5, 2014, 4 pages.

Office Action received for Chinese Patent Application No. 201010619649.3, mailed on Mar. 31, 2014, 7 pages.

Office Action received for Taiwan Patent Application No. 099147124, mailed on Mar. 31, 2014, 8 pages.

Ko et al., "Facial Feature Tracking and Head Orientation-Based Gaze Tracking", Electronics and Telecommunications Research Institute (ETRI), 2005, 4 pages.

Ruddarraju et al., "Perceptual User Interfaces using Vision-Based Eye Tracking", In Proceedings of the 5th International Conference on Multimodal Interfaces (ICMI'03), Nov. 5-7, 2013, 7 pages.

\* cited by examiner

800

802
receive from a first application a first command directing display of the two-dimensional content within a first region of the screen 804
respond to the first command by sending a first control signal that places the screen in a two-dimensional mode within the first region 806
receive from a second application a second command directing display of the three-dimensional content within a second region of the screen 808
respond to the second command by sending a second control signal that places the screen in a three-dimensional mode within the second region

FIG. 8

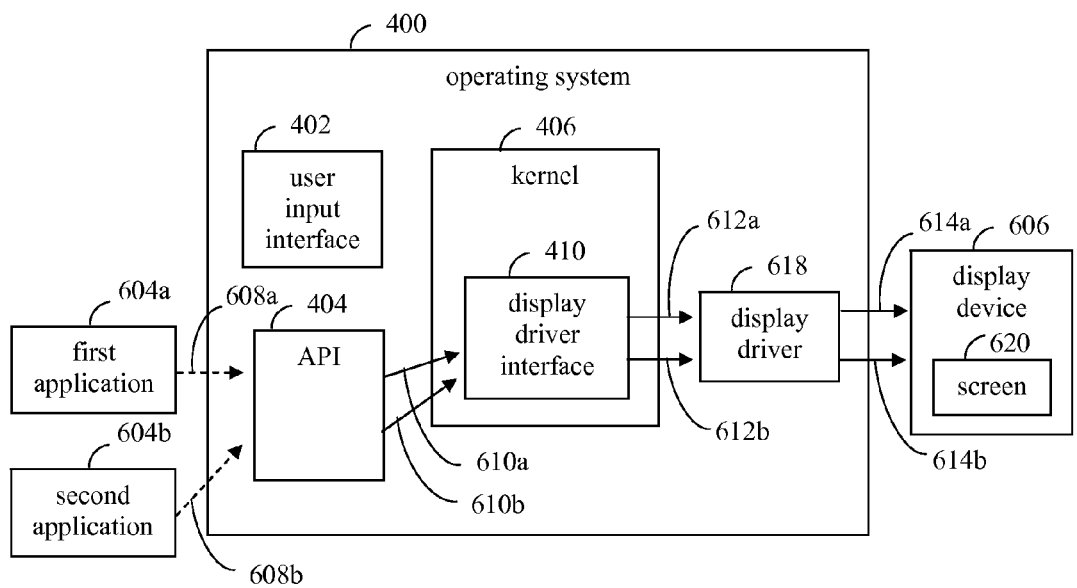

FIG. 9

OPERATING SYSTEM SUPPORTING MIXED 2D, STEREOSCOPIC 3D AND MULTI-VIEW 3D DISPLAYS

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also related to the following U.S. Patent Applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/845,461, titled "Display Supporting Multiple Simultaneous 3D Views," filed Jul. 28, 2010;

U.S. patent application Ser. No. 12/774,307, titled "Display with Elastic Light Manipulator," filed May 5, 2010;

U.S. patent application Ser. No. 12/982,020, titled "Backlighting Array Supporting Adaptable Parallax Barrier," filed on same date herewith;

U.S. patent application Ser. No. 12/982,140, titled "Internet Browser And Associated Content Definition Supporting Mixed Two And Three Dimensional Displays," filed on same date herewith;

U.S. patent application Ser. No. 12/982,173, titled "Application Programming Interface Supporting Mixed Two And Three Dimensional Displays," filed on same date herewith; and U.S. patent application Ser. No. 12/982,156, titled "Programming Architecture Supporting Mixed Two And Three Dimensional Displays," filed on same date herewith.

BACKGROUND OF THE INVENTION

1. Field of the Invention

The present invention relates to operating systems associated with three-dimensional image displays.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different depth resolutions, being configured for three-dimensional image viewing only, being switchable between two-dimensional image viewing and three-dimensional image viewing, and further capabilities and attributes. Furthermore, different types of applications may be configured to provide and/or interact with the displays to provide either two-dimensional or three-dimensional image content. However, each application may not be directly compatible with each type of display device.

BRIEF SUMMARY OF THE INVENTION

Methods, systems, and apparatuses are described for an operating system that interfaces users and applications with display devices that have three-dimensional image generating capability, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8 shows a flowchart providing a process for interfacing applications with a display device through an operating system, according to an exemplary embodiment.

FIG. 9 shows a block diagram of two applications interfaced with a display device by an operating system, according to an exemplary embodiment.

FIGS. 10, 11, 12A, and 12B show examples of a display screen displaying content in various screen regions, according to embodiments.

Figure 13:
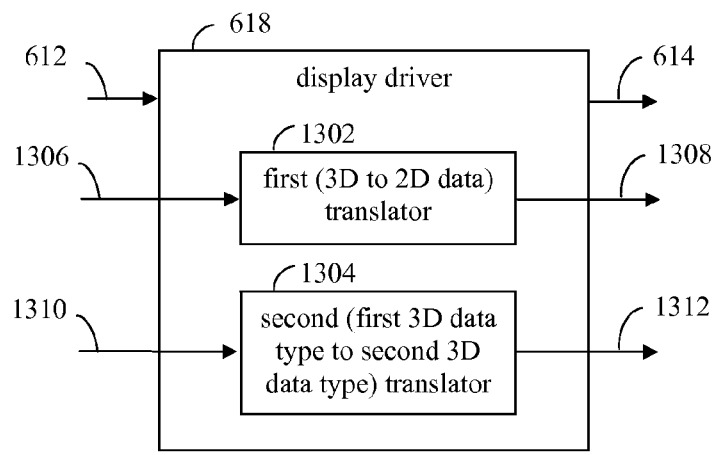

FIG. 13 shows a block diagram of a display driver, according to an exemplary embodiment.

Figure 14:
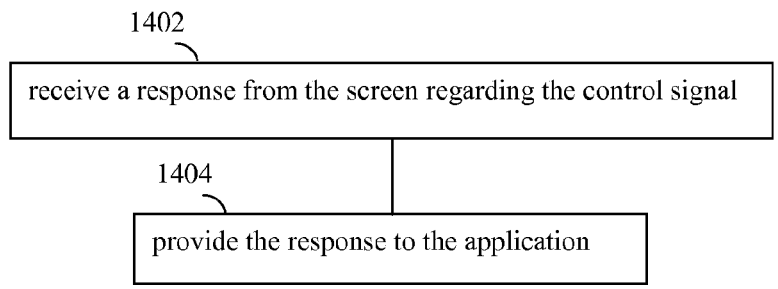

FIG. 14 shows a flowchart providing a process for interfacing responses through an operating system, according to an exemplary embodiment.

Figure 15:
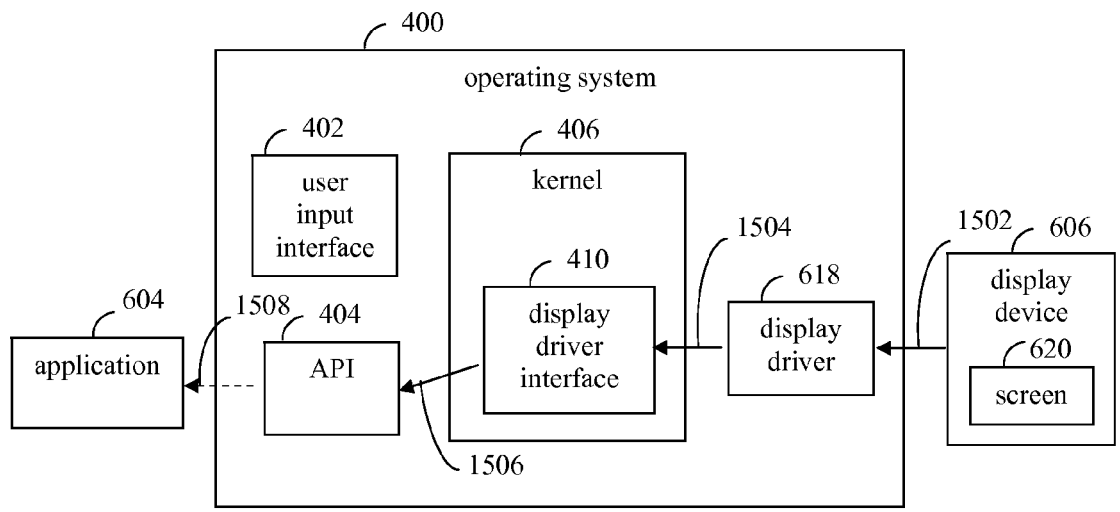

FIG. 15 shows a block diagram of an application interfaced with a display device by an operating system, according to an exemplary embodiment.

Figure 16:
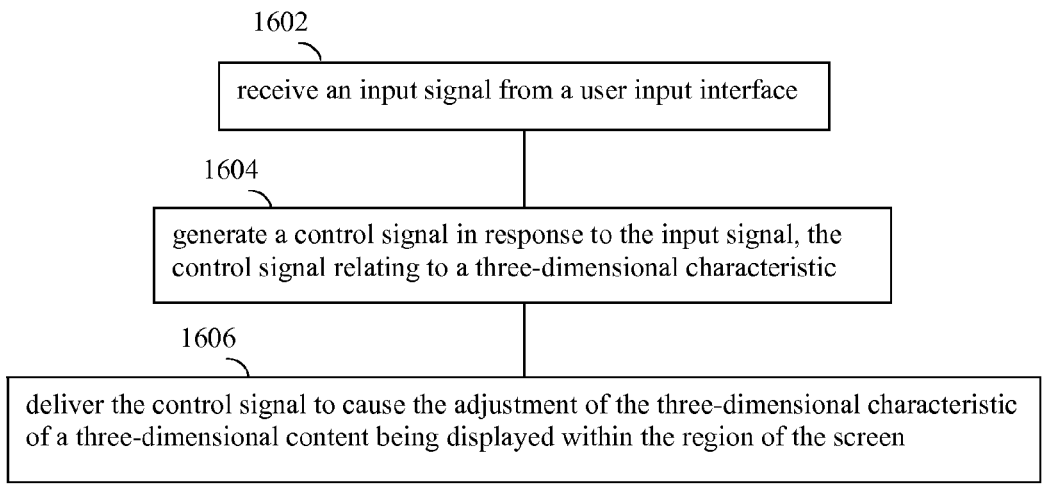

FIG. 16 shows a flowchart providing a process for interfacing a user with a display device, according to an exemplary embodiment.

Figure 17:
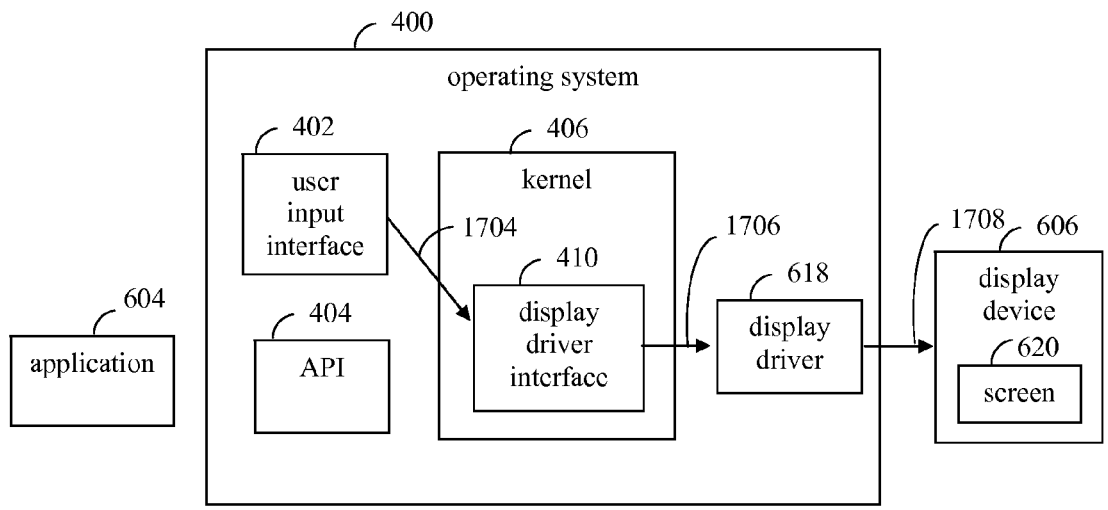

FIG. 17 shows a block diagram of a user interfaced with a display device by an operating system, according to an exemplary embodiment.

Figure 18:
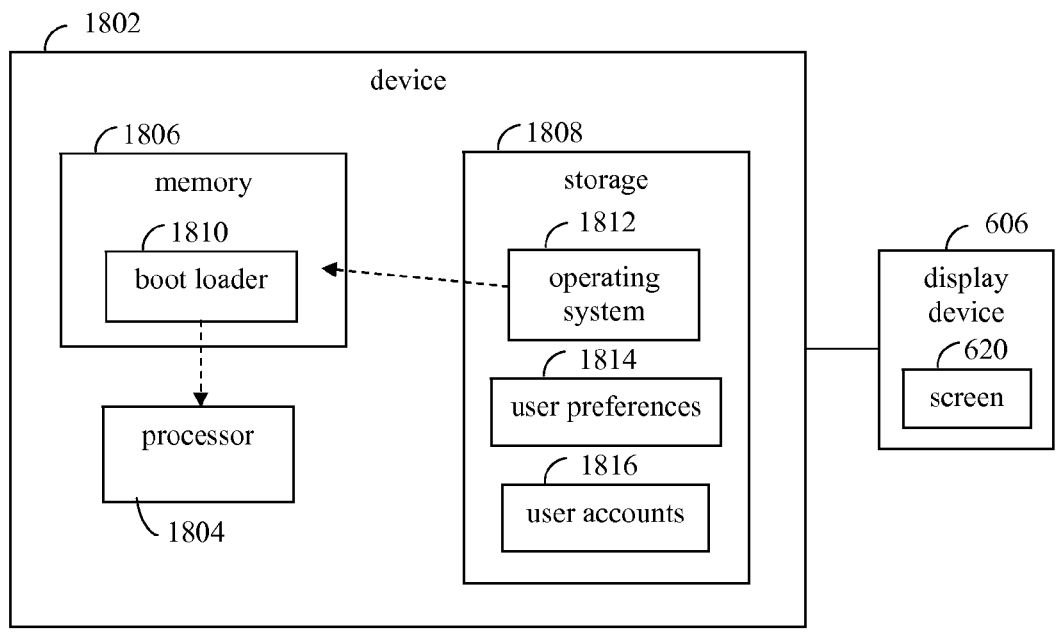

FIG. 18 shows a block diagram of an electronic device coupled to a display device, according to an exemplary embodiment.

Figure 19:
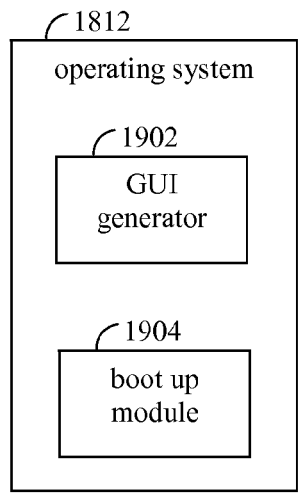

FIG. 19 shows a block diagram of an operating system, according to an exemplary embodiment.

Figure 20:
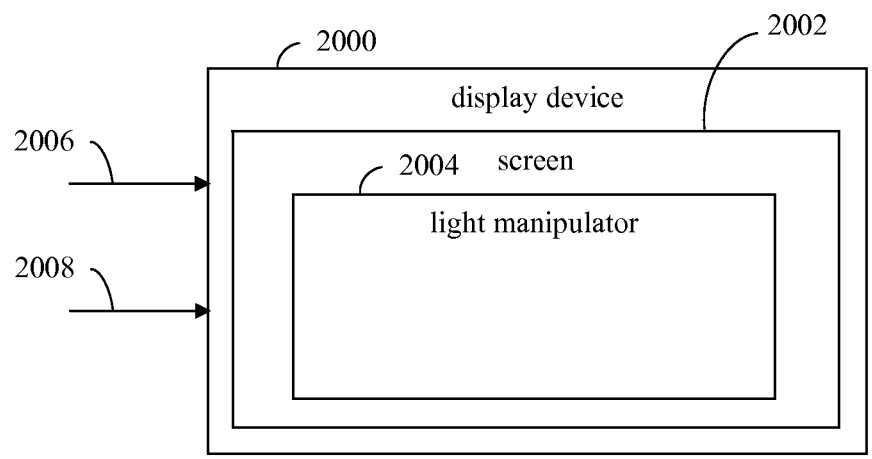

FIG. 20 shows a block diagram of a display device, according to an exemplary embodiment.

Figure 21:
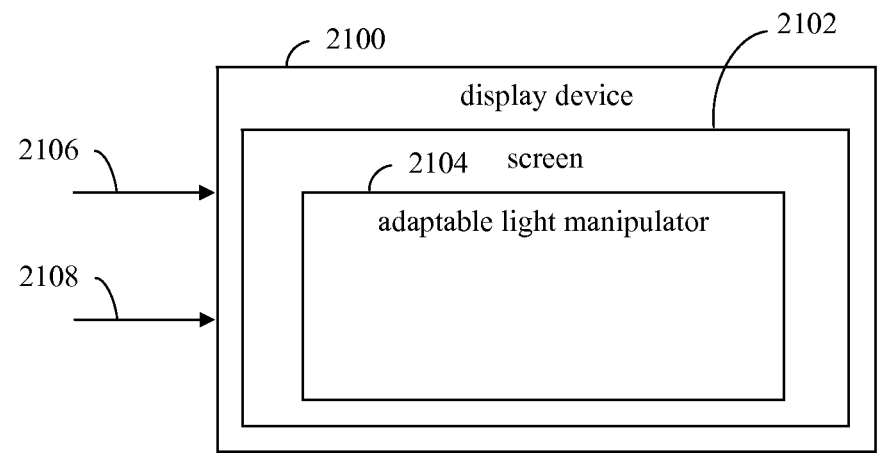

FIG. 21 shows a block diagram of a display device that is adaptable, according to an exemplary embodiment.

Figure 22:
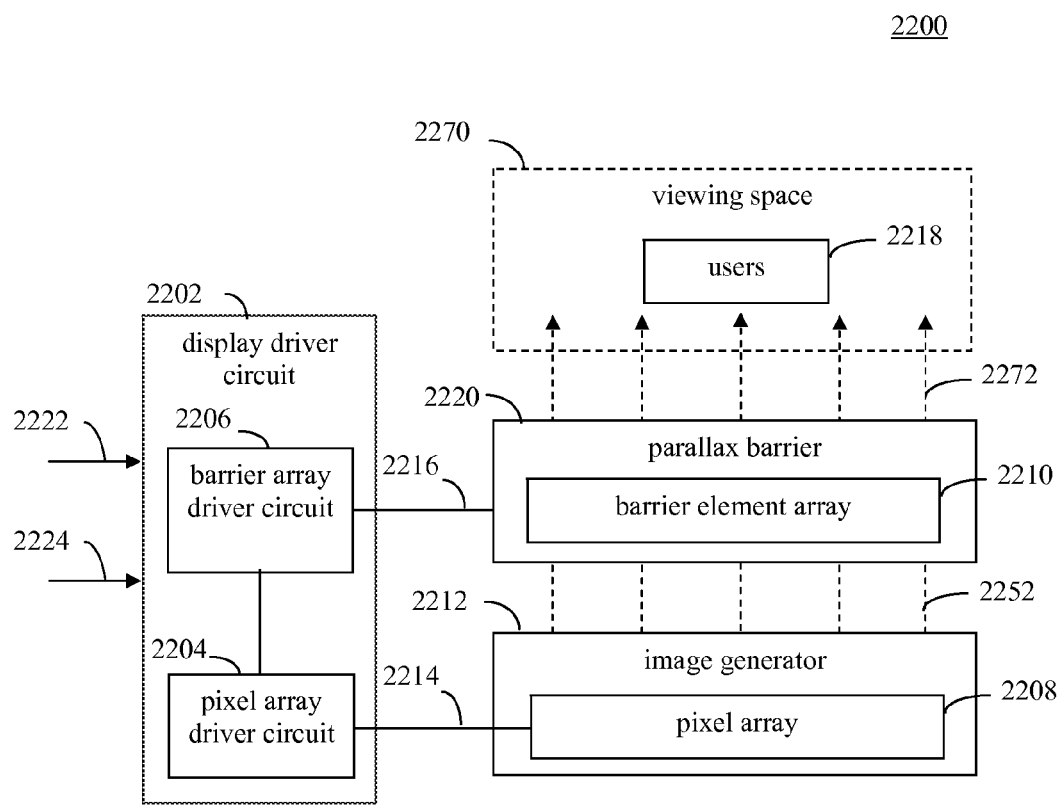
Figure 23:
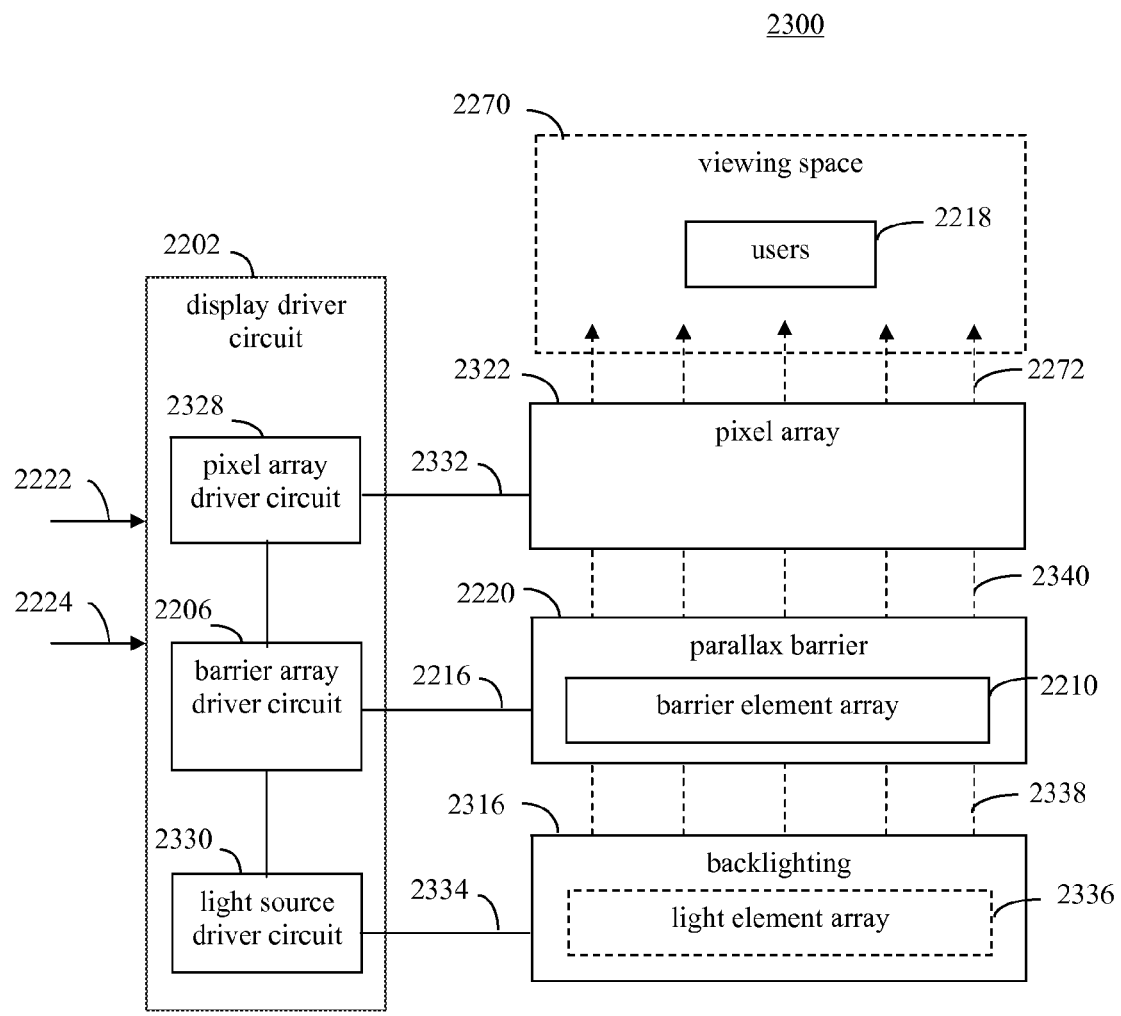

FIGS. 22 and 23 show block diagrams of examples of the display device of FIG. 21, according to embodiments.

Figure 24:
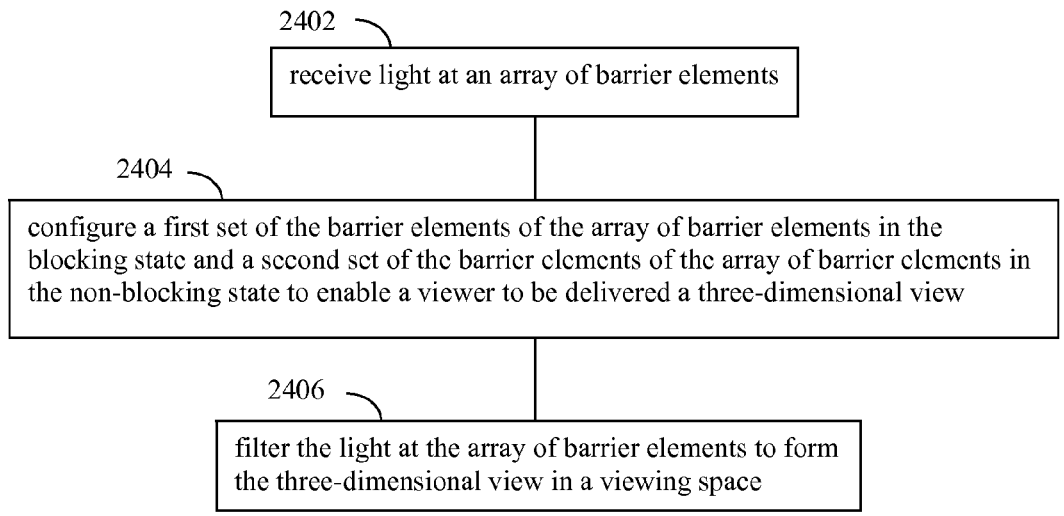

FIG. 24 shows a flowchart for generating three-dimensional images, according to an exemplary embodiment.

Figure 25:
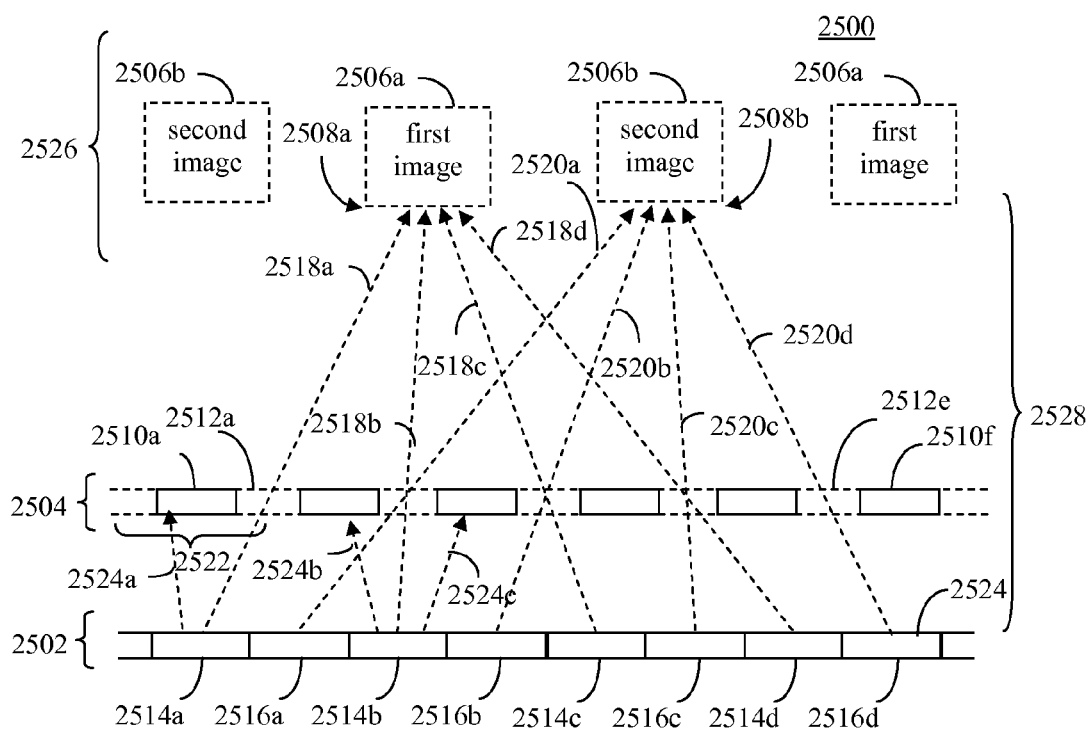

FIG. 25 shows a cross-sectional view of an example of a display system, according to an embodiment.

Figure 26:
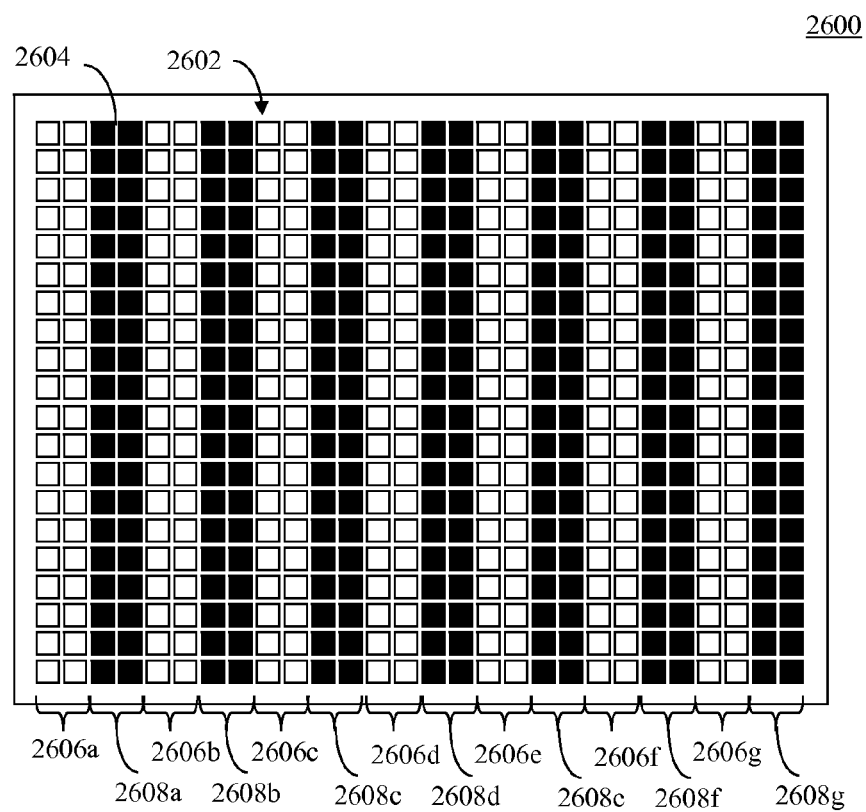
Figure 27:
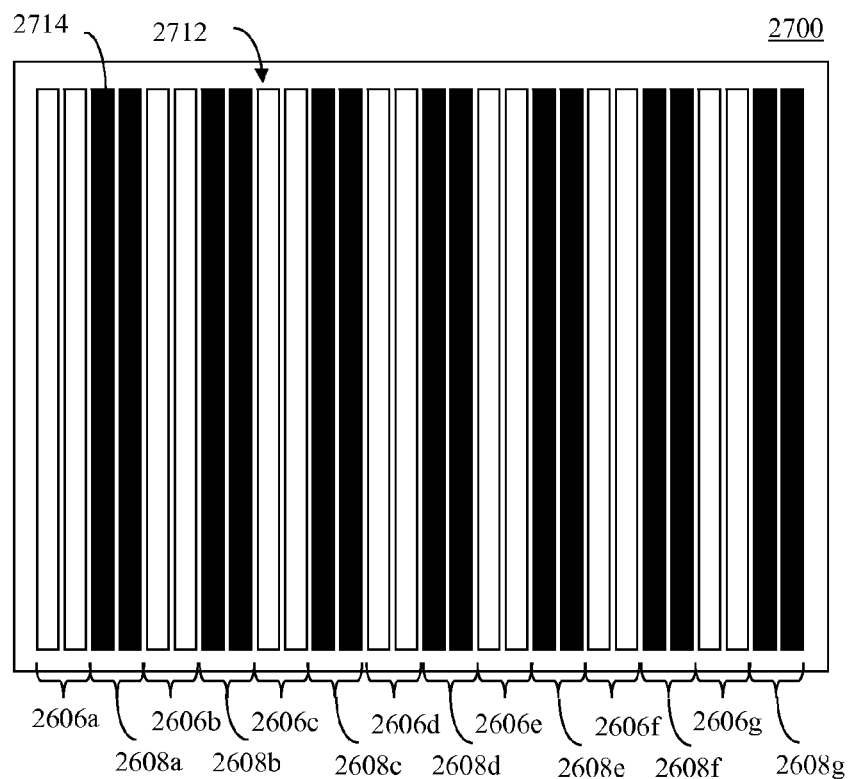

FIGS. 26 and 27 shows view of example parallax barriers with non-blocking slits, according to embodiments.

Figure 28:
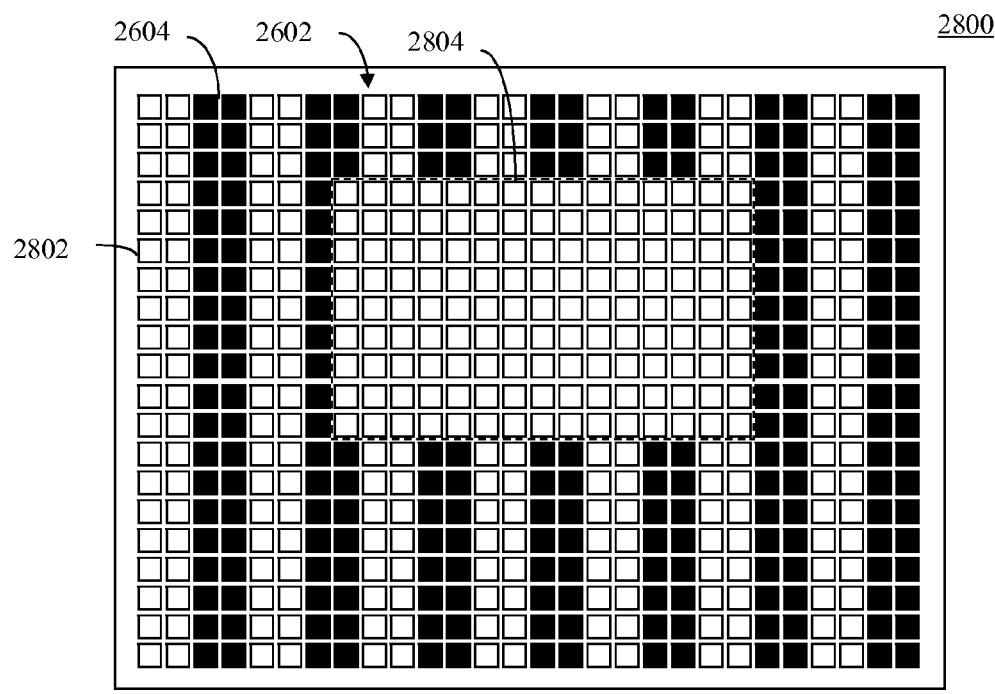

FIG. 28 shows a view of the barrier element array of FIG. 26 configured to enable the simultaneous display of two-dimensional and three-dimensional images of various sizes and shapes, according to an exemplary embodiment.

Figure 29:
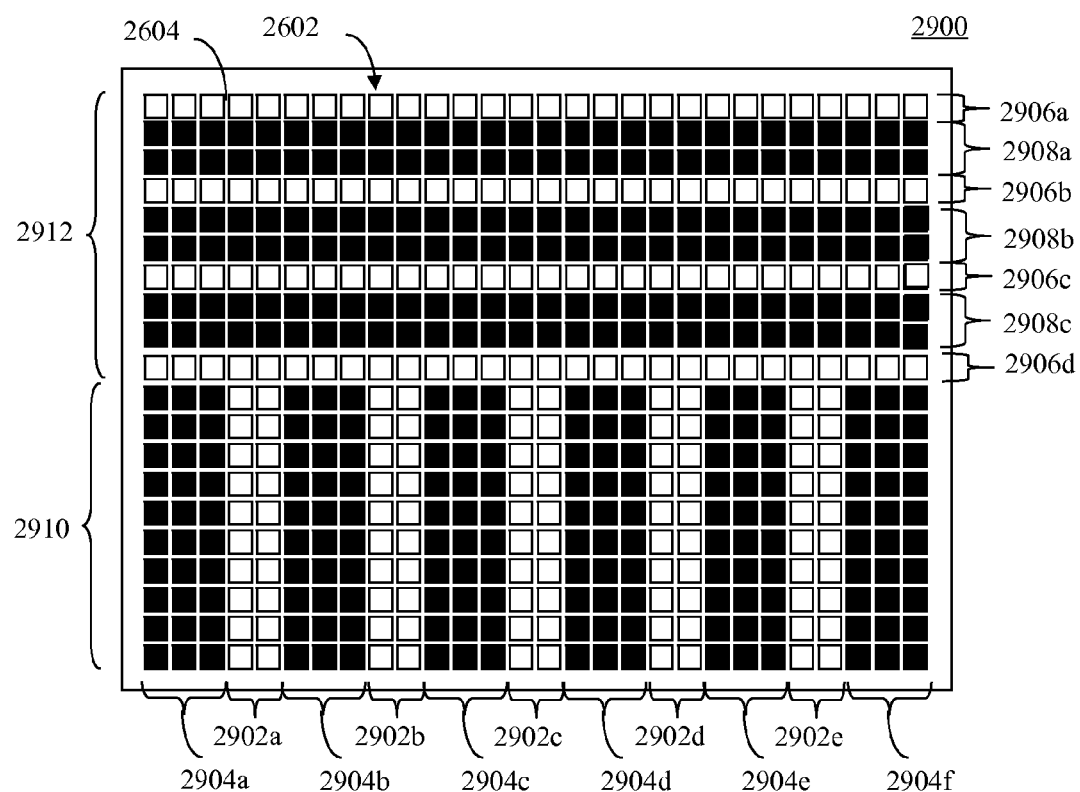

FIG. 29 shows a view of the parallax barrier of FIG. 26 with differently oriented non-blocking slits, according to an exemplary embodiment.

Figure 30:
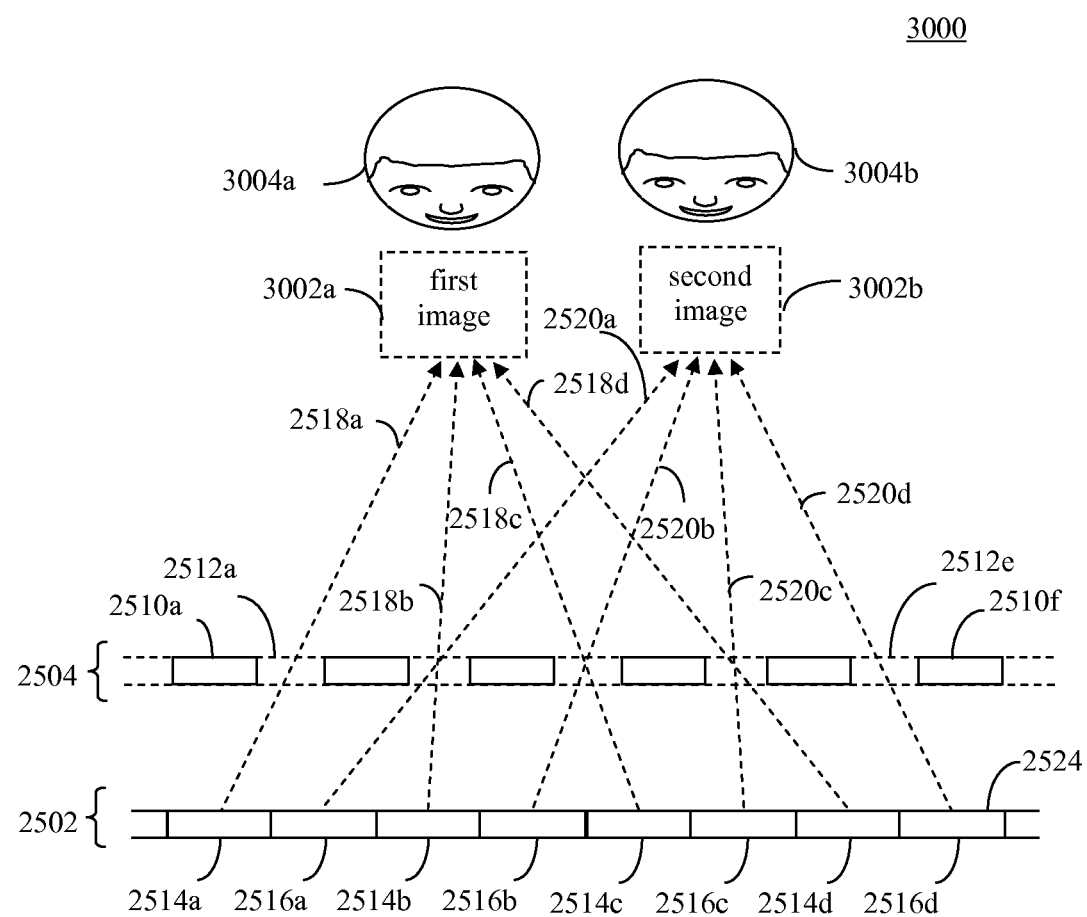

FIG. 30 shows a display system providing two two-dimensional images that are correspondingly viewable by a first viewer and a second viewer, according to an exemplary embodiment.

Figure 31:
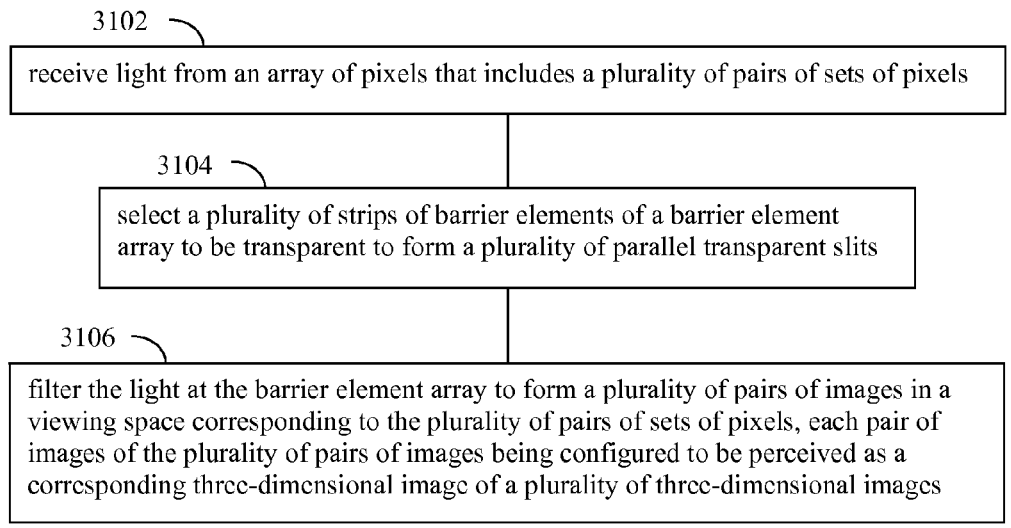

FIG. 31 shows a flowchart for generating multiple three-dimensional images, according to an exemplary embodiment.

Figure 32:
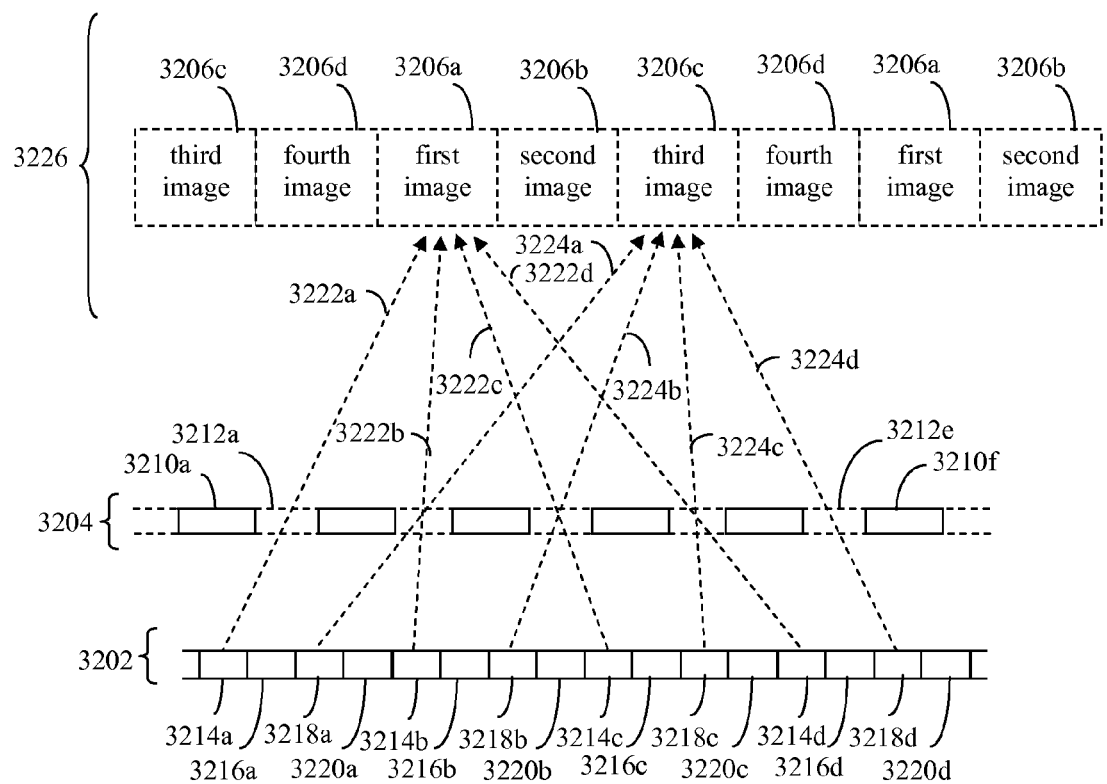

FIG. 32 shows a cross-sectional view of an example of the display system of FIG. 22, according to an embodiment.

Figure 33:
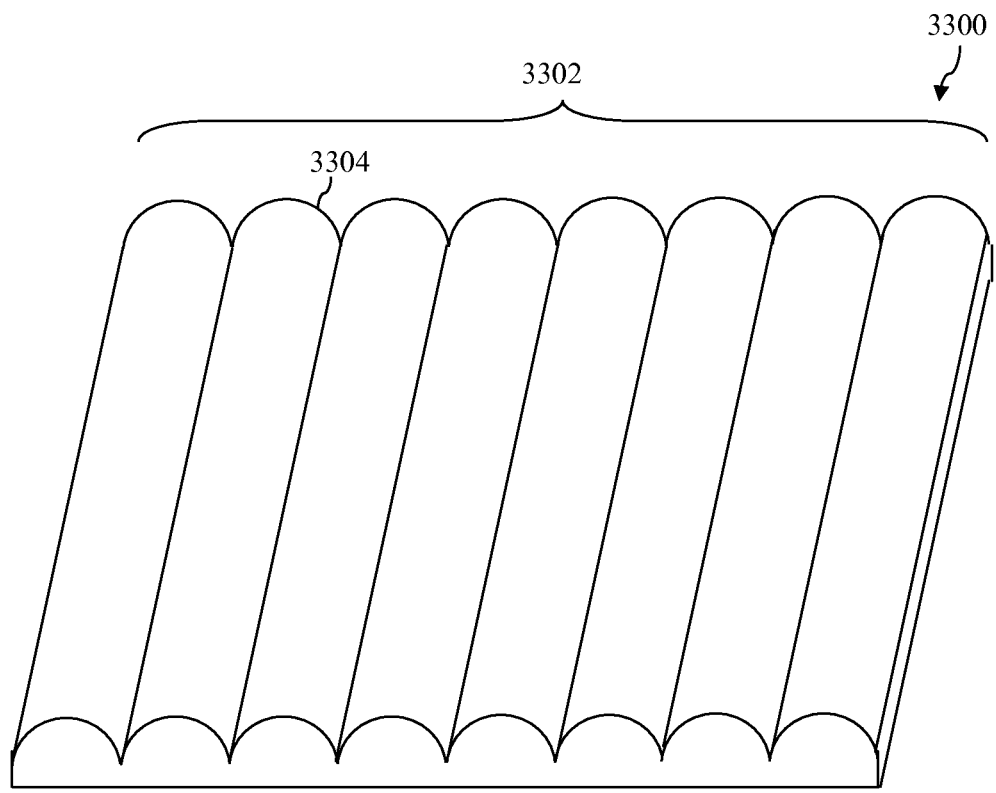
Figure 34:
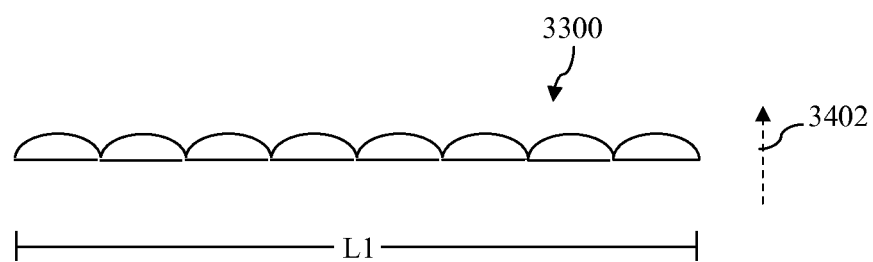

FIGS. 33 and 34 show views of a lenticular lens, according to an exemplary embodiment.

Figure 35:
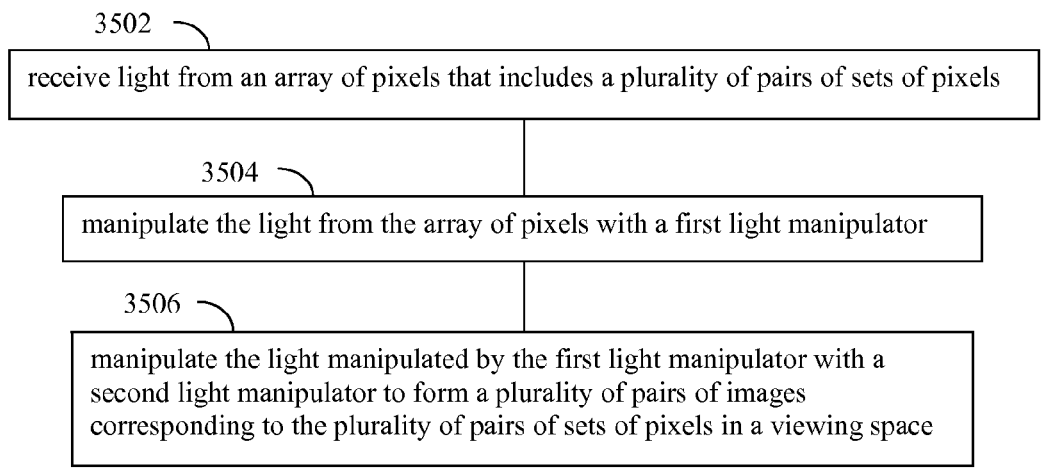

FIG. 35 shows a flowchart for generating multiple three-dimensional images using multiple light manipulator layers, according to an exemplary embodiment.

Figure 36:
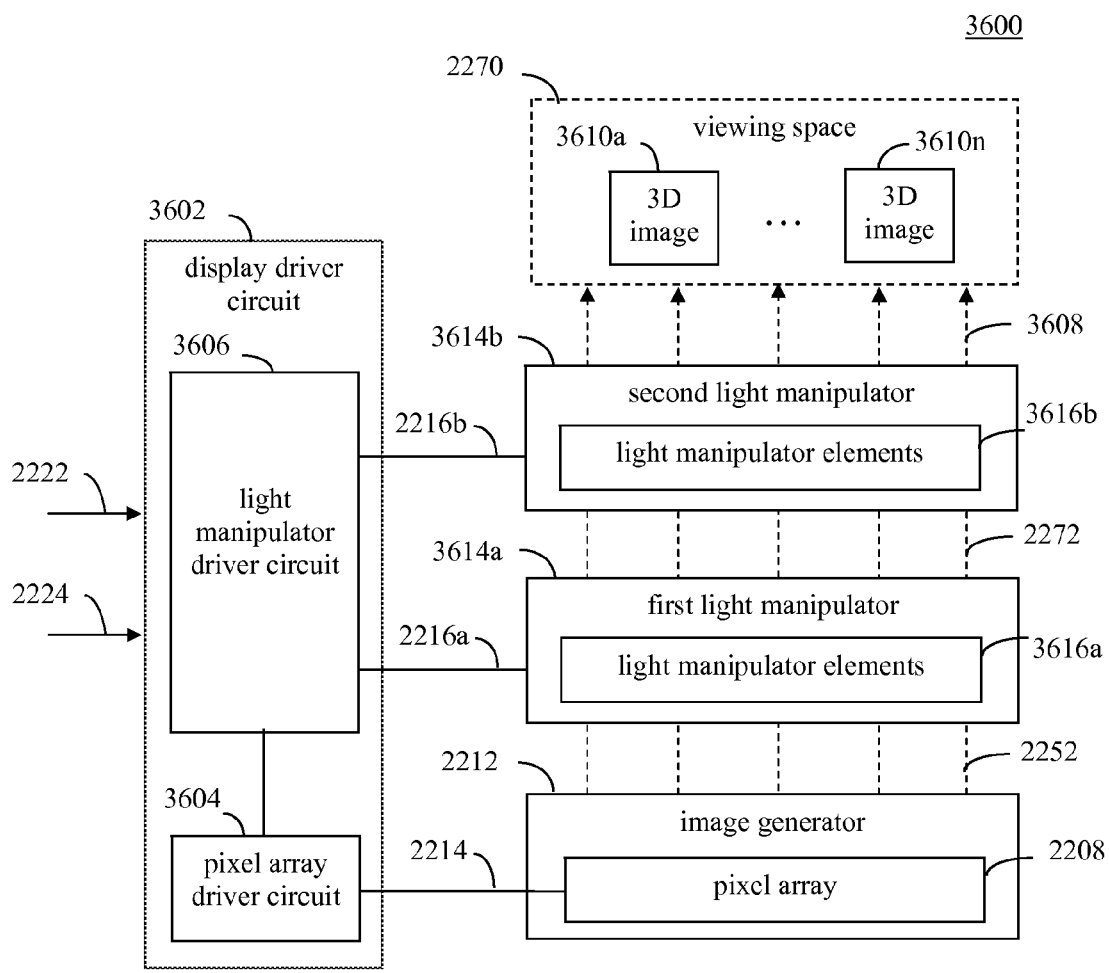

FIG. 36 shows a block diagram of a display system, according to an exemplary embodiment.

Figure 37:
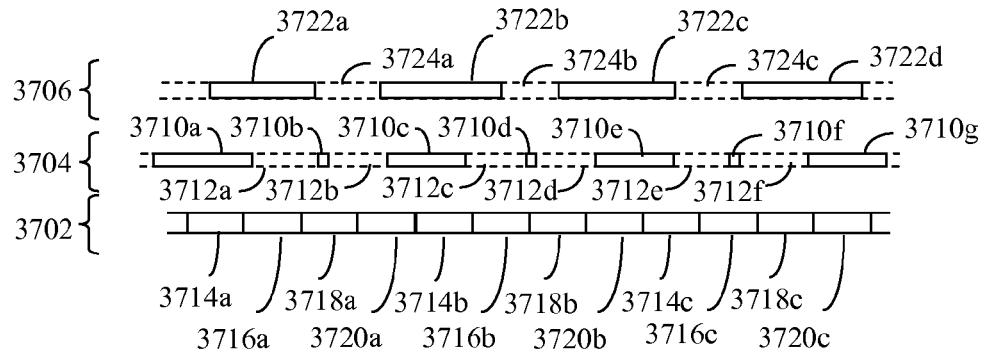
Figure 38:
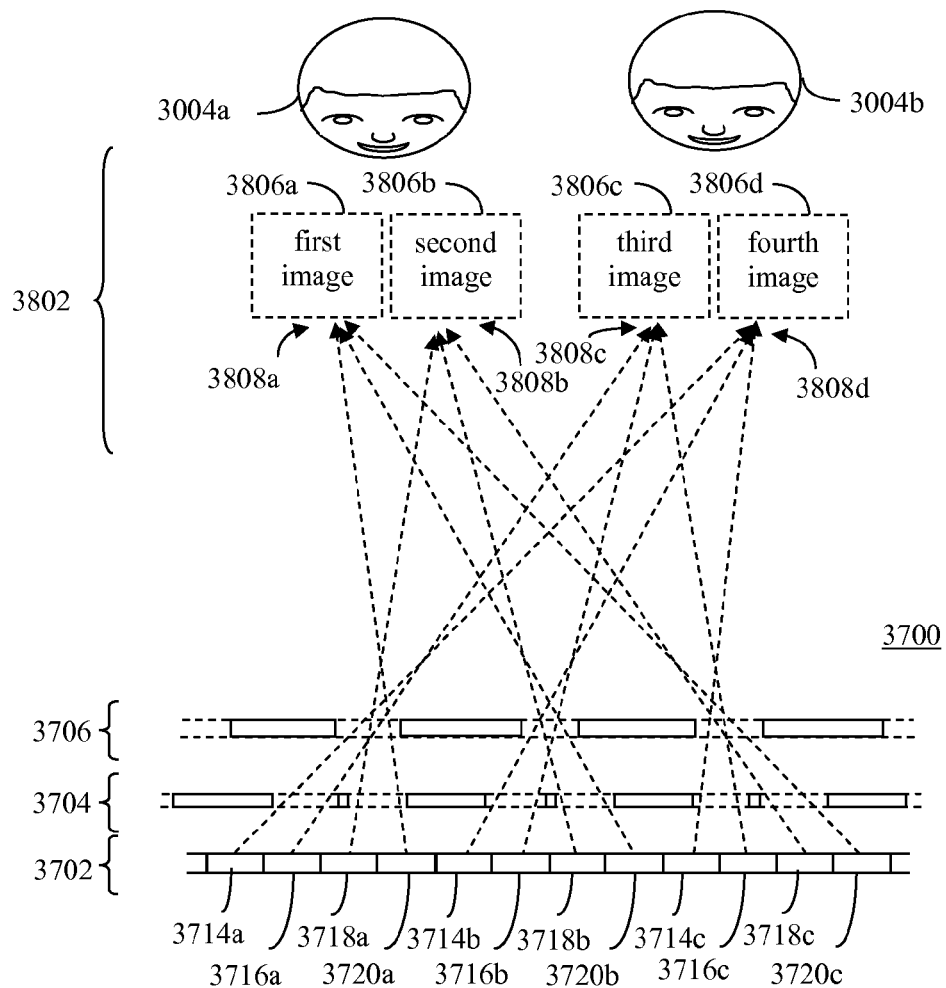

FIGS. 37 and 38 show cross-sectional views of a display system, according to an exemplary embodiment.

Figure 39:
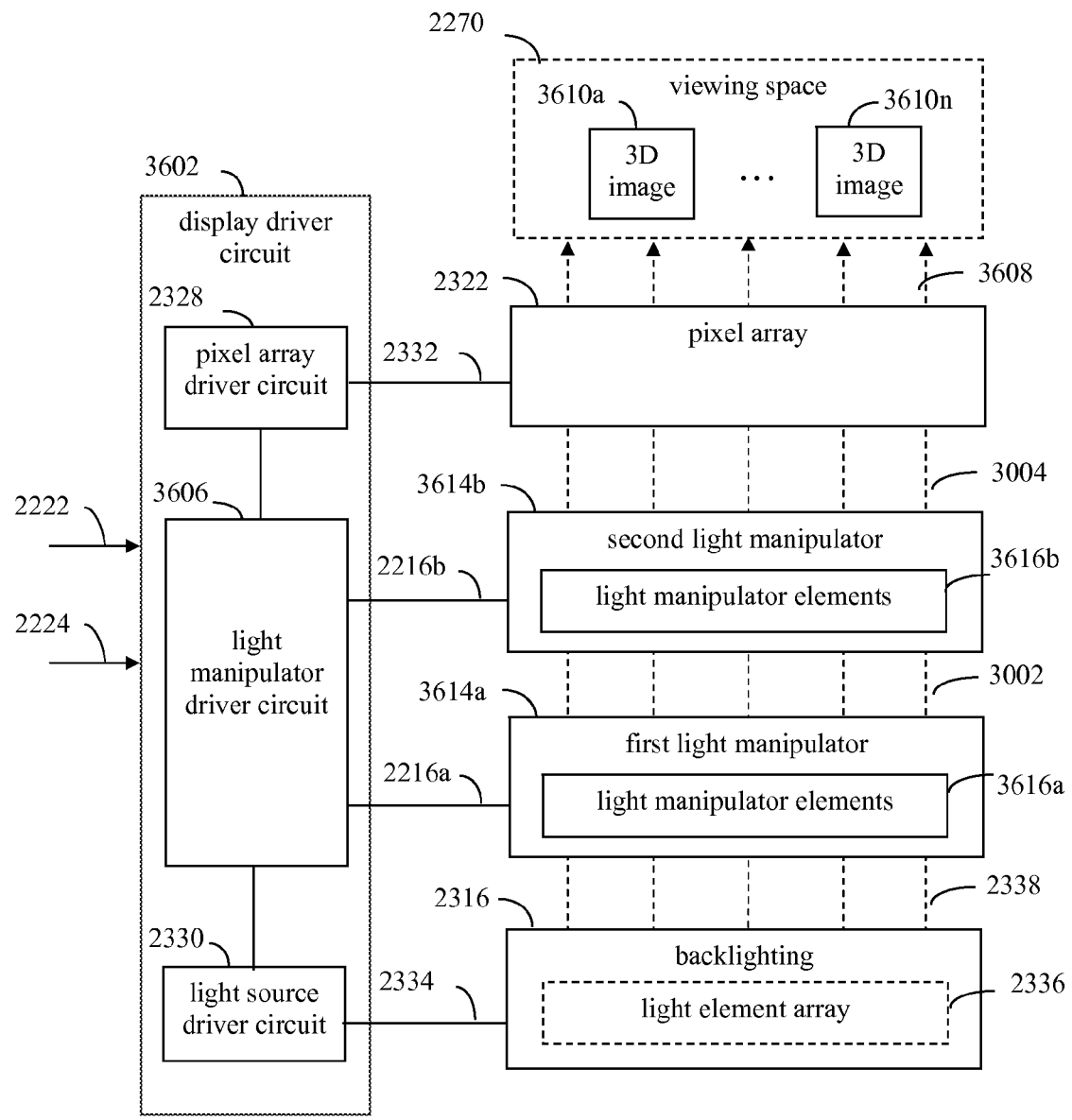

FIG. 39 shows a block diagram of a display system, according to an exemplary embodiment.

Figure 40:
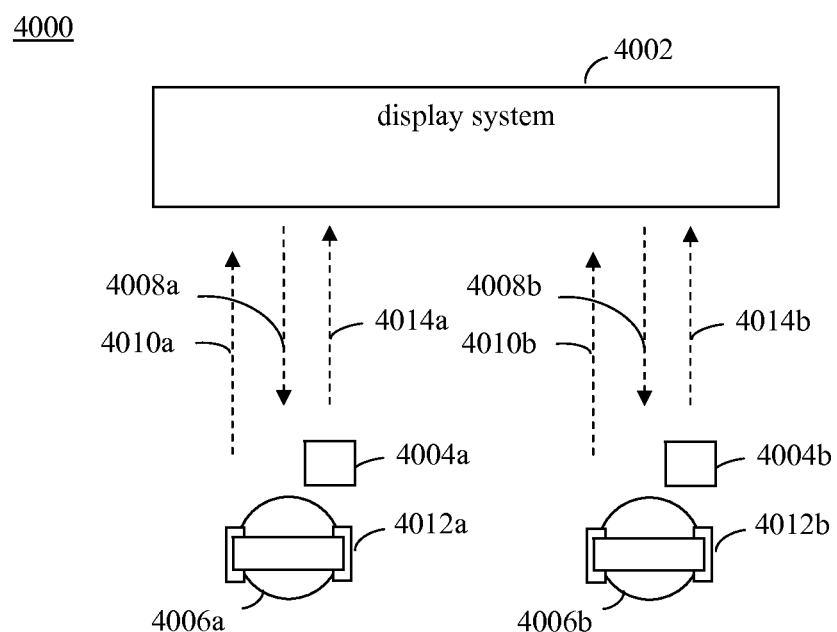

FIG. 40 shows a block diagram of a display environment, according to an exemplary embodiment.

Figure 41:
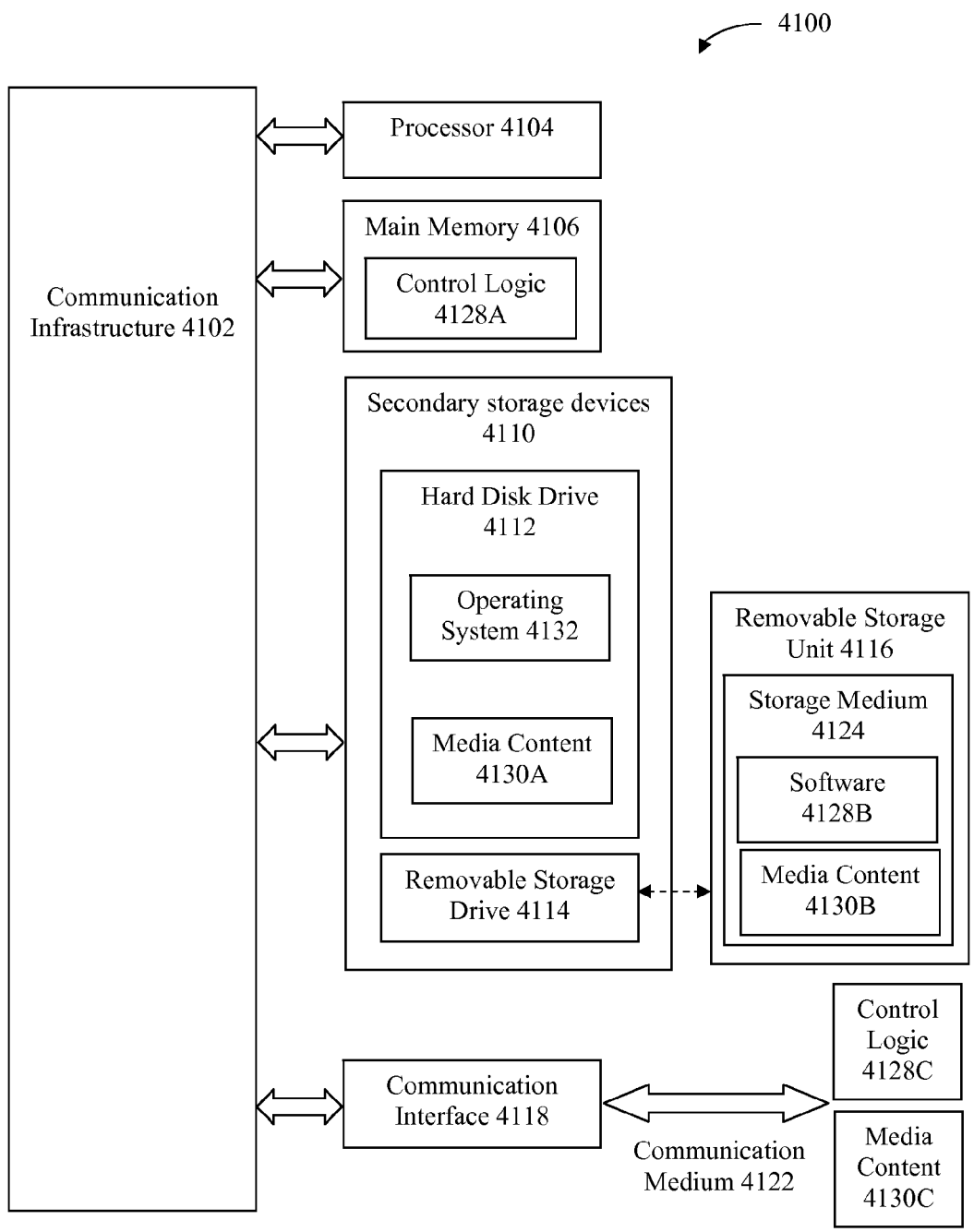

FIG. 41 shows a block diagram of an example electronic device, according to an embodiment.

Figure 42:
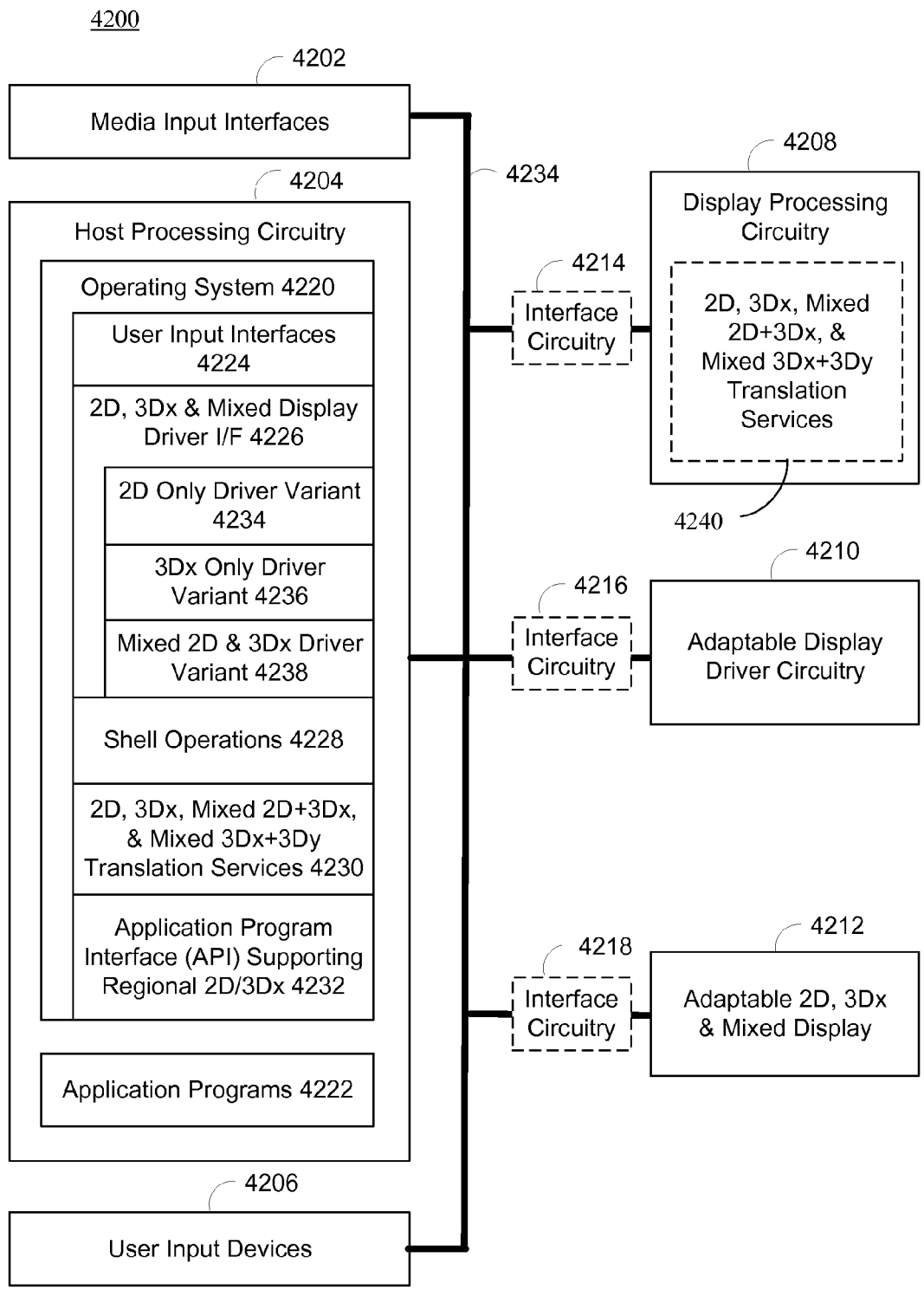

FIG. 42 shows a block diagram of a display system that supports mixed 2D, stereoscopic 3D and multi-view 3D displays according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

Embodiments of the present invention relate to operating systems that interface users and applications with display devices that have three-dimensional image display capability. Numerous types of applications and display devices may be interfaced by the operating system. For example, the display devices may include one or more light manipulators, such as parallax barriers and/or lenticular lenses, to deliver 3D media content in the form of images or views to the eyes of the viewers. Other types may include display devices with 3D display pixel constructs that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for operating systems, followed by a subsection that describes embodiments for interfacing applications with display devices, a subsection that describes embodiments for interfacing users with display devices, a subsection that describes operating system start up embodiments, a subsection that describes example display environments, and a subsection that describes example electronic devices.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Operating System Embodiments

In embodiments, operating systems that provide native support for the display of mixed content are provided. For example, in one embodiment, an operating system comprises a graphical user interface (GUI) in which video content, such as that produced by executing an application, can be displayed in a window or frame. The operating system enables one or more parameters to be associated with the window or frame, wherein the parameters can specify, for example, one or more of: a type of video content to be displayed within the window or frame (e.g., 2D, stereoscopic 3D, or a particular type of multi-view 3D), a desired orientation of the video content within the window or frame, a brightness/contrast to be associated with the window or frame, and/or a video resolution to be associated with the window or frame. The parameters to be associated with a window or frame may be specified programmatically or determined dynamically at run-time. The parameters may also be modified at run-time by a user through a user control interface provided by the operating system. The operating system is further configured to cause one or more function calls to be placed to a graphics API (application programming interface) or device driver so that a window is opened on the display and the video content is presented therein in a manner that is consistent with the associated parameters.

Figure 1:
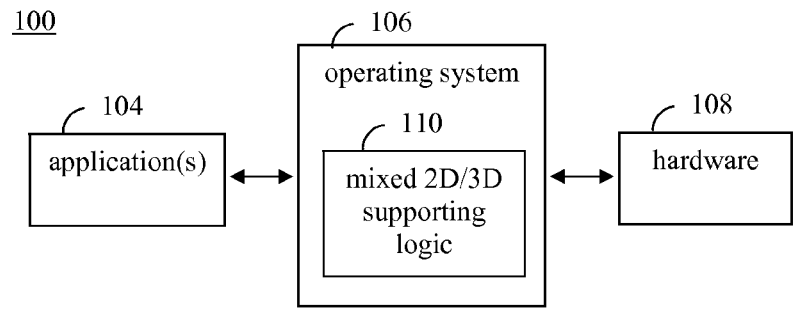
FIG. 1 shows a block diagram of a system that includes an operating system that supports mixed 2D and 3D displays, according to an exemplary embodiment.

For instance, FIG. 1 shows a block diagram of a system 100, according to an exemplary embodiment. As shown in FIG. 1, system 100 includes one or more applications 104, an operating system (OS) 106, and hardware 108. System 100 is a system where OS 106 interfaces together one or more users 102 and application(s) 104 with hardware 108. System 100 may be implemented in a single device or across multiple devices.

OS 106 provides a platform on which programs may be executed. OS 106 may be implemented in software (e.g., computer programs and/or data) that runs on a device. OS 106 manages hardware 108, provides common services, enables execution of application(s) 104, and enables application(s) 104 to access hardware 108. Application(s) 104 may call OS 106 and/or be interrupted by OS 106 for various reasons. OS 106 may include a user interface, such as a graphical user interface (GUI), which a user may interact with to access application(s) 104 and/or hardware 108. In some cases, application(s) 104 may interact directly with hardware 108. Hardware 108 may include one or more hardware components, such as one or more processors (e.g., a central processing unit) and/or memory devices (e.g., random access memory (RAM)), disk drives, printers, one or more display devices, a keyboard, a mouse, etc. Application(s) 104 may be implemented according to any suitable programming languages. Example description of implementations of programming languages for applications 104 and other applications described herein is provided in pending U.S. patent application Ser. No. 12/982,156, titled "Programming Architecture Supporting Mixed Two And Three Dimensional Displays," filed on same date herewith, which is incorporated by reference herein in its entirety, although application(s) 104 and further applications described herein are not limited to such implementations.

As shown in FIG. 1, operating system 106 includes mixed 2D/3D supporting logic 110. Mixed 2D/3D supporting logic 110 enables operating system 106 to support display of mixed 2D and 3D content, according to an exemplary embodiment. For example, logic 110 may enable operating system 106 to interface application(s) 104 that provide two-dimensional and/or three-dimensional content with display devices that are capable of separately displaying two-dimensional and three-dimensional content, display devices that are capable of simultaneously displaying two-dimensional and three-dimensional content, display devices that are capable of displaying different types of three-dimensional content, as well as display devices that can adaptively change the display of two-dimensional and three-dimensional contents (e.g., by display screen region).

Figure 2:
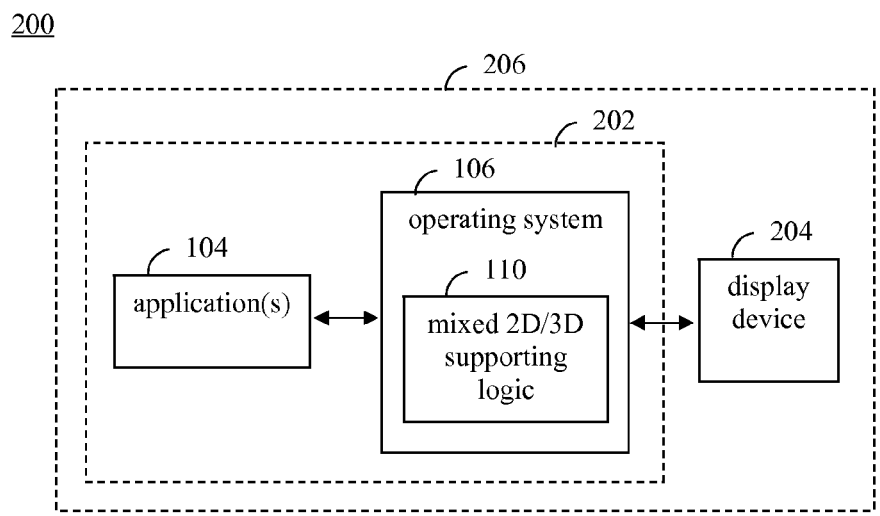
FIGS. 2 and 3 show block diagrams of systems that include operating systems that interface users, applications, and display devices and support mixed 2D and 3D displays, according to an exemplary embodiment.

For instance, FIG. 2 shows a block diagram of a system 200, which is an exemplary embodiment of system 100 of FIG. 1. As shown in FIG. 2, system 200 includes application(s) 104, operating system (OS) 106, and a display device 204. As shown in FIG. 2, operating system 106 includes mixed 2D/3D supporting logic 110. Display device 204 is a display device associated with system 200 that is interfaced with application(s) 104 by OS 106, and enables display of images associated with application(s) 104 to a user.

System 200 may be implemented in one or more devices. For example, in one embodiment, application(s) 104, OS 106, and display device 204 may be implemented in a common electronic device 206 accessed by a user, such as a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, some types of televisions, etc. In another embodiment, as shown in FIG. 2, OS 106 and application(s) 104 may be implemented together in an electronic device 202 that is separate from display device 204. For instance, device 202 may be a home theater system receiver, a set-top box, a computer, a game console, or other such device, and display device 204 may be a display device that is coupled to device 202 in a wired or wireless fashion.

Figure 3:
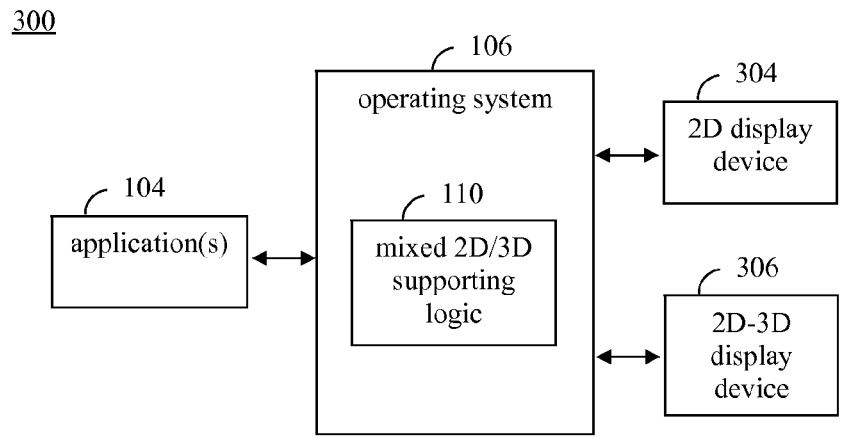

In embodiments, display device 204 may be one of a variety of display devices capable of displaying two-dimensional and/or three-dimensional images/content. For instance, FIG. 3 shows a block diagram of a system 300, which is an exemplary embodiment of system 200 of FIG. 2. As shown in FIG. 3, system 300 includes application(s) 104, operating system (OS) 106, a first display device 304, and a second display device 306. As shown in FIG. 3, operating system 106 includes mixed 2D/3D supporting logic 110. First display device 304 is a display device that is only capable of displaying two-dimensional content, and second display device 306 is a display device that is capable of display two-dimensional content and three-dimensional content. In the example of FIG. 3, via mixed 2D/3D supporting logic 110, OS 106 is capable of interfacing application(s) 104 with first and second display devices 304 and 306. As such, OS 106 is capable of interfacing two-dimensional and three-dimensional content with display devices. In embodiments, OS 106 may be capable of interfacing application(s) 104 with first and second display devices 304 and 306 one at a time. In another embodiment, OS 106 may be capable of interfacing application(s) 104 with first and second display devices 304 and 306 and/or other combinations and numbers of display devices simultaneously.

Figure 4A:
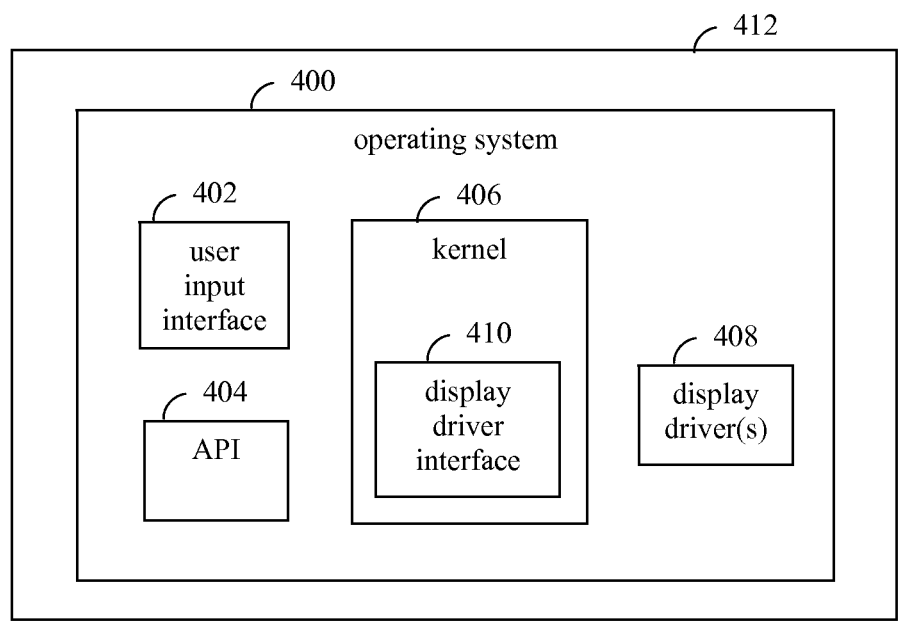
FIG. 4A shows a block diagram of a device that includes an operating system that supports mixed 2D and 3D displays, according to an exemplary embodiment.

OS 106 may be implemented in various ways to interface a user and application(s) 104 with display devices that are capable of displaying two-dimensional content and/or three-dimensional content. For instance, FIG. 4A shows a block diagram of an electronic device 412 that includes an operating system 400, according to an exemplary embodiment. Device 412 may be any of the electronic devices mentioned herein as including an operating system (e.g., electronic devices 202 and 206 of FIG. 2), or may be an alternative device. OS 400 is configured to interface users and applications with display devices that are capable of displaying two-dimensional content and/or three-dimensional content. In an embodiment, OS 400 may be a proprietary operating system. In another embodiment, OS 400 may be a commercially available operating system that is modified to enable users and applications to be interface with display devices capable of displaying two-dimensional content and/or three-dimensional content. For instance, operating systems such as Microsoft Windows®, Apple Mac OS® X, Google Android™, and Linux® may be modified according to embodiments.

As shown in FIG. 4A, OS 400 includes a user input interface 402, an API (application programming interface) 404, a kernel 406, and one or more display driver(s) 408. User input interface 402 is configured to receive user input to enable a person to interact with device 412 and associated applications and hardware. For instance, user input interface 402 may provide a command-line interface that allows commands to be entered in the form of text, and/or may provide a graphical user interface (GUI) that provides a visual environment for a user to interact with device 412. For instance, the GUI may generate graphical windows, buttons, menus, and/or icons displayed by a display device that may be interacted with by a user. In embodiments, user input interface 402 may be implemented in kernel 406, or separately from kernel 406 (e.g., in user-space; as shown in FIG. 4A).

API 404 is an interface implemented in software (e.g., computer program code or logic) that is configured to interface one or more applications (e.g., application(s) 104 of FIG. 1) with OS 400, and thereby interface the applications with a display device (e.g., one or both of display devices 304 and 306) coupled to OS 400. API 404 may be configured to enable applications to access various display functions, such as enabling regional definition for two-dimensional and/or three dimensional display screen areas, enabling movement of 2D/3D screen elements (e.g., windows or objects), and/or enabling further display functions by the applications. Furthermore, API 404 may be configured to perform graphics operations on graphics information received from applications for display. In embodiments, API 404 may be language dependent, such that API 404 may be accessed using a particular programming language, or may be language independent, such that API 404 can be accessed using multiple programming languages. API 404 may be a special purpose API, or may be a commercially available API, such as Microsoft DirectX® (e.g., Direct3D®), OpenGL®, or other 3D graphics API, which may be modified according to embodiments. Further description of implementations of API 404 and other API implementations described herein is provided in pending U.S. patent application Ser. No. 12/982,173, titled "Application Programming Interface Supporting Mixed Two And Three Dimensional Displays," filed on same date herewith, which is incorporated by reference herein in its entirety.

Kernel 406 is a central component of OS 400 that is configured to bridge applications and hardware. Kernel 406 may manage resources of device 412, and enable applications to run and to use the resources. For instance, kernel 406 may allocate running applications to one or more processors of device 412, may allocate memory to the applications, and may allocate requests from applications to perform I/O (input/output) operations with regard to hardware resources associated with device 412, such as a keyboard, mouse, disk drives, printers, and displays. For example, as shown in FIG. 4A, kernel 406 includes a display driver interface 410. As described in further detail below, display driver interface 410 enables applications that interface with OS 400 via API 404 to provide and control two- and/or three-dimensional content displayed at a display device associated with device 412. For instance, display driver interface 410 may include mixed 2D/3D supporting logic 110 of FIG. 3. To display an image on a screen of a display device, an application may provide a request to kernel 406, which is handled by display driver interface 410. Display driver interface 410 forwards the request to a display driver, which may handle generating plotting information for displaying the image at the display device.

Display driver(s) 408 are one or more display drivers that may be included in operating system 400. A display driver 408 may be implemented in software, and enables applications (e.g., higher-level application code) to interact with a display device. Each display driver of display driver(s) 408 is typically display device-specific, although some display drivers may be capable of driving multiple types of display devices. Due to the presence of display driver(s) 408, programmers can write and input higher-level application code to API 404 independently of the specific display device associated with device 412, enabling the application code and display device to interface in a standard way. Each type of display device typically is controlled by its own display device-specific commands. In contrast, most applications communicate with display devices according to high-level device-generic commands. A display driver 408 accepts the generic high-level commands (via API 404 and display driver interface 410), and breaks them into a series of low-level display device-specific commands, as used by the particular display device. In an embodiment, a display driver 408 may be configured to filter out one or more parameters received with a command that is/are incompatible with the display device screen coupled to device 412.

As such, using a display driver 408, multiple applications that communicate using standard high-level commands can access a particular display device through OS 400. Furthermore, OS 400 may include multiple display drivers 408 to enable multiple applications to communicate with multiple corresponding display devices.

Figure 4B:
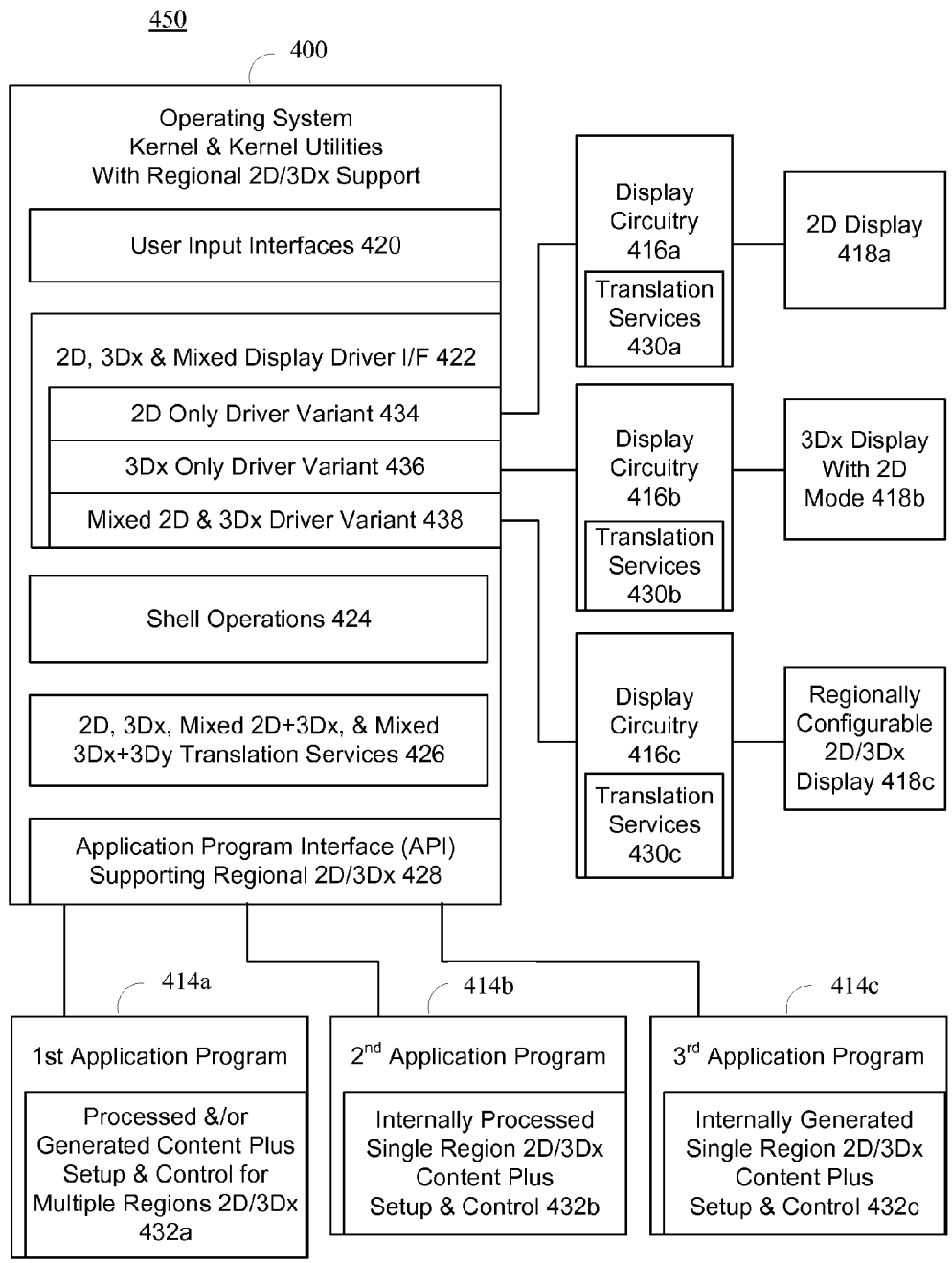
FIG. 4B shows a block diagram of system that includes an operating system that supports mixed 2D, stereoscopic 3D and multi-view 3D displays, according to an exemplary embodiment.

As described above, OS 400 of FIG. 4A is configured to interface users and applications with display devices that are capable of displaying two-dimensional content and/or three-dimensional content. OS 400 may be configured in various ways to perform its functions, and various embodiments for OS 400 are described herein. For instance, FIG. 4B shows a block diagram of a display system 450 similar to display system 300 of FIG. 3, according to an embodiment. As shown in FIG. 4B, display system 450 includes an embodiment of OS 400 that is configured to interface users and applications with display devices that are capable of displaying two-dimensional content and/or three-dimensional content. The embodiment of OS 400 shown in FIG. 4B is provided for purposes of illustration, and is not intended to be limiting. In further embodiments, OS 400 may include fewer, additional, and/or alternative features than shown in FIG. 4B.

Display system 450 is an example of a display system that is capable of displaying mixed 2D and 3D content (e.g., via mixed 2D/3D supporting logic 110). As shown in FIG. 4B, system 450 includes operating system 400, first-third application programs 414, first-third display circuitry 416a-416c, a 2D display 418a, a 3D display with 2D mode 418b, and a regionally configurable 2D/3Dx display 418c. Operating system 400 includes user input interfaces 420, a 2D, 3Dx & mixed display driver interface 422, shell operations 424, 2D, 3Dx, mixed 2D and 3Dx, & mixed 3Dx and 3Dy translation services 426, and an API supporting regional 2D/3Dx 428. 2D, 3Dx and mixed display driver interface 422 includes 2D only driver variant 434, 3Dx only driver variant 436, and mixed 2D and 3Ds driver variant 438. First application program 414a includes processed and/or generated content plus setup and control for multiple regions 2D/3Dx 432a. Second application program 414b includes internally processed single region 2D/3Dx content plus setup and control 432b. Third application program 414c includes internally generated signal region 2D/3Dx content plus setup and control 432c. First-third display circuitry 416a-416c each include a corresponding one of translation services 430a-430c. The features of system 450 are described as follows.

2D display 418a, 3D display with 2D mode 418b, and regionally configurable 2D/3Dx display 418c are example types of display devices that may be interfaced with applications by OS 400. One or more of displays 418a-418c may be separately coupled to OS 400 (via display circuitry 416a-416c) or simultaneously coupled to OS 400. 2D display 418a is an example of 2D display device 304 of FIG. 3, and is a display device that is only capable of displaying two-dimensional content. 3Dx display with 2D mode 418b is an example of 2D-3D display device 306 of FIG. 3, and is a display device that is capable of displaying two-dimensional and three-dimensional content. For instance, 3Dx display with 2D mode 418b may be set in a 2D mode where 3Dx display with 2D mode 418b can display 2D content in full screen, but not 3D content, and may be set in a 3D mode where 3Dx display with 2D mode 418b can display 3D content in full screen, but not 2D content. Furthermore, 3Dx display with 2D mode 418b may be capable of displaying 3D content having multiple camera views—a number of "x" views—such as 3D-4, having four camera views, 3D-16, having sixteen camera views, etc. The additional camera views enable viewers to "view behind" displayed 3D content by moving their heads left-right, as further described elsewhere herein. Regionally configurable 2D/3Dx display 418c is an example of 2D-3D display device 306 of FIG. 3, and is a display device that is capable of displaying two-dimensional and three-dimensional content simultaneously. For instance, regionally configurable 2D/3Dx display 418c may display 2D content on one or more regions of a display screen while simultaneously displaying 3D content on one or more other regions of the display screen. Furthermore, regionally configurable 2D/3Dx display 418c may be capable of displaying 3D content having multiple camera views.

First-third application programs 414a-414c are examples of application(s) 104 of FIG. 4A that may be interfaced with displays 418a-418c. One or more of applications 414a-414c may separately or simultaneously execute and interact with OS 400 to provide content for display by displays 418a-418c. First application program 414a, which includes processed and/or generated content plus setup and control for multiple regions 2D/3Dx 432a, is capable of processing received 2D, 3D, and 3Dx content and/or generating 2D, 3D, and 3Dx content, and is capable of setting up and controlling multiple separate display screen regions that each display 2D, 3D, or 3Dx content. Second application program 414b, which includes internally processed single region 2D/3Dx content plus setup and control 432b, is capable of processing received 2D, 3D, and 3Dx content, and is capable of setting up and controlling a single display screen region that displays 2D, 3D, or 3Dx content. Third application program 414c, which includes internally generated signal region 2D/3Dx content plus setup and control 432c, is capable of internally generating 2D, 3D, and 3Dx content, and is capable of setting up and controlling a single display screen region that displays 2D, 3D, or 3Dx content.

API supporting regional 2D/3Dx 428 is an example of API 404 of FIG. 4A. API supporting regional 2D/3Dx 428 is configured to interface one or more applications (e.g., application 414-414c) with OS 400, and thereby interface the applications with a display device (e.g., one or more of displays 418a-418c) coupled to OS 400. API supporting regional 2D/3Dx 428 is configured to enable applications to access various display functions, including enabling regional definition for 2D, 3D, and 3Dx content displayed by display screens and further display functions.

User input interfaces 420 are an example of user input interface 402 of FIG. 4A. User input interfaces 420 are configured to receive user input to enable a person to interact with display system 450, applications 414a-414c, and content displayed by displays 418a-418c.

2D, 3Dx & mixed display driver interface 422 is an example of display driver interface 410 of FIG. 4A, and 2D only driver variant 434, 3Dx only driver variant 436, and mixed 2D and 3Dx driver variant 438 are examples of display driver(s) 408 of FIG. 4A. 2D, 3Dx & mixed display driver interface 422 enables applications 414a-414c that interface with OS 400 via API 428 to provide and control two- and/or three-dimensional content displayed at a displays 418a-418c. For instance, 2D, 3Dx & mixed display driver interface 422 may forward commands (e.g., from one or more of applications 414a-414c) to 2D only driver variant 434 when 2D display 418a is present, enabling only 2D-related commands to be processed. 2D, 3Dx & mixed display driver interface 422 may forward commands to 3Dx only driver variant 436 when 3Dx display with 2D mode 418b is present, enabling 2D or 3Dx related commands to be processed. 2D, 3Dx & mixed display driver interface 422 may forward commands to mixed 2D and 3Dx driver variant 438 when regionally configurable 2D/3Dx display 418c is present, enabling regional 2D or 3Dx related commands to be processed.

Shell operations 424 may be present in OS 400 to control and/or enable user configuration of environmental properties, such as the 2D and/or 3D display configuration of an environmental background, of desktop icons, of displayed windows, etc. In embodiments, shell operations 424 may be implemented in hardware, software, firmware, or any combination thereof, including as a shell operations module. Examples of shell operations 424 are described elsewhere herein.

Mixed 2D and 3Dx, & mixed 3Dx and 3Dy translation services 426 may be present in OS 400 to provide for translation of received content (e.g., from applications 414a-414c) from a first dimensionality to a second dimensionality. For instance, translation services 426 may be configured to translate received 3D content to 2D content, such as when an application provides 3D content, and 2D display 418a is the target display (e.g., the target display is not capable of displaying 3D content). In another example, translation services 426 may be configured to translate a first type of 3D content to a second type of 3D content, such as when an application provides regional 2D and/or 3D content, and 3Dx display with 2D mode is the target display (e.g., the target display is not capable of displaying content regionally), and/or to translate 3D content having a first number "x" of cameras (e.g., 3D-8 content) to 3D content having a second number "y" of cameras (e.g., 3D-4 content), if the target display does not support "x" camera views. Still further, translation services 426 may be configured to translate 2D content to 3D content, and/or may be able to perform other forms of content translations. Example embodiments for mixed 2D and 3Dx, & mixed 3Dx and 3Dy translation services 426 (e.g., translators) are described elsewhere herein.

Display circuitry 416a-416c may have the form of hardware, software, firmware, or any combination thereof, such as having the form of a graphics card, circuitry etc. Display circuitry 416a-416c may be present to interface OS 400 with displays 418a-418c, respectively. Display circuitry 416a-416c may receive content signals and control signals from OS 400, and may be configured to generate drive signals to drive displays 418a-418c, respectively. Examples of display circuitry (e.g., drive circuits) are described elsewhere herein.

As shown in FIG. 4B, display circuitry 416a-416c may each optionally include a corresponding one of translation services 430a-430c. When present, translation services 430a-430c may perform translations of received content in a similar manner as mixed 2D and 3Dx, & mixed 3Dx and 3Dy translation services 426. For instance, translation services 430a may translate received 3D content to 2D content for display by 2D display 418a. Translation services 430b may translate received regionally configurable 2D and/or 3D content to non-regional 2D and/or 3D content for display by 3Dx display with 2D mode display 418b. Translation services 430b and 430c may each translate unsupported types of 3D content to supported types of 3D content for display by 3Dx display with 2D mode display 418b and regionally configurable 2D/3Dx display 418c, respectively. Translation services 430a-430c may also be configured to perform additional and/or alternative forms of content translations, in embodiments.

The embodiments of display system 450 of FIG. 4B, and of OS 400 shown in FIGS. 4A and 4B, are provided for purposes of illustration. In further embodiments, Display system 450 and OS 400 may include fewer, further, and/or alternative components, as would be known to persons skilled in the relevant art(s). Further embodiments regarding the features of display system 450 of FIG. 4B and of OS 400 shown in FIGS. 4A and 4B are described in the following subsections.

B. Exemplary Embodiments for Interfacing Applications and Display Devices

Figure 5:
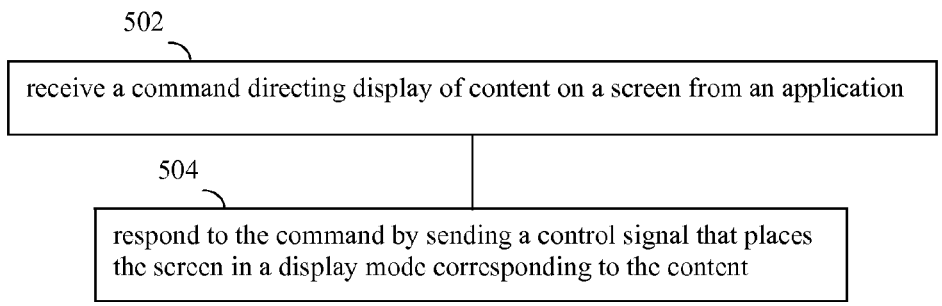
FIG. 5 shows a flowchart providing a process for interfacing an application with a display device through an operating system, according to an exemplary embodiment.
Figure 6:
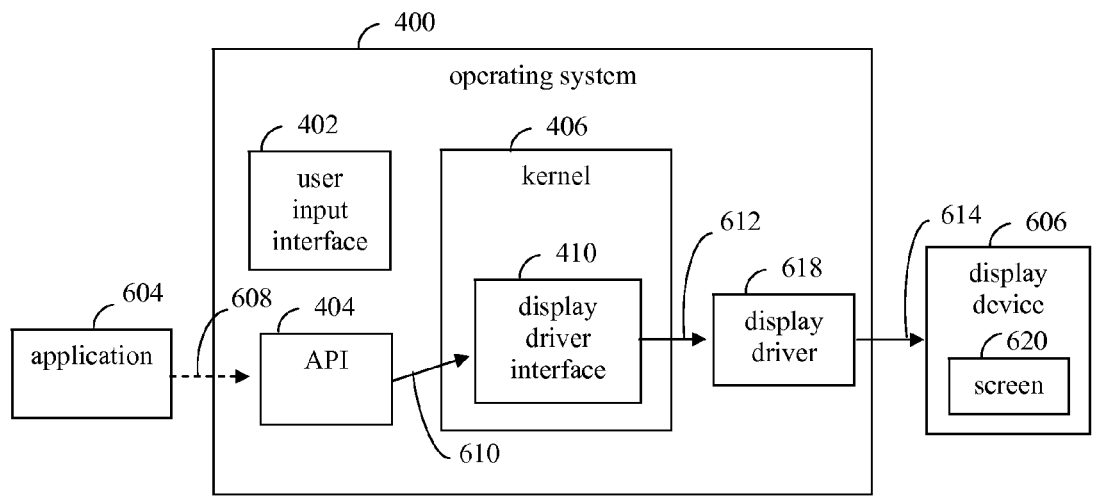
FIG. 6 shows a block diagram of an application interfaced with a display device by an operating system, according to an exemplary embodiment.

As described above, API 404 receives requests and content from applications for display devices associated with device 412. FIG. 5 shows a flowchart 500 providing a process for interfacing an application with a display device through an operating system, according to an exemplary embodiment. Flowchart 500 may be performed by OS 400 shown in FIG. 4A, for example. Flowchart 500 is described with respect to FIG. 6, which shows a block diagram of an application 604 interfaced with a display device 606 by OS 400, according to an exemplary embodiment. In the example of FIG. 6, OS 400 includes user input interface 402, API 404, kernel 406, and a display driver 618. Display driver 618 is an example of one of display driver(s) 408 of FIG. 4A. Device 412 of FIG. 4A is not shown in FIG. 6 for ease of illustration, but it is noted that application 604 may be included in device 412, and display device 606 may be included in or may be external to device 412. Further structural and operational embodiments will be apparent to persons skilled in the relevant art(s) based on the discussion regarding flowchart 500. Flowchart 500 is described as follows.

Flowchart 500 begins with step 502. In step 502, a command directing display of content on a screen is received from an application. For example, as shown in FIG. 6, a request 608 may be received by OS 400 from application 604. Application 604 may be any type of application associated with the display of content, including a media player, a video game, a browser, etc. Request 608 may include a configuration command from application 604 directed to the display of content on a screen 620 of display device 606. Request 608 may be directed to the display of two-dimensional or three-dimensional content, and may be directed to the display of content in any region of screen 620, including a portion of screen 620 or the entirety of screen 620. As shown in FIG. 6, request 608 is received by API 404. As such, request 608 is a command configured according to a convention defined by API 404 for receiving display configuration requests. As shown in FIG. 6, API 404 passes request 608 to display driver interface 410 of kernel 406 as configuration command 610. Furthermore, display driver interface 410 passes configuration command 610 to display driver 618 as configuration command 612.

In step 504, the command is responded to by sending a control signal that places the screen in a display mode corresponding to the content. For example, as shown in FIG. 6, display driver 618 generates a control signal 614. Control signal 614 is generated based on configuration command 612, and is configured to place screen 620 of display device 606 in a display mode corresponding to content to be displayed by screen 620. For instance, in an embodiment, display driver 618 is configured as a display driver specifically for display device 606, or may be configured as a display driver for a plurality of types of display devices including display device 606. Display device 606 receives control signal 614, and screen 620 of display device 606 is configured according to control signal 614 to be enabled to display the content as desired. For example, in an embodiment, control signal 614 may be received by display driver circuits of display device 606, and the display driver circuits may generate drive signals to configure display components of screen 620 according to control signal 614.

Figure 7:
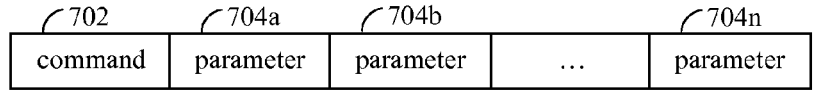
FIG. 7 shows a block diagram of a request, according to an exemplary embodiment.

Note that request 608 may have any suitable format, as defined by API 404. For instance, FIG. 7 shows a block diagram of a request 700, according to an exemplary embodiment. Request 700 is an example of request 608 of FIG. 6. As shown in FIG. 7, request 700 includes a command 702 and one or more parameters 704a-704n. Request 700 may include any number of parameters 704, as dictated by the particular command 702. Request 700 may have various forms depending on the configuration action desired to be performed by application 604.

For example, request 700 may be a request from application 604 to open a frame or window for display by screen 620 of display device 606. In such an example, command 702 may be an "open frame" or "open window" command. Furthermore, one or more parameters 704 may be present to define attributes of the frame/window to be opened. For instance, one or more parameters 704 may be present to define a size of a region of screen 620 in which the frame or window is to be opened. For instance, parameters 704a-704d may be row, column, width, and height parameters, respectively, where the row and column parameters (window position parameters) define coordinates of an upper left corner of the window to be opened, and the width and height parameters (window size parameters) define the width and height (e.g., in pixels or other measure) of the window to be opened. Furthermore, a parameter may be present to define whether the window to be opened is to display two-dimensional content or three-dimensional content. For instance, parameter 704e may be a 2D/3D indicator parameter that contains either a two-dimensional indicator or a three-dimensional indicator to define the window to be opened as displaying two-dimensional content or three-dimensional content, respectively.

The "open window" command may include further parameters 704, such as a window resolution parameter, a window orientation parameter (e.g., whether image content is to be displayed vertically or rotated by 90 degrees or by other amount), a three-dimensional display type parameter, a subframe/full frame/child window parameter, a freeform window parameter (e.g., whether the window may have a non-rectangular shape), a three-dimensional content source indication parameter, etc. For example, in an embodiment, where a three-dimensional indicator is present in request 700, a three-dimensional display type parameter may be present to define a number of image pairs to be provided to the window to be opened, corresponding to a number of three-dimensional views to be provided by the window (e.g., whether the window is not multiview or is multiview 4-3D, 16-3D, etc.). Furthermore, a three-dimensional display type parameter may be present to define a depth of three-dimensionality to be provided in the window to be opened. In another example, a parameter may be provided to indicate whether the window to be opened is to provide three-dimensional content and is to be adaptable based on factors such as bandwidth (e.g., increasing or decreasing a number of camera views that are displayed based on a data rate of incoming content), etc.

In a similar manner as the "open window" command, further commands may be defined by request 700. In further examples, request 700 may be a request from application 604 to close a window displayed in screen 620, to move a window displayed in screen 620, to resize a window displayed in screen 620, to rotate a window displayed in screen 620, or other type of request. As such, command 702 may be a "close window" command, and one of parameters 704 may include a window handle identifying the window to be closed. In another example, command 702 may be "move window" command, and parameters 704 may include row and column parameters that define the new upper left corner of the window being moved. In another example, command 702 may be "resize window" command, and parameters 704 may include width and height parameters that define the new width and height of the window being resized. In still another example, command 702 may be "rotate window" command, and parameters 704 may include an indication (e.g., in degrees) of an amount by which the window is to be rotated.

In further embodiments, command 702 and parameters 704 may have other forms to define further functions, as would be apparent to persons skilled in the relevant art(s). For example, in embodiments, request 700 may be a request for information regarding an open window. For instance, command 702 may define a request for a window type (e.g., 2D or 3D), a window handle, a window position, an indication of the capabilities of the window and/or screen, and/or other window or screen characteristic. Another example command 702 may define a request to OS 400 for capabilities of screen 620/display device 606 so that applications may learn of window/screen capabilities prior to attempting to open and populate windows. Further commands 702 and parameters 704 may be defined as directed to frames, objects, and/or other display elements, having similar parameters as those defined above for windows, or having other parameters.

Referring back to FIG. 6, after a window is opened in screen 620 according to request 608, application 604 or other source may provide the corresponding two-dimensional or three-dimensional content to be displayed in the opened window. For instance, application 604 may generate and provide the content, or may receive and forward the content from another source, such as content received over a network, content received from a storage device associated with device 412 of FIG. 4A (e.g., a hard disc drive, a DVD (digital video disc) drive, a memory stick, etc.). Application 604 may transmit the content, which is received by API 404. API 404 may operationally perform some graphics processing on the content, and may provide the processed content to display driver 618 through display driver interface 410, or directly to display driver 618. Display driver 618 may perform further processing/formatting of the processed content, and may provide the content to display device 606 to be displayed by screen 620.

As described above, multiple applications may simultaneously interface with a display device through OS 400. For example, FIG. 8 shows a flowchart 800 providing a process for interfacing applications with a display device through an operating system, according to an exemplary embodiment. Flowchart 800 may be performed by OS 400 shown in FIG. 6, for example. Flowchart 800 is described with respect to FIG. 9, which shows a block diagram of first and second applications 604a and 604b interfaced with display device 606 by OS 400, according to an exemplary embodiment. Note that although two applications 604 are shown in FIG. 9, any number of applications 604 may be interfaced by OS 400 with a display device. Furthermore, such applications may be associated with any combination of two-dimensional and/or three dimensional content. Further structural and operational embodiments will be apparent to persons skilled in the relevant art(s) based on the discussion regarding flowchart 800. Flowchart 800 is described as follows.

Flowchart 800 begins with step 802. In step 802, a first command is received from a first application directing display of two-dimensional content within a first region of the screen. For example, as shown in FIG. 9, a first request 608a may be received by API 404 of OS 400 from first application 604a. First request 608a may include a configuration command from application 604a directed to the display of two-dimensional content on screen 620 of display device 606. For instance, the command of request 608a may be an open window command or other command that enables or directs display of content in a particular first region of screen 620, and may include a parameter that indicates that the displayed content is to be two-dimensional content.

In step 804, the first command is responded to by sending a first control signal that places the screen in a two-dimensional mode within the first region. For instance, as shown in FIG. 9, API 404 transmits a command 610*a* corresponding to request 608*a* that is received by display driver interface 410, and display driver interface 410 passes command 610*a* to display driver 618 as command 612*a*. Display driver 618 generates a first control signal 614*a* that places screen 620 in a two-dimensional display mode within the first region of screen 620 indicated in first request 608*a*. For example, in an embodiment, first control signal 614*a* may be received by display driver circuits of display device 606, and the display driver circuits may generate drive signals to configure display components of screen 620 with regard to the first screen region according to first control signal 614*a*.

In step 806, a second command is received from a second application directing display of three-dimensional content within a second region of the screen. For example, as shown in FIG. 9, a second request 608*b* may be received by API 404 of OS 400 from second application 604*b*. Second request 608*b* may include a configuration command from application 604*b* directed to the display of three-dimensional content on screen 620 of display device 606. For instance, the command of request 608*b* may be an open window command or other command that enables or directs display of content in a particular second region of screen 620, and may include a parameter that indicates that the displayed content is to be three-dimensional content.

In step 808, the second command is responded to by sending a second control signal that places the screen in a three-dimensional mode within the second region. For instance, as shown in FIG. 9, API 404 transmits a command 610*b* corresponding to request 608*b* that is received by display driver interface 410, and display driver interface 410 passes command 610*b* to display driver 618 as command 612*b*. Display driver 618 generates a second control signal 614*b* that places screen 620 in a three-dimensional display mode within the second region of screen 620 indicated in second request 608*b*. For example, in an embodiment, second control signal 614*b* may be received by display driver circuits of display device 606, and the display driver circuits may generate drive signals to configure display components of screen 620 with regard to the second screen region according to second control signal 614*b*.

As such, according to flowchart 800, multiple applications may simultaneously direct the display of two-dimensional or three-dimensional content within corresponding regions of screen 620. Furthermore, in embodiments, the display on screen 620 of different types of three-dimensional content (e.g., different resolutions, different numbers of image pairs, different stereoscopic depths, etc.) may be directed by multiple applications simultaneously. In embodiments, any number of different types of two-dimensional and three-dimensional content may be displayed in any number of regions of screen 620.

Figure 10:
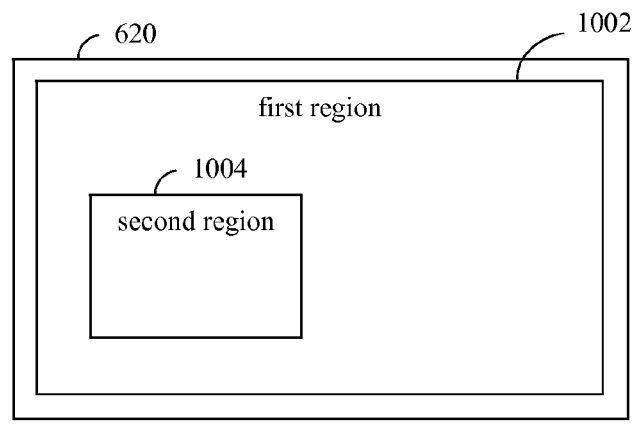

For instance, FIGS. 10, 11, 12A, and 12B show examples of screen 620 displaying content in various screen regions, according to embodiments. FIG. 10 shows screen 620 including a first region 1002 and a second region 1004. First region 1002 is configured for the display of two-dimensional content according to steps 802 and 804 of flowchart 800, and second region 1004 is configured for the display of three-dimensional content according to steps 806 and 808 of flowchart 800. As shown in FIG. 10, first region 1002 has a size that is approximately the full display area of screen 620, and second region 1004 has a smaller size, filling a rectangular space imposed on first region 1002. For instance, in one embodiment provided for purposes of illustration, first region 1002 may be a two-dimensional desktop region displayed on a computer screen, and second region 1004 may be a window displaying three-dimensional content in the desktop region. In another embodiment, first region 1002 may correspond to two-dimensional television content, while second region 1004 is a picture-in-picture region that displays three-dimensional television content overlaid on first region 1002.

Figure 11:
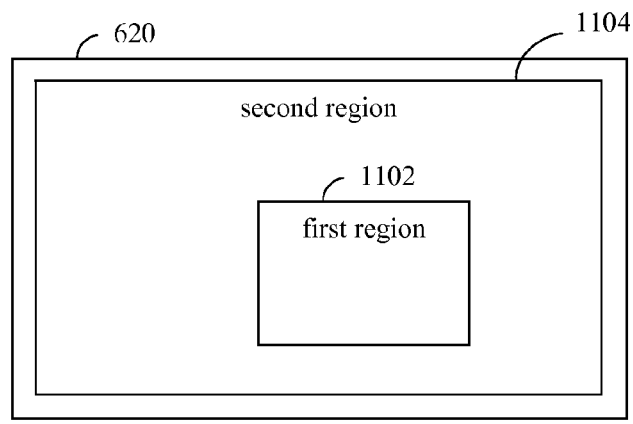

In another example, FIG. 11 shows screen 620 including a first region 1102 and a second region 1104. First region 1102 is configured for the display of two-dimensional content according to steps 802 and 804 of flowchart 800, and second region 1104 is configured for the display of three-dimensional content according to steps 806 and 808 of flowchart 800. As shown in FIG. 11, second region 1104 has a size that is approximately the full display area of screen 620, and first region 1102 has a smaller size, filling a rectangular space imposed on second region 1104. For instance, in one embodiment, second region 1104 may be a three-dimensional desktop region displayed on a computer screen, and first region 1102 may be a window displaying two-dimensional content in the desktop region. In another embodiment, second region 1104 may correspond to three-dimensional television content, while first region 1102 is a picture-in-picture region that displays two-dimensional television content overlaid on second region 1104.

Figure 12A:
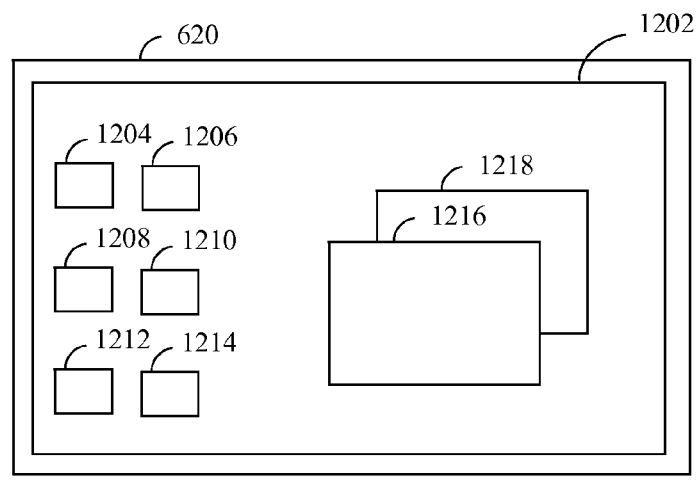

In another example, FIG. 12A shows screen 620 including a first-ninth regions 1202-1218. Any number of first-ninth regions 1202-1218 may be configured in a two-dimensional mode, and the remaining number of first-ninth regions 1202-1218 may be configured in a three-dimensional mode. For instance, second, fifth, sixth, seventh, and ninth regions 1204, 1210, 1212, 1214 and 1218 may be configured for the display of two-dimensional content, and first, third, fourth, and eighth regions 1202, 1206, 1208, and 1216 may be configured for the display of three-dimensional content. First region 1202 has a size that is approximately the full display area of screen 620. Second-seventh regions 1204-1214 have smaller sizes, and are arranged in two columns on a left size of screen 620. Eighth and ninth regions 1216 and 1218 have medium sizes, each filling a rectangular space imposed on first region 1202. Eighth region 1216 overlaps with ninth region 1218, blocking a view of a portion of ninth region 1218. For instance, in one embodiment, first region 1202 may be a three-dimensional desktop region displayed on a computer screen, second-seventh regions 1204-1214 may be an arrangement of two-dimensional and three-dimensional icons (e.g., associated with applications) displayed on the desktop region, and eighth and ninth regions 1216 and 1218 may be windows displaying three-dimensional and two-dimensional content, respectively, in the desktop region.

Figure 12B:
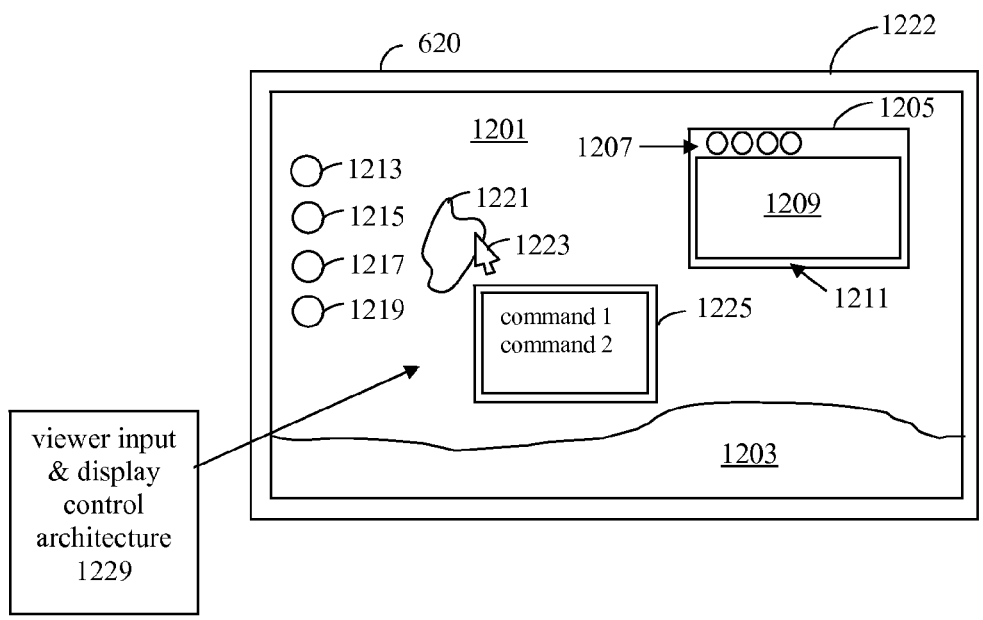

FIG. 12B depicts an example desktop 1222 displayed on screen 620 that includes a variety of areas in which respective instances of content may be presented in accordance with an embodiment. Desktop 1222 may be serviced by operating system (OS) objects, internet delivered media objects, boundaries, icons, etc., that are all subject to user setup and/or via a user's live interaction. The areas of desktop 1222 may include object perimeters, moving 3D objects, 2D or 3D icons or otherwise with 2D or 3D boundaries or interiors, etc. The exemplary areas of desktop 1222 shown in FIG. 12B will now be described.

Desktop 1222 includes a background having a 2D sky area 1201 and a 3D grass region 1203 that appears to stretch far into the distance. Desktop 1222 further includes unselected icons 1213, 1215, and 1219 of random or arbitrary shapes which appear floating in mid-air in local 3D. Icons 1213 and 1219 may contain OS generated content, and icon 1215 may contain 3D content delivered live via an external server, for example. In accordance with this example, the 3D content in icon 1215 may be actively changing and/or moving around. Desktop 1222 further includes a selected icon 1217 which seems to be moving closer then farther away in a cycle, while the window 1225 that was opened and relates to selected icon 1217 has a boundary region 1211 that seems to actively change in synchrony therewith.

Desktop 1222 also includes an active, moving 2D or 3D object 1221 that has a non-rectangular boundary. Desktop 1222 further includes a pointer 1223 used to assist a viewer input and display control architecture 1229 that may be anything illustrated and discussed in the present application, and through which screen region configuration commands (command 1, command 2, etc.) can be accessed via, for example, a right click that opens a pop-up window 1225 or other type of window. Desktop 1222 also includes a rectangular window 1205 with 3D icons 1207 that may move and present local or delivered content, a 2D or 3D content screen 1209 (2D text or 3D movie for example originating remotely), and a 2D or 3D boundary 1211 as mentioned above related to the selected icon 1217.

Viewer input and display control architecture 1229 represents one or more of any type of integrated and multiple-housing display and viewer control architectures. For instance, architecture 1229 may include one or more user input interfaces configured to receive user input. Examples of a user input interface include but are not limited to a remote control device, a traditional computer input device such as a keyboard or mouse, a touch screen, a gamepad or other type of gaming console input device, or one or more sensors including but not limited to video cameras, microphones and motion sensors. Such user input interface may generate an input signal that specifies settings for regionally adjustable characteristics of a screen assembly for presentation of the instances of content in the respective areas of desktop 1222, for example, based on the user input.

The visual elements of desktop 1222, including 2D and/or 3D aspects, sizes, movement, brightness, etc., of 2D sky area 1201, 3D grass region 1203, window 1205, content screen 1209, icons 1213, 1215, 1217, and 1219, object 1221, pop-up window 1225, etc., may be configured by applications providing commands through operating systems and/or OS commands generated by user interaction (e.g., with user input interfaces 420), including commands for opening and tailoring windows, frame 3D/2D characteristics, depth, user interaction, supporting 2D/3D graphic objects, etc.

It is noted that the examples of FIGS. 10, 11, 12A, and 12B are provided for purposes of illustration, and are not intended to be limiting. In the examples of FIGS. 10, 11, 12A, and 12B, it is assumed that display device 606 supports the display of both two-dimensional and three-dimensional content. However, it is noted that not all types of display device 606 may support both two-dimensional content and three-dimensional content. Furthermore, not all types of display device 606 that support three-dimensional content may support all types of three-dimensional content. As such, in embodiments, OS 400 may be configured to translate unsupported types of content to supported types of content. Still further, screen regions may be rectangular in shape, as shown in FIGS. 10, 11, 12A, and 12B, or may have other shapes, including round or rounded, triangular or other polygon, or any other shape. For example, first-ninth regions 1202-1218 may each have the shape of a particular icon, and may be three-dimensional in shape, surrounded by a two-dimensional background. A screen region may have any other shape, including the shape of an object, a displayed character (e.g., a person, an animal, an animated character, etc.), etc.

For example, in an embodiment, display drivers of OS 400 may be configured to translate types of content that are not supported by a display device associated with the display drivers to supported types of content. FIG. 13 shows a block diagram of display driver 618, according to an exemplary embodiment. As shown in FIG. 13, display driver 618 includes a first translator 1302 and a second translator 1304. In embodiments, a display driver may include one or both of first and second translators 1302 and 1304. First translator 1302 may be present in display driver 618 when display device 606 associated with display driver 618 does not support the display of three-dimensional content. Second translator 1302 may be present in display driver 618 when display device 606 associated with display driver 618 does not support the display of one or more types of three-dimensional content.

First translator 1302 is configured to translate received 3D data to 2D data for display by a display device. For example, as shown in FIG. 13, display driver 618 receives configuration command 612. Configuration command 612 may be a command to configure a region of screen 620 for display of three-dimensional content. However, display device 606 may not support the display of three-dimensional content. As such, display driver 618 may generate control signal 614 to configure the region of screen 620 indicated by command 612 for two-dimensional content instead of three-dimensional content. Furthermore, when subsequent three-dimensional data 1306 is received by display driver 618 for display in the region of screen 620, first translator 1302 may translate three-dimensional data 1306 to two-dimensional data 1308. Two-dimensional data 1308 is transmitted to display device 606 to enable the corresponding two-dimensional content to be displayed in the region of screen 620.

Similarly, second translator 1304 is configured to translate received 3D data of a first 3D content type to 3D data of a second 3D content type for display by a display device. As shown in FIG. 13, display driver 618 receives configuration command 612. Configuration command 612 may be a command to configure a region of screen 620 for display of two-dimensional content of a first type. However, display device 606 may not support the display of three-dimensional content of the particular type. As such, display driver 618 may generate control signal 614 to configure the region of screen 620 indicated by command 612 for three-dimensional content of a second type instead of three-dimensional content of the first type. Furthermore, when subsequent first-type three-dimensional data 1310 is received by display driver 618 for display in the region of screen 620, second translator 1304 may translate first-type three-dimensional data 1310 to second-type three-dimensional data 1312. Second-type three-dimensional data 1312 is transmitted to display device 606 to enable the corresponding three-dimensional content to be displayed in the region of screen 620.

First translator 1302 may be configured in various ways to translate received 3D data to 2D data. For instance, in an embodiment, three-dimensional data 1306 may be received as a stream of right image data and left image data. First translator 1302 may be configured to combine the right and left image data into two-dimensional image data that defines a stream of two-dimensional images that may be output as two-dimensional data 1308. In another embodiment, first translator 1302 may be configured to select the right image data or the left image data to be output as two-dimensional data 1308, while the other of the right image data or left image data is not used. In further embodiments, first translator 1302 may translate received 3D data to 2D data in other ways.

Second translator 1304 may be configured in various ways to translate 3D data of a first 3D content type to 3D data of a second 3D content type. For instance, second translator 1304 may translate a first 3D multiview type (e.g., 3D-16) to a second 3D multiview type (e.g., 3D-4) or to a single 3D view. In such an embodiment, second translator 1304 may not pass extra left-right image pairs from first-type three-dimensional data 1310 to second-type three-dimensional data 1312. In further embodiments, second translator 1304 may translate 3D data in other ways.

Referring back to flowchart 500 of FIG. 5, and flowchart 800 of FIG. 8, OS 400 may pass responses from display devices back to applications in response to requests. For instance, FIG. 14 shows a flowchart 1400 providing a process for interfacing responses through an operating system, according to an exemplary embodiment. Flowchart 1400 may be performed by OS 400 shown in FIG. 6, for example. Flowchart 1400 is described with respect to FIG. 15, which shows a block diagram of application 604 interfaced with display device 606 by OS 400, according to an exemplary embodiment. Further structural and operational embodiments will be apparent to persons skilled in the relevant art(s) based on the discussion regarding flowchart 1400. Flowchart 1400 is described as follows.

Flowchart 1400 begins with step 1402. In step 1402, a response is received from the screen regarding the control signal. For example, as shown in FIG. 15, display device 606 generates a response 1502. Response 1502 contains information indicating a response to the previously received control signal (e.g., control signal 614 of FIG. 6). For instance, response 1502 may include an indication (e.g., a logical "1" value" or "0" value) from the screen of whether a control signal was successful. Response 1502 is received by display driver 618.

In step 1404, the response is provided to the application. For example, display driver 618 may forward response 1502 to display driver interface 410 as response 1504, and display driver interface 410 may forward response 1504 to API 404 as response 1506. Alternatively, display driver 618 may forward response 1502 directly to API 404. API 404 receives response 1506, and provides response 1506 to application 604 as response 1508.

Response 1508 may include any information suitable for a response by display device 606 to a control signal generated in response to a request 608. For example, if request 608 included an "open window" command, response 1508 may indicate whether the window was successfully opened, and if so, may include a window handle for the opened window. Furthermore, response 1506 may indicate whether a "move window" command, a "close window" command, a "move window" command, a "resize window" command, a "rotate window" command, or other command included in a request 608 was successful.

C. Example User Input Interface Embodiments

As described above, user input interface 402 receives user input to enable persons to interact with display devices associated with device 412. For example, via user input interface 402, a user may be enabled to move displayed graphical objects (e.g., icons, windows, etc.), may be able to modify (e.g., rotate, resize, etc.) displayed graphical objects, to interact with displayed controls, etc. User input interface 402 may provide a command-line interface, a GUI, and/or other interface with which the user can interact. In embodiments, user input interface 402 may enable users to adjust three-dimensional characteristics of displayed three-dimensional content. For example, user input interface 402 may enable three-dimensionality of displayed content to be turned on or off (e.g., to toggle between two-dimensionality and three-dimensionality). User input interface 402 may enable a degree of three-dimensionality of displayed content to be modified (e.g., increased or decreased, such as by changing a depth of three-dimensionality, increasing or decreasing a number of supplied camera views, etc.), may enable three-dimensional objects to be rotated in three-dimensions, and/or may enable further types of adjustment to three-dimensional characteristics of displayed three-dimensional content. Furthermore, user input interface 402 may enable other characteristics of displayed content to be modified, such as modifying contrast, brightness, etc.

For instance, FIG. 16 shows a flowchart 1600 providing a process for interfacing a user with a display device, according to an exemplary embodiment. Flowchart 1600 is described with respect to FIG. 17, which shows a block diagram where a user may be enabled to be interfaced with display device 606 by OS 400, according to an exemplary embodiment. Further structural and operational embodiments will be apparent to persons skilled in the relevant art(s) based on the discussion regarding flowchart 1600. Flowchart 1600 is described as follows.

Flowchart 1600 begins with step 1602. In step 1602, an input signal is received from a user input interface. For example, as shown in FIG. 17, a user may interact with user input interface 402 to provide user input. User input interface 402 generates an input signal 1704 based on the user input, which is received by display driver interface 410. Display driver interface 410 passes input signal 1704 to display driver 618 as input signal 1706.

In embodiments, the user may interact with user input interface 402 in various ways, including using a mouse/pointing device to move a displayed pointer/cursor. The pointer may be used to "click and drag" objects to move them, to resize objects, to rotate objects, to select controls/settings, to open a pop-up menu, etc. In other embodiments, the user may interact with a keyboard, a thumb wheel or other wheel, a roller ball, a stick pointer, a touch sensitive display, any number of virtual interface elements (e.g., such as a keyboard or other user interface element displayed by screen 620), a voice recognition system, and/or other user interface elements described elsewhere herein or otherwise known to provide user input. For instance, user input interface 402 may support a touch screen that is reactive to user finger touches to the screen to cause three-dimensional characteristics of displayed objects to be modified. For instance, particular motions of one or more figures against the screen may cause object resizing, 3D rotation, movement in 3D, etc. (e.g., touching two fingers to the screen, and dragging them together may be interpreted as "grabbing" a window and moving the window in 3D).

In step 1604, a control signal is generated in response to the input signal, the control signal relating to a three-dimensional characteristic. For instance, as shown in FIG. 17, display driver 618 generates a control signal 1708 based on input signal 1706. In an embodiment, control signal 1708 relates to a three-dimensional characteristic. For instance, control signal 1708 may relate to selecting and/or modifying a three-dimensional characteristic indicated by a user interacting with user input interface 402.

In step 1606, the control signal is delivered to cause the adjustment of the three-dimensional characteristic of a three-dimensional content being displayed within the region of the screen. For example, as shown in FIG. 17, display device 606 receives control signal 1708. Control signal 1708 causes an adjustment of the three-dimensional characteristic of three-dimensional content displayed in a region of screen 620 (e.g., by causing a device driver circuit to generate corresponding drive signals).

For example, in step 1602 of flowchart 1600, a user may interact with one of regions 1202-1218, and/or with an object displayed within one of regions 1202-1218. The user may resize a region and/or object that is displayed as three-dimensional, may rotate a region and/or object that is displayed as three-dimensional, may move a region and/or object that is displayed as three-dimensional in any of the three degrees (e.g., left-right, up-down, or forward-backward in FIG. 12A) from a first screen region to a second screen region, may change a degree of three-dimensionality of a region and/or object that is displayed as three-dimensional (e.g., reducing or increasing a number of associated camera views), etc. In step 1604, a control signal is generated to adjust the three-dimensional characteristic of the three-dimensional content being displayed, and in step 1606, the control signal is delivered to the display screen to cause the adjustment of the three-dimensional characteristic to occur.

D. Example Operating System Start Up Embodiments

In embodiments, users may have preferences with regard to a display environment upon powering on and/or logging into a device. Such preferences may include preferences with regard to display of three-dimensional content. For example, a user may desire for a television to power up in a two-dimensional or three-dimensional display mode, and if a three-dimensional display mode is desired, the user may have particular three-dimensional display preferences (e.g., a preferred degree of displayed three-dimensionality). In another example, with regard to a computer, a user may desire for the user's desktop environment to load with particular two-dimensional and/or three-dimensional display preferences. For instance, the user may desire for the desktop background to be displayed in two- or three-dimensions, may desire icons representing various executable applications to be displayed in two-dimensions and/or three-dimensions, etc. Furthermore, for each of the objects and/or regions displayed in three-dimensions, the user may have particular three-dimensional display preferences.

Embodiments enable display preferences to be set by users, and to be used to configure the display environments of users upon device boot up and/or user login. For instance, FIG. 18 shows a block diagram of an electronic device 1802 coupled to display device 606, according to an exemplary embodiment. Device 1802 is an example of device 412 of FIG. 4A. As shown in FIG. 18, device 1802 includes a processor 1804, a memory 1806, and storage 1808. Device 1802 may include additional features that are not shown in FIG. 18 for ease of illustration. Display device 606 may be included in or may be external to device 1802. Device 1802 may be any of the electronic devices mentioned herein as including an operating system, or may be an alternative device. The features of device 1802 shown in FIG. 18 are described as follows.

Memory 1806 may include one or more random access memory (RAM) devices, one or more read only memory (ROM) devices, and/or other memory devices. As shown in FIG. 18, memory 1806 stores a boot loader 1810. Boot loader 1810 may be a relatively short program that initiates a sequence of loading operations into memory 1806 when device 1802 is first powered on. For example, at power on of device 1802, boot loader 1810 may be executed by processor 1804 to begin the loading sequence. Processor 1804 may include one or more processors and/or further processing logic. During the loading sequence defined by boot loader 1810, operating system 1812 is caused to be loaded from storage 1808 into memory 1806. Once loaded into memory 1806, operating system 1812 may be executed by processor 1804. Storage 1808 may include one or more non-volatile storage devices, such as a hard disk drive, a CDROM (compact disc ROM), a DVD (digital video disc), a flash memory card (e.g., an SD (secure digital) card), a USB (universal serial bus) flash drive, etc. Operating system 1812 is an example of operating system 400 described above.

Operating system 1812 may include a graphical user interface (GUI) generator (e.g., in user input interface 402) used to render graphical user interfaces for users. For instance, FIG. 19 shows a block diagram of operating system 1812, according to an exemplary embodiment. As shown in FIG. 19, operating system 1812 includes a GUI generator 1902 and a boot up module 1904. At power up, GUI generator 1902 may generate a GUI environment for a user according to boot up module 1904. For example, when device 1802 is a computer, GUI generator 1902 may use boot up module 1904 to determine a desired desktop environment for the user. For instance, GUI generator 1902 may execute boot up module 1904 at power up. Boot up module 1904 may determine default GUI environment preferences (e.g., which may be stored in users preferences 1814 (FIG. 18) as default device GUI environment preferences), and may determine the user's preferences for the GUI environment (e.g., a user's desktop environment), and GUI generator 1902 may generate the GUI environment accordingly.

For example, as shown in FIG. 18, storage 1808 may store user preferences 1814 and user accounts 1816. User preferences 1814 may include display preferences for one or more users, including preferences with regard to three-dimensional display characteristics of displayed objects and/or screen regions. User accounts 1816 may be present when users have associated login accounts for logging into device 1802. In an embodiment, user accounts 1816 may be created for users, and during their creation, user preferences 1814 may be associated with user accounts 1816. Furthermore, subsequent to creation of a user account, a user may be enabled to adjust their preferences stored in their user preferences associated with their user account. When device 1802 is powered up, boot up module 1904 may access default device preferences and user preferences for the user, and GUI generator 1902 may configure screen 606 according to the accessed default and/or user preferences 1814. In an embodiment, boot up module 1904 may identify the user by a user account of user accounts 1816 into which the user may login, and the user account for the user may reference the preferences of the user in user preferences 1814. User preferences 1814 for a user may indicate a desktop preference that indicates a preference for two-dimensional display or three-dimensional display of the user's desktop. User preferences 1814 may include further two-dimensional display and/or three-dimensional display preferences for users, such as display preferences for icons, windows, file folders/directory structures, regions, screen savers, desktop background, etc.

Thus, upon boot up, GUI generator 1902 may generate a GUI environment displayed in screen 620 for the user. GUI generator 1902 may execute boot up module 1904 to determine user preferences for the user (e.g., user preferences associated with a user account of the user). Furthermore, in an embodiment, boot up module 1904 may be configured to determine display capabilities of screen 620. For instance, boot up module 1904 may perform a handshake with screen 620 on boot up to determine a three-dimensional display capability of screen 620. GUI generator 1902 may then configure the GUI environment according to the determined capabilities of screen 620 and the preferences of the user. For instance, the user preferences of the user may include three-dimensional display characteristics that are beyond the determined capabilities of screen 620. In such case, GUI generator 1902 may use determined default display characteristics (e.g., two-dimensional and/or three-dimensional) instead of the determined user preferences. Furthermore, in embodiments, three-dimensional characteristics of screen 620 may be selected based on other factors, including selecting/modifying an aspect of the display of the three-dimensional content based on change in a data rate of a received three-dimensional content data stream, and/or other factors.

E. Example Display Device Screen Embodiments

Embodiments described herein for operating systems that support the display of two-dimensional and three-dimensional content may be implemented with respect to various types of display devices. For example, as described above, some display screens are configured for displaying two-dimensional content, although they may display two-dimensional images that may be combined to form three-dimensional images by special glasses worn by users. Some other types of display screens are capable of display two-dimensional content and three-dimensional content without the users having to wear special glasses using techniques of autostereoscopy.

As described above, display devices, such as display device 606, may be implemented in various ways. For instance, display device 606 may be a television display (e.g., an LCD (liquid crystal display) television, a plasma television, etc.), a computer monitor, or any other type of display device. Display device 606 may include any suitable type or combination of light and image generating devices, including an LCD screen, a plasma screen, an LED (light emitting device) screen (e.g., an OLED (organic LED) screen), etc. Furthermore, display device 606 may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, display device 606 may include any suitable light emitting device as backlighting, including a panel of LEDs or other light emitting elements.

For instance, FIG. 20 shows a block diagram of a display device 2000, according to an exemplary embodiment. As shown in FIG. 20, display device 2000 includes a screen 2002. Display device 2000 is an example of display device 606 and screen 2002 is an example of screen 620 described above (e.g., with respect to FIG. 6). Device 2000 receives one or more control signals 2006 (e.g., from OS 400) that are configured to place screen 620 in a desired display mode (e.g., either a two-dimensional display mode or a three-dimensional display mode). As shown in FIG. 20, screen 2004 includes a light manipulator 2004. Light manipulator 2004 is configured to manipulate light that passes through light manipulator 2004 to enable three-dimensional images to be delivered to users in a viewing space. For instance, control signal(s) 2006 may be configured to activate or deactivate light manipulator 2004 to place screen 620 in a three-dimensional display mode or a two-dimensional display mode, respectively.

Examples of light manipulator 2004 include a parallax barrier and a lenticular lens. For instance, light manipulator 2004 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 2004 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 20, display device 2000 receives a content signal 2008 (e.g., from device 412 of FIG. 4A, or other electronic device). Content signal 2008 includes two-dimensional or three-dimensional content for display by screen 2002, depending on the particular display mode. In the embodiment of FIG. 20, light manipulator 2004 is physically fixed—is not adaptable. As such, when present, light manipulator 2004 (e.g., a fixed parallax barrier or a fixed lenticular lens) always delivers three-dimensional images of a particular type to a particular region in a viewing space. As such, light manipulator 2004 is not adaptable to deliver other types of three-dimensional images and/or to deliver two and/or three-dimensional images to multiple different regions of a viewing space.

In contrast, FIG. 21 shows a block diagram of a display device 2100 that is adaptable, according to an exemplary embodiment. As shown in FIG. 21, display device 2102 includes a screen 2102. Display device 2100 is an example of display device 606 and screen 2102 is an example of screen 620 described above (e.g., with respect to FIG. 6). Furthermore, as shown in FIG. 21, screen 2102 includes an adaptable light manipulator 2104. Adaptable light manipulator 2104 is configured to manipulate light that passes through adaptable light manipulator 2104 to enable three-dimensional images to be delivered to users in a viewing space. Furthermore, adaptable light manipulator 2104 is adaptable—is not physically fixed in configuration. As such, adaptable light manipulator 2104 is adaptable to deliver multiple different types of three-dimensional images and/or to deliver three-dimensional images to different/moving regions of a viewing space. Furthermore, in an embodiment, different regions of adaptable light manipulator 2104 may be adaptable such that multiple two-dimensional and/or three-dimensional images may be simultaneously delivered by screen 2102 to the viewing space.

Device 2100 receives one or more control signals 2106 (e.g., from OS 400) that are configured to place screen 2102 in a desired display mode (e.g., either a two-dimensional display mode or a three-dimensional display mode), and/or to configure three-dimensional characteristics of any number and type as described above, such as configuring adaptable light manipulator 2104 to deliver different types of three-dimensional images, to deliver three-dimensional images to different/moving regions of a viewing space, and to deliver two-dimensional and/or three-dimensional images from any number of regions of screen 2102 to the viewing space.

As shown in FIG. 21 display device 2100 receives a content signal 2108 (e.g., from device 412 of FIG. 4A, or other electronic device). Content signal 2108 includes two-dimensional and/or three-dimensional content for display by screen 2102, depending on the particular display mode and on the number of regions of screen 2102 that are delivering different two- or three-dimensional views to a viewing space.

Content signals 2008 and 2108 may include video content according to any suitable format. For example, content signals 2008 and 2108 may include video content delivered over an HDMI (High-Definition Multimedia Interface) interface, over a coaxial cable, as composite video, as S-Video, a VGA (video graphics array) interface, etc.

Exemplary embodiments for display devices 2000 and 2100 of FIGS. 21 and 22 are described as follows for purposes of illustration.

1. Exemplary Embodiments Using Parallax Barriers

Display devices 2000 and 2100 may include parallax barriers as light manipulators 2004 and 2104, respectively. For instance, FIG. 22 shows a block diagram of a display system 2200, which is an example of display device 606, according to an embodiment. As shown in FIG. 22, system 2200 includes a display device driver circuit 2202, an image generator 2212, and parallax barrier 2220. As shown in FIG. 22, image generator 2212 includes a pixel array 2208, and parallax barrier 2220 includes a barrier element array 2210. Furthermore, as shown in FIG. 22, display driver circuit 2202 includes a pixel array driver circuit 2204 and a barrier array driver circuit 2206. These features of system 2200 are described as follows.

Pixel array 2208 includes a two-dimensional array of pixels (e.g., arranged in a grid or other distribution). Pixel array 2208 is a self-illuminating or light-generating pixel array such that the pixels of pixel array 2208 each emit light included in light 2252 emitted from image generator 2212. Each pixel may be a separately addressable light source (e.g., a pixel of a plasma display, an LCD display, an LED display such as an OLED display, or of other type of display). Each pixel of pixel array 2208 may be individually controllable to vary color and intensity. In an embodiment, each pixel of pixel array 2208 may include a plurality of sub-pixels that correspond to separate color channels, such as a trio of red, green, and blue sub-pixels included in each pixel.

Parallax barrier 2220 is positioned proximate to a surface of pixel array 2208. Barrier element array 2210 is a layer of parallax barrier 2220 that includes a plurality of barrier elements or blocking regions arranged in an array. Each barrier element of the array is configured to be selectively opaque or transparent. Combinations of barrier elements may be configured to be selectively opaque or transparent to enable various effects. For example, in one embodiment, each barrier element may have a round, square, or rectangular shape, and barrier element array 2210 may have any number of rows of barrier elements that extend a vertical length of barrier element array 2210. In another embodiment, each barrier element may have a "band" shape that extends a vertical length of barrier element array 2210, such that barrier element array 2210 includes a single horizontal row of barrier elements. Each barrier element may include one or more of such bands, and different regions of barrier element array may include barrier elements that include different numbers of such bands.

One advantage of such a configuration where barrier elements extend a vertical length of barrier element array 2210 is that such barrier elements do not need to have spacing between them because there is no need for drive signal routing in such space. For instance, in a two-dimensional LCD array configuration, such as TFT (thin film transistor) display, a transistor-plus-capacitor circuit is typically placed onsite at the corner of a single pixel in the array, and drive signals for such transistors are routed between the LCD pixels (row-column control, for example). In a pixel configuration for a parallax barrier, local transistor control may not be necessary because barrier elements may not need to be changing as rapidly as display pixels (e.g., pixels of pixel array 2208). For a single row of vertical bands of barrier elements, drive signals may be routed to the top and/or bottom of barrier elements. Because in such a configuration drive signal routing between rows is not needed, the vertical bands can be arranged side-by-side with little-to-no space in between. Thus, if the vertical bands are thin and oriented edge-to-edge, one band or multiple adjacent bands (e.g., five bands) may comprise a barrier element in a blocking state, followed by one band or multiple adjacent bands (e.g., two bands) that comprise a barrier element in a non-blocking state (a slit), and so on. In the example of five bands in a blocking state and two bands in a non-blocking state, the five bands may combine to offer a single black barrier element of approximately 2.5 times the width of a single transparent slit with no spaces therein.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Display driver circuit 2202 receives control signal 2222 and content signal 2224. As described below, content signal 2224 includes two-dimensional and/or three-dimensional content for display. Control signal 2222 may be control signal 2006 of FIG. 20 (for a non-adaptable parallax barrier 2220) or may be control signal 2106 of FIG. 21 (for an adaptable parallax barrier 2220). Control signal 2222 may be received from a display driver of an operating system (e.g., may be control signal 614 received from display driver 618 of OS 400 in FIG. 6). Display driver circuit 2202 is configured to generate drive signals based on control signal 2222 and content signal 2224 to enable display system 2200 to display two-dimensional and three-dimensional images to users 2218 in viewing space 2270. For example, pixel array driver circuit 2204 is configured to generate a drive signal 2214 that is received by pixel array 2208 (e.g., based on content signal 2224 and/or control signal 2222). Drive signal 2214 may include one or more drive signals used to cause pixels of pixel array 2208 to emit light 2252 of particular desired colors and/or intensity. Barrier array driver circuit 2206 is configured to generate a drive signal 2216 that is received by barrier element array 2210 (e.g., based on control signal 2222). Drive signal 2216 may include one or more drive signals used to cause each of the barrier elements of barrier element array 2210 to be transparent or opaque. In this manner, barrier element array 2210 filters light 2252 to generate filtered light 2272 that includes one or more two-dimensional and/or three-dimensional images that may be viewed by users 2218 in viewing space 2270.

For example, drive signal 2214 may control sets of pixels of pixel array 2208 to each emit light representative of a respective image, to provide a plurality of images. Drive signal 2216 may control barrier elements of barrier element array 2210 to filter the light received from pixel array 2208 according to the provided images such that one or more of the images are received by users 2218 in two-dimensional form. For instance, drive signal 2216 may select one or more sets of barrier elements of barrier element array 2210 to be transparent, to transmit one or more corresponding two-dimensional images or views to users 2218. Furthermore, drive signal 2216 may control sections of barrier element array 2210 to include opaque and transparent barrier elements to filter the light received from pixel array 2208 so that one or more pairs of images or views provided by pixel array 2208 are each received by users 2218 as a corresponding three-dimensional image or view. For example, drive signal 2216 may select parallel strips of barrier elements of barrier element array 2210 to be transparent to form slits that enable three-dimensional images to be received by users 2218.

In embodiments, drive signal 2216 may be generated by barrier array driver circuit 2206 to configure one or more characteristics of barrier element array 2210. For example, drive signal 2216 may be generated to form any number of parallel strips of barrier elements of barrier element array 2210 to be transparent, to modify the number and/or spacing of parallel strips of barrier elements of barrier element array 2210 that are transparent, to select and/or modify a width and/or a length (in barrier elements) of one or more strips of barrier elements of barrier element array 2210 that are transparent or opaque, to select and/or modify an orientation of one or more strips of barrier elements of barrier element array 2210 that are transparent, to select one or more areas of barrier element array 2210 to include all transparent or all opaque barrier elements, etc.

FIG. 23 shows a block diagram of a display system 2300, which is another example of display device 2100 of FIG. 21, according to an embodiment. As shown in FIG. 23, system 2300 includes display device driver circuit 2202, a pixel array 2322, parallax barrier 2220, and a backlighting 2316. Parallax barrier 2220 includes barrier element array 2210 and backlighting 2316 includes a light element array 2336. Furthermore, display driver circuit 2202 includes a pixel array driver circuit 2328, barrier array driver circuit 2206, and a light source driver circuit 2330. These features of system 2300 are described as follows.

Backlighting 2316 is a backlight panel that emits light 2338. Light element array 2336 (or "backlight array") of backlighting 2316 includes a two-dimensional array of light sources. Such light sources may be arranged, for example, in a rectangular grid. Each light source in light element array 2336 is individually addressable and controllable to select an amount of light emitted thereby. A single light source may comprise one or more light-emitting elements depending upon the implementation. In one embodiment, each light source in light element array 2336 comprises a single light-emitting diode (LED) although this example is not intended to be limiting. Further description of implementations of backlighting 2316 and other backlighting implementations described herein is provided in pending U.S. Patent Appl. No. 12/982,020, titled "Backlighting Array Supporting Adaptable Parallax Barrier," filed on same date herewith, which is incorporated by reference herein in its entirety.

Parallax barrier 2220 is positioned proximate to a surface of backlighting 2316 (e.g., a surface of the backlight panel). As described above, barrier element array 2210 is a layer of parallax barrier 2220 that includes a plurality of barrier elements or blocking regions arranged in an array. Each barrier element of the array is configured to be selectively opaque or transparent. Barrier element array 2210 filters light 2338 received from backlighting 2316 to generate filtered light 2340. Filtered light 2340 is configured to enable a two-dimensional image or a three-dimensional image (e.g., formed by a pair of two-dimensional images in filtered light 2272) to be formed based on images subsequently imposed on filtered light 2340 by pixel array 2322.

Similarly to pixel array 2208 of FIG. 22, pixel array 2322 of FIG. 23 includes a two-dimensional array of pixels (e.g., arranged in a grid or other distribution). However, pixel array 2322 is not self-illuminating, and instead is a light filter that imposes images (e.g., in the form of color, grayscale, etc.) on filtered light 2340 from parallax barrier 2220 to generate filtered light 2272 to include one or more images. Each pixel of pixel array 2322 may be a separately addressable filter (e.g., a pixel of a plasma display, an LCD display, an LED display, or of other type of display). Each pixel of pixel array 2322 may be individually controllable to vary the color imposed on the corresponding light passing through, and/or to vary the intensity of the passed light in filtered light 2272. In an embodiment, each pixel of pixel array 2322 may include a plurality of sub-pixels that correspond to separate color channels, such as a trio of red, green, and blue sub-pixels included in each pixel.

Display driver circuit 2202 of FIG. 23 is configured to generate drive signals based on control signal 2222 and/or content signal 2224 to enable display system 2300 to display two-dimensional and three-dimensional images to users 2218 in viewing space 2270. For example, light source driver circuit 2330 within display driver circuit 2202 controls the amount of light emitted by each light source in light element array 2336 by generating a drive signal 2334 that is received by light element array 2336 (based on content signal 2224 and/or control signal 2222). Drive signal 2334 may include one or more drive signals used to control the amount of light emitted by each light source in light element array 2336 to generate light 2338. As described above, barrier array driver circuit 2206 is configured to generate drive signal 2216 received by barrier element array 2210 (e.g., based on control signal 2222). Drive signal 2216 may include one or more drive signals used to cause each of the barrier elements of barrier element array to be transparent or opaque, to filter light 2338 to generate filtered light 2340. Pixel array driver circuit 2328 is configured to generate a drive signal 2332 that is received by pixel array 2322 (e.g., based on content signal 2224 and/or control signal 2222). Drive signal 2332 may include one or more drive signals used to cause pixels of pixel array 2322 to impose desired images (e.g., colors, grayscale, etc.) on filtered light 2340 as it passes through pixel array 2322. In this manner, pixel array 2322 generates filtered light 2272 that includes one or more two-dimensional and/or three-dimensional images that may be viewed by users 2218 in viewing space 2270.

For example, drive signal 2334 may control sets of light sources of light element array 2336 to emit light 2338. Drive signal 2216 may control barrier elements of barrier element array 2210 to filter light 2338 received from light element array 2336 to enable filtered light 2340 to enable two- and/or three-dimensionality. Drive signal 2332 may control sets of pixels of pixel array 2322 to filter filtered light 2340 according to respective images, to provide a plurality of images. For instance, drive signal 2216 may select one or more sets of the barrier elements of barrier element array 2210 to be transparent, to enable one or more corresponding two-dimensional images to be delivered to users 2218. Furthermore, drive signal 2216 may control sections of barrier element array 2210 to include opaque and transparent barrier elements to filter the light received from light element array 2336 so that one or more pairs of images provided by pixel array 2322 are each enabled to be received by users 2218 as a corresponding three-dimensional image. For example, drive signal 2216 may select parallel strips of barrier elements of barrier element array 2210 to be transparent to form slits that enable three-dimensional images to be received by users 2218.

FIG. 24 shows a flowchart 2400 for generating images that are delivered to users in a viewing space, according to an exemplary embodiment. Flowchart 2400 may be performed by system 2200 in FIG. 22 or system 2300 of FIG. 23, for example. Flowchart 2400 is described with respect to FIG. 25, which shows a cross-sectional view of a display system 2500. Display system 2500 is an exemplary embodiment of system 2200 shown in FIG. 22, and is shown for purposes of illustration. As shown in FIG. 25, system 2500 includes a pixel array 2502 and a barrier element array 2504. In another embodiment, system 2500 may further include backlighting in a configuration similar to display system 2300 of FIG. 23. Further structural and operational embodiments will be apparent to persons skilled in the relevant art(s) based on the discussion regarding flowchart 2400. Flowchart 2400 is described as follows.

Flowchart 2400 begins with step 2402. In step 2402, light is received at an array of barrier elements. For example, as shown in FIG. 22, light 2252 is received at parallax barrier 2220 from pixel array 2208. Each pixel of pixel array 2208 may generate light that is received at parallax barrier 2220. Depending on the particular display mode of parallax barrier 2220, parallax barrier 2220 may filter light 2252 from pixel array 2208 to generate a two-dimensional image or a three-dimensional image viewable in viewing space 2270 by users 2218. As described above with respect to FIG. 23, alternatively, light 2338 may be received by parallax barrier 2220 from light element array 2336.

In step 2404, a first set of the barrier elements of the array of barrier elements is configured in the blocking state and a second set of the barrier elements of the array of barrier elements is configured in the non-blocking state to enable a viewer to be delivered a three-dimensional view. Three-dimensional image content may be provided for viewing in viewing space 2270. In such case, referring to FIG. 22 or 23, barrier array driver circuit 2206 may generate drive signal 2216 to configure barrier element array 2210 to include transparent strips of barrier elements to enable a three-dimensional view to be formed. For example, as shown in FIG. 25, barrier element array 2504 includes a plurality of barrier elements that are each either transparent (in a non-blocking state) or opaque (in a blocking state). Barrier elements that are blocking are indicated as barrier elements 2510*a*-2510*f*, and barrier elements that are non-blocking are indicated as barrier elements 2512*a*-2512*e*. Further barrier elements may be included in barrier element array 2504 that are not visible in FIG. 25. Each of barrier elements 2510*a*-2510*f* and 2512*a*-2512*e* may include one or more barrier elements. Barrier elements 2510 alternate with barrier elements 2512 in series in the order of barrier elements 2510*a*, 2512*a*, 2510*b*, 2512*b*, 2510*c*, 2512*c*, 2510*d*, 2512*d*, 2510*e*, 2512*e*, and 2510*f*. In this manner, blocking barrier elements 2510 are alternated with non-blocking barrier elements 2512 to form a plurality of parallel non-blocking or transparent slits in barrier element array 2504.

For instance, FIG. 26 shows a view of a parallax barrier 2600 with transparent slits, according to an exemplary embodiment. Parallax barrier 2600 is an example of parallax barrier 2220 of FIGS. 22 and 23. As shown in FIG. 26, parallax barrier 2600 includes barrier element array 2602, which includes a plurality of barrier elements 2604 arranged in a two-dimensional array. Furthermore, as shown in FIG. 26, barrier element array 2602 includes a plurality of parallel strips of barrier elements 2604 that are selected to be non-blocking to form a plurality of parallel non-blocking strips (or "slits") 2606*a*-2606*g*. As shown in FIG. 26, parallel non-blocking strips 2606*a*-2606*g* (non-blocking slits) are alternated with parallel blocking or blocking strips 2608*a*-2608*g* of barrier elements 2604 that are selected to be blocking. In the example of FIG. 26, non-blocking strips 2606*a*-2606*g* and blocking strips 2608*a*-2608*g* each have a width (along the x-dimension) of two barrier elements 2604, and have lengths that extend along the entire y-dimension (twenty barrier elements 2604) of barrier element array 2602, although in other embodiments, may have alternative dimensions. Non-blocking strips 2606*a*-2606*g* and blocking strips 2608*a*-2608*g* form a parallax barrier configuration for parallax barrier 300. The spacing (and number) of parallel non-blocking strips 2606 in barrier element array 2602 may be selectable by choosing any number and combination of particular strips of barrier elements 2604 in barrier element array 2602 to be non-blocking, to be alternated with blocking strips 2608, as desired. For example, hundreds, thousands, or even larger numbers of non-blocking strips 2606 and blocking strips 2608 may be present in parallax barrier 300.

FIG. 27 shows a parallax barrier 2700 that is another example of parallax barrier 2220 with parallel transparent slits, according to an embodiment. Similarly to parallax barrier 2600 of FIG. 26, parallax barrier 2700 has includes a barrier element array 2712, which includes a plurality of barrier elements 2714 arranged in a two-dimensional array (28 by 1 array). Barrier elements 2714 have widths (along the x-dimension) similar to the widths of barrier elements 2604 in FIG. 26, but have lengths that extend along the entire vertical length (y-dimension) of barrier element array 2714. As shown in FIG. 27, barrier element array 2712 includes parallel non-blocking strips 2606*a*-2606*g* alternated with parallel blocking strips 2608*a*-2608*g*. In the example of FIG. 27, parallel non-blocking strips 2606*a*-2606*g* and parallel blocking strips 2608*a*-2608*g* each have a width (along the x-dimension) of two barrier elements 2714, and have lengths that extend along the entire y-dimension (one barrier element 314) of barrier element array 2712.

Referring back to FIG. 24, in step 2406, the light is filtered at the array of barrier elements to form the three-dimensional view in a viewing space. Barrier element array 2210 of parallax barrier 2220 is configured to filter light 2252 received from pixel array 2208 (FIG. 22) or light 2338 received from light element array 2336 (FIG. 23) according to whether barrier element array 2210 is transparent or non-blocking (e.g., in a two-dimensional mode) or includes parallel non-blocking strips (e.g., in a three-dimensional mode). If one or more regions of barrier element array 2210 are transparent, those regions of barrier element array 2210 function as "all pass" filters to substantially pass all of light 2252 as filtered light 2272 to deliver one or more corresponding two-dimensional images generated by pixel array 2208 to viewing space 2270, to be viewable as a two-dimensional images in a similar fashion as a conventional display. If barrier element array 2210 includes one or more regions having parallel non-blocking strips (e.g., as shown for barrier element array 2602 in FIGS. 26 and 27), those regions of barrier element array 2210 pass a portion of light 2252 as filtered light 2272 to deliver one or more corresponding three-dimensional images to viewing space 2270.

For example, as shown in FIG. 25, pixel array 2502 includes a plurality of pixels 2514*a*-2514*d* and 2516*a*-2516*d*. Pixels 2514 alternate with pixels 2516, such that pixels 2514*a*-2514*d* and 2516*a*-2516*d* are arranged in series in the order of pixels 2514*a*, 2516*a*, 2514*b*, 2516*b*, 2514*c*, 2516*c*, 2514*d*, and 2516*d*. Further pixels may be included in pixel array 2502 that are not visible in FIG. 25, including further pixels along the width dimension of pixel array 2502 (e.g., in the left-right directions) as well as pixels along a length dimension of pixel array 2502 (not visible in FIG. 25). Each of pixels 2514a-2514d and 2516a-2516d generates light, which emanates from display surface 2524 of pixel array 2502 (e.g., generally upward in FIG. 25) towards barrier element array 2504. Some example indications of light emanating from pixels 2514a-2514d and 2516a-2516d are shown in FIG. 25 (as dotted lines), including light 2524a and light 2518a emanating from pixel 2514a, light 2524b, light 2518b, and light 2524c emanating from pixel 2514b, etc.

Furthermore, light emanating from pixel array 2502 is filtered by barrier element array 2504 to form a plurality of images in a viewing space 2526, including a first image 2506a at a first location 2508a and a second image 2506b at a second location 2508b. A portion of the light emanating from pixel array 2502 is blocked by blocking barrier elements 2510, while another portion of the light emanating from pixel array 2502 passes through non-blocking barrier elements 2512, according to the filtering by barrier element array 2504. For instance, light 2524a from pixel 2514a is blocked by blocking barrier element 2510a, and light 2524b and light 2524c from pixel 2514b are blocked by blocking barrier elements 2510b and 2510c, respectively. In contrast, light 2518a from pixel 2514a is passed by non-blocking barrier element 2512a and light 2518b from pixel 2514b is passed by non-blocking barrier element 2512b.

By forming parallel non-blocking slits in a barrier element array, light from a pixel array can be filtered to form multiple images or views in a viewing space. For instance, system 2500 shown in FIG. 25 is configured to form first and second images 2506a and 2506b at locations 2508a and 2508b, respectively, which are positioned at a distance 2528 from pixel array 2502 (as shown in FIG. 25, further instances of first and second images 2506a and 2506b may be formed in viewing space 2526 according to system 2500, in a repeating, alternating fashion). As described above, pixel array 2502 includes a first set of pixels 2514a-2514d and a second set of pixels 2516a-2516d. Pixels 2514a-2514d correspond to first image 2506a and pixels 2516a-2516d correspond to second image 2506b. Due to the spacing of pixels 2514a-2514d and 2516a-2516d in pixel array 2502, and the geometry of non-blocking barrier elements 2512 in barrier element array 2504, first and second images 2506a and 2506b are formed at locations 2508a and 2508b, respectively. As shown in FIG. 25, light 2518a-2518d from the first set of pixels 2514a-2514d is focused at location 2508a to form first image 2506a at location 2508a. Light 2520a-2520d from the second set of pixels 2516a-2516d is focused at location 2508b to form second image 2506b at location 2508b.

FIG. 25 shows a slit spacing 2522 (center-to-center) of non-blocking barrier elements 2512 in barrier element array 2504. Spacing 2522 may be determined to select locations for parallel non-blocking slits to be formed in barrier element array 2504 for a particular image distance 2528 at which images are desired to be formed (for viewing by users). For example, in an embodiment, if a spacing of pixels 2514a-2514d corresponding to an image is known, and a distance 2528 at which the image is desired to be displayed is known, the spacing 2522 between adjacent parallel non-blocking slits in barrier element array 2504 may be selected.

First and second images 2506a and 2506b are configured to be perceived by a user as a three-dimensional image or view. For example, a viewer may receive first image 2506a at a first eye location and second image 2506b at a second eye location, according to an exemplary embodiment. First and second images 2506a and 2506b may be generated by first set of pixels 2514a-2514d and second set of pixels 2516a-2516d as images that are slightly different perspective from each other. Images 2506a and 2506b are combined in the visual center of the brain of the viewer to be perceived as a three-dimensional image or view. In such an embodiment, first and second images 2506a and 2506b may be formed by display system 2500 such that their centers are spaced apart a width of a user's pupils (e.g., an "interocular distance").

Note that in the embodiments of FIGS. 26 and 27, the entire regions of parallax barriers 2600 and 2700 are filled with parallel non-blocking strips (e.g., as shown for barrier element array 2602 in FIGS. 26 and 27) to be configured to deliver three-dimensional images to viewing space 2270. In further embodiments, one or more regions of a parallax barrier may be filled with parallel non-blocking strips to deliver three-dimensional images, and one or more other regions of the parallax barrier may be transparent to deliver two-dimensional images. Furthermore, different regions of a parallax barrier that have parallel non-blocking strips may have the parallel non-blocking strips oriented at different angles to deliver three-dimensional images to viewers that are oriented differently.

For instance, FIG. 28 shows a view of a parallax barrier 2800 configured to enable the simultaneous display of two-dimensional and three-dimensional images at different regions, according to exemplary embodiments. Parallax barrier 2800 is similar to parallax barrier 2600 of FIG. 26, having barrier element array 2602 including a plurality of barrier elements 2604 arranged in a two-dimensional array. In FIG. 28, a first region 2802 of barrier element array 2602 includes a plurality of parallel non-blocking strips alternated with parallel blocking strips that together fill first region 2802. A second region 2804 of barrier element array 2602 is surrounded by first region 2802. Second region 2804 is a rectangular shaped region of barrier element array 2602 that includes a two-dimensional array of barrier elements 2604 that are non-blocking. Thus, in FIG. 28, barrier element array 2602 is configured to enable a three-dimensional image to be generated by pixels of a pixel array that are adjacent to barrier elements of first region 2802, and to enable a two-dimensional image to be generated by pixels of the pixel array that are adjacent to barrier elements inside of second region 2804. Note that alternatively, first region 2802 may include all non-blocking barrier elements 2602 to pass a two-dimensional image, and second region 2804 may include parallel non-blocking strips alternated with parallel blocking strips to pass a three-dimensional image. In further embodiments, parallax barrier 2800 may have additional numbers, sizes, and arrangements of regions configured to pass different combinations of two-dimensional images and three-dimensional images.

In another example, FIG. 29 shows a view of a parallax barrier 2900 with transparent slits having different orientations, according to an exemplary embodiment. Parallax barrier 2900 is similar to parallax barrier 2600 of FIG. 26, having barrier element array 2602 including a plurality of barrier elements 2604 arranged in a two-dimensional array. A first region 2910 (e.g., a bottom half) of barrier element array 2602 includes a first plurality of parallel strips of barrier elements 2604 that are selected to be non-blocking to form a first plurality of parallel non-blocking strips 2902a-2902e (each having a width of two barrier elements 2604). As shown in FIG. 29, parallel non-blocking strips 2902a-2902e are alternated with parallel blocking strips 2904a-2904f of barrier elements 2604 (each having a width of three barrier elements 2604). Parallel non-blocking strips 2902a-2902e are oriented in a first direction (e.g., along a vertical axis).

Furthermore, as shown in FIG. 29, a second region 2912 (e.g., a top half) of barrier element array 2602 includes a second plurality of parallel strips of barrier elements 2604 that are selected to be non-blocking to form a second plurality of parallel non-blocking strips 2906a-2906d (each having a width of one barrier element 2604). As shown in FIG. 29, parallel non-blocking strips 2906a-2906d are alternated with parallel blocking strips 2908a-2908c of barrier elements 2604 (each having a width of two barrier elements 2604). Parallel non-blocking strips 2906a-2906d are oriented in a second direction (e.g., along a horizontal axis).

As such, in FIG. 29, first and second pluralities of parallel non-blocking strips 2902a-2902e and 2906a-2906d are present in barrier element array 2602 that are oriented perpendicularly to each other. The region of barrier element array 2602 that includes first plurality of parallel non-blocking strips 2902a-2902e may be configured to deliver a three-dimensional image in a viewing space (as described above) to be viewable by a user whose body is oriented vertically (e.g., sitting upright or standing up). The region of barrier element array 2602 that includes second plurality of parallel non-blocking strips 2906a-2906d may be configured to deliver a three-dimensional image in a viewing space (as described above) to be viewable by a user whose body is oriented horizontally (e.g., laying down). In this manner, users who are oriented differently relative to each other can still each be provided with a corresponding three-dimensional image that accommodates their position.

As described above, in an embodiment, display device 2102 of FIG. 21 may be configured to generate a two-dimensional image for viewing by users in a viewing space. For instance, referring to FIGS. 22 and 23, barrier element array 2210 may be configured into a third configuration to deliver a two-dimensional view. In the third configuration, barrier array driver circuit 2206 may generate drive signal 2216 to configure each barrier element of barrier element array 2210 to be in the non-blocking state (transparent). If barrier element array 2210 is non-blocking, barrier element array 2210 functions as an "all pass" filter to substantially pass all of light 2252 (FIG. 22) or light 2338 (FIG. 23) as filtered light 2272 to deliver the two-dimensional image to viewing space 2270, to be viewable as a two-dimensional image in a similar fashion as a conventional display.

In embodiments, display systems may be configured to generate multiple two-dimensional images or views for viewing by users in a viewing space. For example, FIG. 30 shows a display system 3000 configured to deliver two two-dimensional images, according to an embodiment. Display system 3000 is configured similarly to display system 2500 of FIG. 25. As shown in FIG. 30, display system 3000 includes pixel array 2502 and barrier element array 2504, which generate first and second images 3002a and 3002b. As shown in FIG. 30, a first viewer 3004a receives first image 3002a at a first location and a second viewer 3004b receives second image 3002b at a second location, according to an exemplary embodiment. Similarly to the description provided above with respect to FIG. 25, first and second images 3002a and 3002b may be generated by first set of pixels 2514a-2514d and second set of pixels 2516a-2516d of pixel array 2502. However, rather than first and second images 3002a and 3002b being images that are of different perspective, first and second images 3002a and 3002b are each a two-dimensional image that may be viewed independently from each other. For instance, image 3002a and image 3002b may generated by display system 2500 from first media content and second media content, respectively, that are independent of each other. Image 3002a may be received by both eyes of first viewer 3004a to be perceived by first viewer 3004a as a first two-dimensional image, and image 3002b may be received by both eyes of second viewer 3004b to be perceived by second viewer 3004b as a second two-dimensional image. Thus, first and second images 3002a and 3002b may be generated to have a spacing that enables them to be separately viewed by first and second users 3004a and 3004b.

As such, display system 3000 of FIG. 30 can be configured to deliver a single three-dimensional view to a viewer (e.g., as shown in FIG. 25 for display system 2500), to deliver a pair of two-dimensional views to a pair of viewers (e.g., as shown in FIG. 30), or to deliver a pair of three-dimensional views to a pair of viewers as described above). Display system 3000 can be configured to switch between delivering views to one and two viewers by turning off or turning on, respectively, the display of media content by pixel array 2502 associated with one of the viewers (e.g., by turning off or on pixels 2516 associated with second image 3002b). Display system 3000 can be configured to switch between delivering two-dimensional and three-dimensional views by providing the corresponding media content type at pixel array 3002. Furthermore, display system 3000 may provide such capabilities when configured similarly to display system 2300 shown in FIG. 23 (e.g., including backlighting 2316).

In an embodiment, display system 2500 may be configured to generate multiple three-dimensional images that include related image content (e.g., each three-dimensional image is a different viewpoint of a common scene), or that each include unrelated image content, for viewing by users in a viewing space. Each of the three-dimensional images may correspond to a pair of images generated by pixels of the pixel array. The barrier element array filters light from the pixel array to form the image pairs in a viewing space to be perceived by users as three-dimensional images.

For instance, FIG. 31 shows a flowchart 3100 for generating multiple three-dimensional images, according to an exemplary embodiment. Flowchart 3100 is described with respect to FIG. 32, which shows a cross-sectional view of a display system 3200. Display system 3200 is an exemplary embodiment of system 2200 shown in FIG. 22, and is shown for purposes of illustration. As shown in FIG. 32, system 3200 includes a pixel array 3202 and a barrier element array 3204. System 3200 may also include display driver circuit 2202 of FIG. 22, which is not shown in FIG. 32 for ease of illustration. Further structural and operational embodiments will be apparent to persons skilled in the relevant art(s) based on the discussion regarding flowchart 3100. Flowchart 3100 is described as follows.

Flowchart 3100 begins with step 3102. In step 3102, light is received from an array of pixels that includes a plurality of pairs of sets of pixels. For instance, in the example of FIG. 32, pixel array 3202 includes a first set of pixels 3214a-3214d, a second set of pixels 3216a-3216d, a third set of pixels 3218a-3218d, and a fourth set of pixels 3220a-3220d. Each of pixels 3214a-3214d, 3216a-3216d, 3218a-3218d, 3220a-3220d generates light, which emanates from the surface of pixel array 3202 towards barrier element array 3204. Each set of pixels generates a corresponding image. First set of pixels 3214a-3214d and third set of pixels 3218a-3218d are configured to generate images that combine to form a first three-dimensional image. Second set of pixels 3216a-3216d and fourth set of pixels 3220a-3220d are configured to generate images that combine to form a second three-dimensional image. Pixels of the four sets of pixels are alternated in pixel array 3202 in the order of pixel 3214a, pixel 3216a, pixel 3218a, pixel 3220a, pixel 3214b, pixel 3216b, etc. Further pixels may be included in each set of pixels in pixel array 3202 that are not visible in FIG. 32, including hundreds, thousands, or millions of pixels in each set of pixels.

As described above, in the current embodiment, pixel array 3202 is segmented into a plurality of pairs of sets of pixels. For instance, in the example of FIG. 32, pixel array 3202 is segmented into four sets of pixels. The first set of pixels includes pixels 3214a-3214g and the other pixels in the same columns, the second set of pixels includes pixels 3216a-3216g and the other pixels in the same columns, pixels 3218a-3218g and the other pixels in the same columns, and pixels 3220a-3220g and the other pixels in the same columns.

In step 3104, a plurality of strips of barrier elements of a barrier element array is selected to be non-blocking to form a plurality of parallel non-blocking slits. As shown in FIG. 32, barrier element array 3204 includes barrier elements that are each either non-blocking or blocking. Barrier elements that are blocking are indicated as barrier elements 3210a-3210f, and barrier elements that are non-blocking are indicated as barrier elements 3212a-3212e. Further barrier elements may be included in barrier element array 3204 that are not visible in FIG. 32, including hundreds, thousands, or millions of barrier elements, etc. Each of barrier elements 3210a-3210f and 3212a-3212e may include one or more barrier elements. Barrier elements 3210 alternate with barrier elements 3212. In this manner, blocking barrier elements 3210 are alternated with non-blocking barrier elements 3212 to form a plurality of parallel non-blocking slits in barrier element array 3204.

In step 3106, the light is filtered at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images. As shown in FIG. 32, light emanating from pixel array 3202 is filtered by barrier element array 3204 to form a plurality of images in a viewing space 3226. For instance, four images are formed in viewing space 3226, including first-fourth images 3206a-3206d. Pixels 3214a-3214d correspond to first image 3206a, pixels 3216a-3216d correspond to second image 3206b, pixels 3218a-3218d correspond to third image 3206c, and pixels 3220a-3220d correspond to fourth image 3206d. As shown in FIG. 32, light 3222a-3222d from the first set of pixels 3214a-3214d forms first image 3206a, and light 3224a-3224d from the third set of pixels 3218a-3218d forms third image 3206c, due to the filtering of the non-blocking slits (corresponding to non-blocking barrier elements 3212a-3212e) in barrier element array 3204. Although not indicated in FIG. 32 (for ease of illustration), in a similar fashion, light from the second set of pixels 3216a-3216d forms second image 3206b, and light from the fourth set of pixels 3220a-3220d forms fourth image 3206d.

In the embodiment of FIG. 32, any pair of images of images 3206a-3206d may be configured to be perceived as a three-dimensional image by a user in viewing space 3226. For instance, first and third images 3206a and 3206c may be configured to be perceived by a user as a first three-dimensional image, such that first image 3206a is received at a first eye location and third image 3206c is received at a second eye location of a user. Furthermore, second and fourth images 3206b and 3206d may be configured to be perceived by a user as a second three-dimensional image, such that second image 3206b is received at a first eye location and fourth image 3206d is received at a second eye location of a user.

In the example of FIG. 32, two three-dimensional images are provided by system 3200. In further embodiments, further numbers of three-dimensional images may be provided, including a third three-dimensional image, a fourth three-dimensional image, etc. In such case, each three-dimensional image is generated by filtering light (using a barrier element array) corresponding to an image pair generated by a corresponding pair of sets of pixels of the pixel array, in a similar fashion as described with respect to FIG. 32 for two three-dimensional images. For example, to provide three three-dimensional images, pixel array 3202 may include fifth and sixth sets of pixels that generate fifth and sixth images, respectively, to be perceived by a user as a third three-dimensional image. To provide a fourth three-dimensional image, pixel array 3202 may include seventh and eighth sets of pixels that generate seventh and eighth images, respectively, to be perceived by a user as the fourth three-dimensional image.

In FIG. 32, the first and second three-dimensional images generated based on first and third images 3206a and 3206c and second and fourth images 3206b and 3206d, respectively, and any further three-dimensional images that may be generated, may include related image content or may each include unrelated image content. For example, in an embodiment, the first and second three-dimensional images (and any further three-dimensional images) may have been captured as different viewpoints of a common scene. Thus, a user in viewing space 3226 that moves laterally to sequentially view the first and second three-dimensional images (and any further three-dimensional images) may perceive being able to partially or fully "view behind" objects of the common scene.

Further description regarding using a parallax barrier to deliver three-dimensional views, including adaptable versions of parallax barriers, is provided in pending U.S. patent application Ser. No. 12/845,409, titled "Display With Adaptable Parallax Barrier," in pending U.S. patent application Ser. No. 12/845,440, titled "Adaptable Parallax Barrier Supporting Mixed 2D And Stereoscopic 3D Display Regions," and in pending U.S. patent application Ser. No. 12/845,461, titled "Display Supporting Multiple Simultaneous 3D Views," which are each incorporated by reference herein in their entireties.

2. Exemplary Embodiments Using Lenticular Lenses

In embodiments, as described herein, display devices 2000 and 2100 of FIGS. 20 and 21 may include one or more lenticular lenses as light manipulators 2004 and 2104 used to deliver three-dimensional images and/or two-dimensional images. For instance, display systems 2200 and 2300 of FIGS. 22 and 23 may each include a sub-lens array of a lenticular lens in place of parallax barrier 2220. For example, FIG. 33 shows a perspective view of a lenticular lens 3300 in accordance with an embodiment. As shown in FIG. 33, lenticular lens 3300 includes a sub-lens array 3302. Sub-lens array 3302 includes a plurality of sub-lenses 3304 arranged in a two-dimensional array (e.g., arranged side-by-side in a row). Each sub-lens 3304 is shown in FIG. 33 as generally cylindrical in shape and having a substantially semi-circular cross-section, but in other embodiments may have other shapes. In FIG. 33, sub-lens array 3302 is shown to include eight sub-lenses for illustrative purposes and is not intended to be limiting. For instance, sub-lens array 3302 may include any number (e.g., hundreds, thousands, etc.) of sub-lenses 3304. FIG. 34 shows a side view of lenticular lens 3300, oriented as lenticular lens 3300 may be positioned in system 2500 of FIG. 25 (in place of parallax barrier 2504) for lenticular lens 2502 to deliver three-dimensional views. In FIG. 34, light may be passed through lenticular lens 3300 in the direction of dotted arrow 3402 to be diverted.

In one embodiment, lenticular lens 3300 may be fixed in size. For example, light manipulator 2004 of FIG. 20 may include lenticular lens 3300 when fixed in size. In another embodiment, lenticular lens 3300 may be adaptable. For instance, light manipulator 2104 of FIG. 21 may include lenticular lens 3300 when adaptable. For instance, in an embodiment lenticular lens 3300 may be made from an elastic material. Such a lenticular lens 3300 may be adapted in size in response to generated drive signals.

Further description regarding using a lenticular lens to deliver three-dimensional views, including adaptable versions of lenticular lenses, is provided in pending U.S. patent application Ser. No. 12/774,307, titled "Display with Elastic Light Manipulator," which is incorporated by reference herein in its entirety.

3. Exemplary Embodiments Using Multiple Light Manipulators

Display devices 2000 and 2100 may include multiple layers of light manipulators in embodiments. Multiple three-dimensional images may be displayed in a viewing space using multiple light manipulator layers, according to embodiments. In embodiments, the multiple light manipulating layers may enable spatial separation of the images. For instance, in such an embodiment, for example, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In embodiments, a display device may be configured to display any number of spatially separated three-dimensional images, as desired for a particular application (e.g., according to a number and spacing of viewers in the viewing space, etc.).

For instance, FIG. 35 shows a flowchart 3500 for generating multiple three-dimensional images using multiple light manipulator layers, according to an exemplary embodiment. Flowchart 3500 is described with respect to FIG. 36, which shows a cross-sectional view of a display system 3600 that includes multiple light manipulator layers, according to an exemplary embodiment. As shown in FIG. 36, system 3600 includes a display driver circuit 3602, an image generator 2212, a first light manipulator 3614a, and a second light manipulator 3614b. As shown in FIG. 36, image generator 2212 includes pixel array 2208, first light manipulator 3614a includes first light manipulator elements 3616a, and second light manipulator 3614b includes second light manipulator elements 3616b. Furthermore, as shown in FIG. 36, display driver circuit 3602 includes a pixel array driver circuit 3604 and a light manipulator driver circuit 3606. Flowchart 3500 and system 3600 are described as follows.

Flowchart 3500 begins with step 3502. In step 3502, light is received from an array of pixels that includes a plurality of pairs of sets of pixels. For example, as shown in FIG. 36, light 2252 is received at first light manipulator 3614a from pixel array 208 of image generator 2212. Pixel array driver circuit 3604 may generate driver signals based on content signal 2224 received by display driver circuit 3602, and the driver signals may be received by pixel array 2214 to generate light 2252. Each pixel of pixel array 2208 may generate light that is received at first light manipulator 3614a. In an embodiment, pixel array driver circuit 3604 may generate drive signal 2214 to cause pixel array 2208 to emit light 2252 containing a plurality of images corresponding to the sets of pixels.

In step 3504, the light from the array of pixels is manipulated with a first light manipulator. For example, first light manipulator 3614a may be configured to manipulate light 2252 received from pixel array 2208. As shown in FIG. 36, first light manipulator 3614a includes light manipulator elements 3616a configured to perform manipulating (e.g., filtering, diverting, etc.) of light 2252 to generate manipulated light 2272. Light manipulator elements 3616a may optionally be configurable to adjust the manipulating performed by first light manipulator 3614a. First light manipulator 3614a may perform filtering in a similar manner as a parallax barrier described above or in other manner. In another embodiment, first light manipulator 3614a may include a lenticular lens that diverts light 2252 to perform light manipulating, generating manipulated light 2272. In an embodiment, light manipulator driver circuit 3606 may generate drive signal 2216a based on control signal 2222 received by display driver 3602 to cause light manipulator elements 3616a to manipulate light 2252 as desired.

In step 3506, the light manipulated by the first light manipulator is manipulated with a second light manipulator to form a plurality of pairs of images corresponding to the plurality of pairs of sets of pixels in a viewing space. For example, as shown in FIG. 36, manipulated light 2272 is received by second light manipulator 3614b to generate manipulated light 3608 that includes a plurality of three-dimensional images 3610a-3610n formed in viewing space 2270. As shown in FIG. 36, second light manipulator 3614b includes light manipulator elements 3616b configured to perform manipulating of manipulated light 2272 to generate manipulated light 3608. Light manipulator elements 3616b may optionally be configurable to adjust the manipulating performed by second light manipulator 3614b. In an embodiment, light manipulator driver circuit 3606 may generate drive signal 2216b based on control signal 2222 to cause light manipulator elements 3616b to manipulate manipulated light 2252 to generate manipulated light 3608 including three-dimensional images 3610a-3610n as desired. In embodiments, second light manipulator 3614a may include a parallax barrier or a lenticular lens configured to manipulate manipulated light 2252 to generate manipulated light 3608.

As such, display system 3600 has a single viewing plane or surface (e.g., a plane or surface of pixel array 2208, first light manipulator 3614a, second light manipulator 3614b) that supports multiple viewers with media content in the form of three-dimensional images or views. The single viewing plane of display system 3600 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 3614a and 3614b each cause three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 36, the areas may be the same area—an area of a display screen or surface of display system 3600. As such, multiple three-dimensional views that are each viewable by a corresponding viewer may be delivered by a single display viewing plane.

Display system 3600 may be configured in various ways to generate multiple three-dimensional images according to flowchart 3500, in embodiments. Furthermore, as described below, embodiments of display system 3600 may be configured to generate two-dimensional views, as well as any combination of one or more two-dimensional views simultaneously with one or more three-dimensional views.

For instance, in an embodiment, delivery of three-dimensional images may be performed in system 3600 using multiple parallax barriers. FIG. 37 shows a cross-sectional view of a display system 3700, according to an exemplary embodiment. Display system 3700 is an example of system 3600 shown in FIG. 36. As shown in FIG. 37, system 3700 includes a pixel array 3702, a first barrier element array 3704, and a second barrier element array 3706. System 3700 may also include display driver circuit 3602 of FIG. 36, which is not shown in FIG. 37 for ease of illustration. System 3700 is described as follows.

As shown in the example of FIG. 37, pixel array 3702 includes a first set of pixels 3714a-3714c, a second set of pixels 3716a-3716c, a third set of pixels 3718a-3718c, and a fourth set of pixels 3720a-3720c. Pixels of the four sets of pixels are alternated in pixel array 3702 in the order of pixel 3714a, pixel 3716a, pixel 3718a, pixel 3720a, pixel 3714b, pixel 3716b, etc. Further pixels may be included in each set of pixels in pixel array 3702 that are not visible in FIG. 37, including hundreds, thousands, or millions of pixels in each set of pixels.

Each of pixels 3714a-3714c, 3716a-3716c, 3718a-3718c, and 3720a-3720c is configured to generate light, which emanates from the surface of pixel array 3702 towards first barrier element array 3704. Each set of pixels is configured to generate a corresponding image. For example, FIG. 38 shows display system 3700, where pixels of pixel array 3702 emit light. Light from second set of pixels 3716a-3716c and first set of pixels 3714a-3714c is configured to generate third and fourth images 3806c and 3806d, respectively, which may be perceived together as a second three-dimensional image by a second viewer 3004b. Light from fourth set of pixels 3720a-3720c and third set of pixels 3718a-3718c is configured to generate first and second images 3806a and 3806b, respectively, which may be perceived together as a first three-dimensional image by a first viewer 3004a. The light emitted by the sets of pixels is filtered by first and second barrier element arrays 3704 and 3706 to generate the first and second three-dimensional images in respective desired regions of a user space 3802 adjacent to display system 3700.

First-fourth images 3806a-3806d may be formed in viewing space 3802 at a distance from pixel array 3702 and at a lateral location of viewing space 3802 as determined by a configuration of display system 3700 of FIG. 37, including a width and spacing of non-blocking slits in first barrier element array 3704, by a width and positioning of non-blocking slits in second barrier element array 3706, by a spacing between pixel array 3702 and first barrier element array 3704, and a spacing between first and second barrier element arrays 3704 and 3706.

In an embodiment, system 3600 of FIG. 36 may be configured similarly to display system 2300 of FIG. 23 to deliver three-dimensional images and/or two-dimensional images. For instance, in embodiments, system 3600 may include backlighting 2316 and pixel array 2322 separated by one or both of first and second light manipulators 3614a and 3614b. For example, FIG. 39 shows a block diagram of a display system 3900, which is an example of display devices 2000 and 2100 shown in FIGS. 20 and 21, according to an embodiment. Display system 3900 is configured to display multiple three-dimensional images in a viewing space in a spatially separated manner. As shown in FIG. 39, system 3900 includes display driver circuit 3602, backlighting 2316, first light manipulator 3614a, second light manipulator 3614b, and pixel array 2322. As shown in FIG. 39, backlighting 2316 optionally includes light element array 2336, first light manipulator 3614a includes first light manipulator elements 3616a, and second light manipulator 3614b includes second light manipulator elements 3616b. Furthermore, as shown in FIG. 39, display driver circuit 3602 receives control signal 2222 and content signal 2224 and includes light source driver circuit 2330, light manipulator driver circuit 3606, and pixel array driver circuit 2328. Light source driver circuit 2330, light manipulator driver circuit 3606, and pixel array driver circuit 2328 may generate drives signals to perform their respective functions based on control signal 2222 and/or content signal 2224. As shown in FIG. 39, first and second light manipulators 3614a and 3614b are positioned between backlighting 2316 and pixel array 2322. In another embodiment, pixel array 2322 may instead be located between first and second light manipulators 3614a and 3614b.

As shown in FIGS. 22 and 23, display driver circuit 2202 receives content signal 2224, and as shown in FIGS. 36 and 39, display driver circuit 3602 receives content signal 2224. Content signal 2224 is an example of content signals 2008 and 2108 of FIGS. 20 and 21. Content signal 2224 includes two-dimensional and/or three-dimensional content for display by the respective display devices/systems. For instance, display driver circuits 2202 and 3602 generate respective drive signals (e.g., pixel array drive signals) based on content signal 2224 to enable the content carried by content signal 2224 to be displayed.

F. Example Display Environments

As described above, light manipulators may be reconfigured to change the locations of delivered views based on changing viewer positions. As such, a position of a viewer may be determined/tracked so that a parallax barrier and/or light manipulator may be reconfigured to deliver views consistent with the changing position of the viewer. For instance, with regard to a parallax barrier, a spacing, number, arrangement, and/or other characteristic of slits may be adapted according to the changing viewer position. With regard to a lenticular lens, a size of the lenticular lens may be adapted (e.g., stretched, compressed) according to the changing viewer position. In embodiments, a position of a viewer may be determined/tracked by determining a position of the viewer directly, or by determining a position of a device associated with the viewer (e.g., a device worn by the viewer, held by the viewer, sitting in the viewer's lap, in the viewer's pocket, sitting next the viewer, etc.).

Examples of display environments for display embodiments described herein include environments having a single viewer, as well as environments having multiple viewers. For example, in one type of environment (e.g., an office, living room, etc.), a single viewer interacts with an electronic device, mobile or stationary, to view and/or interact with mixed 2D and 3D content, such as a mobile or desktop computer, smart phone, television, or other mobile or stationary device. It is noted that this type of environment may include more than one viewer. In another type of environment (e.g., a living room, a home theatre room, etc.), multiple viewers are enabled to interact with an electronic device, such as a television set (e.g., high-def, small screen, large screen, etc.), to view and/or interact with mixed 2D and 3D content in the form of television content, movies, video games, etc.

For instance, FIG. 40 shows a block diagram of a display environment 4000, according to an exemplary embodiment.

In the example of FIG. 40, first and second viewers 4006a and 4006b are present in display environment 4000, and are enabled to interact with a display device 4002 to be delivered two-dimensional and/or three-dimensional media content. Although two viewers 4006 are shown present in FIG. 40, in other embodiments, other numbers of viewers 4006 may be present in display environment 4000 that may interact with display device 4002 and may be delivered media content by display device 4002. As shown in FIG. 40, display environment 4000 includes display device 4002, a first remote control 4004a, a second remote control 4004b, a first headset 4012a, a second headset 4012b, and viewers 4006a and 4006b. Display device 4002 is an example of the display devices described above, and may be configured similarly to any display device described herein, including display device 606. Viewer 4006a is delivered a view 4008a by display device 4002, and viewer 4006b is delivered a view 4008b by display device 4002. Views 4008a and 4008b may each be a two-dimensional view or a three dimensional view. Furthermore, in embodiments, view 4008a may be delivered to viewer 4006a, but not be visible by viewer 4006b, and view 4008b may be delivered to viewer 4006b, but not be visible by viewer 4006a.

Remote control 4004a is a device that viewer 4006a may use to interact with display device 4002, and remote control 4004b is a device that viewer 4006b may use to interact with display device 4002. For example, as shown in FIG. 40, viewer 4006a may interact with a user interface of remote control 4004a to generate a display control signal 4014a, and viewer 4006b may interact with a user interface of remote control 4004b to generate a display control signal 4014b. Display control signals 4014a and 4014b may be transmitted to display device 4002 using wireless or wired communication links. Display control signals 4014a and 4014b may be configured to select particular content desired to be viewed by viewers 4006a and 4006b, respectively. For example, display control signals 4014a and 4014b may select particular media content to be viewed (e.g., television channels, video games, DVD (digital video discs) content, video tape content, web content, etc.). Display control signals 4014a and 4014b may select whether such media content is desired to be viewed in two-dimensional or three-dimensional form by viewers 4006a and 4006b, respectively. Remote controls 4004a and 4004b may be television remote control devices, game controllers, smart phones, or other remote control type device.

Headsets 4012a and 4012b are worn by viewers 4006a and 4006b, respectively. Headsets 4012a and 4012b each include one or two speakers (e.g., earphones) that enable viewers 4006a and 4006b to hear audio associated with the media content of views 4008a and 4008b. Headsets 4012a and 4012b enable viewers 4006a and 4006b to hear audio of their respective media content without hearing audio associated the media content of the other of viewers 4006a and 4006b. Headsets 4012a and 4012b may each optionally include a microphone to enable viewers 4006a and 4006b to interact with display device 4002 using voice commands.

Display device 4002a, headset 4012a, and/or remote control 4004a may operate to provide position information 4010a regarding viewers 4006a to display device 4002, and display device 4002b, headset 4012b, and/or remote control 4004b may operate to provide position information 4010b regarding viewers 4006b to display device 4002. Display device 4002 may use position information 4010a and 4010b to reconfigure one or more light manipulators (e.g., parallax barriers and/or lenticular lenses) of display device 4002 to enable views 4008a and 4008b to be delivered to viewers 4006a and 4006b, respectively, at various locations. For example, display device 4002a, headset 4012a, and/or remote control 4004a may use positioning techniques to track the position of viewer 4006a, and display device 4002b, headset 4012b, and/or remote control 4004b may use positioning techniques to track the position of viewer 4006b.

G. Example Electronic Device Implementations

Embodiments may be implemented in hardware, software, firmware, or any combination thereof. For example, application(s) 104, operating system 106, operating system 400, user input interface 402, API 404, kernel 406, display driver interface 410, display driver(s) 408, application 604, display driver 618, first translator 1302, second translator 1304, boot loader 1810, operating system 1812, GUI generator 1902, and/or boot up module 1904 may be implemented as computer program code configured to be executed in one or more processors.

For instance, FIG. 41 shows a block diagram of an example implementation of electronic device 4100, according to an embodiment. In embodiments, electronic device 4100 may include one or more of the elements shown in FIG. 41. As shown in the example of FIG. 41, electronic device 4100 may include one or more processors (also called central processing units, or CPUs), such as a processor 4104. Processor 4104 is connected to a communication infrastructure 4102, such as a communication bus. In some embodiments, processor 4104 can simultaneously operate multiple computing threads.

Electronic device 4100 also includes a primary or main memory 4106, such as random access memory (RAM). Main memory 4106 has stored therein control logic 4128A (computer software), and data.

Electronic device 4100 also includes one or more secondary storage devices 4110. Secondary storage devices 4110 include, for example, a hard disk drive 4112 and/or a removable storage device or drive 4114, as well as other types of storage devices, such as memory cards and memory sticks. For instance, electronic device 4100 may include an industry standard interface, such a universal serial bus (USB) interface for interfacing with devices such as a memory stick. Removable storage drive 4114 represents a floppy disk drive, a magnetic tape drive, a compact disk drive, an optical storage device, tape backup, etc.

As shown in FIG. 41, secondary storage devices 4110 may include an operating system 4132. Embodiments for operating system 4132 are described in detail above.

Removable storage drive 4114 interacts with a removable storage unit 4116. Removable storage unit 4116 includes a computer useable or readable storage medium 4124 having stored therein computer software 4128B (control logic) and/or data. Removable storage unit 4116 represents a floppy disk, magnetic tape, compact disk, DVD, optical storage disk, or any other computer data storage device. Removable storage drive 4114 reads from and/or writes to removable storage unit 4116 in a well known manner.

Electronic device 4100 further includes a communication or network interface 4118. Communication interface 4118 enables the electronic device 4100 to communicate with remote devices. For example, communication interface 4118 allows electronic device 4100 to communicate over communication networks or mediums 4142 (representing a form of a computer useable or readable medium), such as LANs, WANs, the Internet, etc. Network interface 4118 may interface with remote sites or networks via wired or wireless connections.

Control logic 4128C may be transmitted to and from electronic device 4100 via the communication medium 4142.

Any apparatus or manufacture comprising a computer useable or readable medium having control logic (software) stored therein is referred to herein as a computer program product or program storage device. This includes, but is not limited to, electronic device 4100, main memory 4106, secondary storage devices 4110, and removable storage unit 4116. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for application(s) 104, operating system 106, operating system 400, user input interface 402, API 404, kernel 406, display driver interface 410, display driver(s) 408, application 604, display driver 618, first translator 1304, second translator 1304, boot loader 1810, operating system 1812, GUI generator 1902, boot up module 1904, flowchart 500, flowchart 800, flowchart 1400, flowchart 1600, (including any one or more steps of flowcharts 500, 800, 1400, and 1600), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

As described herein, electronic device 4100 may be implemented in association with a variety of types of display devices. For instance, electronic device 4100 may be one of a variety of types of media devices, such as a stand-alone display (e.g., a television display such as flat panel display, etc.), a computer, a game console, a set top box, a digital video recorder (DVR), other electronic device mentioned elsewhere herein, etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/or a fiber network, etc. For instance, FIG. 41 shows a first media content 4130A that is stored in hard disk drive 4112, a second media content 4130B that is stored in storage medium 4124 of removable storage unit 4116, and a third media content 4130C that may be remotely stored and received over communication medium 4122 by communication interface 4118. Media content 4130 may be stored and/or received in these manners and/or in other ways.

FIG. 42 shows a block diagram of a display system 4200 that supports mixed 2D, stereoscopic 3D and multi-view 3D displays according to an exemplary embodiment. As shown in FIG. 42, display system 4200 includes media input interfaces 4202, host processing circuitry 4204, user input devices 4206, display processing circuitry 4208, adaptable display driver circuitry 4210, adaptable 2D, 3Dx and mixed display 4212, and first-third interface circuitry 4214-4218. Host processing circuitry 4204 includes an operating system 4220 and application programs 4222. Operating system 4220 includes user input interfaces 4220, 2D, 3Dx and mixed display driver interface 4226, shell operations 4228, 2D, 3Dx, mixed 2D and 3Dx, and mixed 3Dx and 3Dy translation services 4230, and API supporting regional 2D/3Dx 4232. 2D, 3Dx and mixed display driver interface 4226 includes 2D only driver variant 4234, 3Dx only driver variant 4236, and mixed 2D and 3Dx driver variant 4238. Display processing circuitry 4208 includes 2D, 3Dx, mixed 2D and 3Dx, and mixed 3Dx and 3Dy translation services 4240.

Media input interfaces 4202 includes one or more media input interfaces, wired or wireless, for received media, such as those described elsewhere herein. For instance, media input interface 4202 may include an interface for receiving media content from a local media player device, such as a DVD player, a memory stick, a computer media player, etc., and may include commercially available (e.g., USB, HDMI, etc.) or proprietary interfaces for receiving local media content. Media input interface 4202 may include an interface for receiving media content from a remote source, such as the Internet, satellite, cable, etc.), and may include commercially available (e.g., WLAN, Data Over Cable Service Interface Specification (DOCSIS), etc.) or proprietary interfaces for receiving remote media content.

Host processing circuitry 4204 may include one or more integrated circuit chips and/or additional circuitry, which may be configured to execute software/firmware, including operating system 4220 and application programs 4222. Operating system 4220 is an example of OS 400 described herein. User input interfaces 4220 is an example of user input interfaces 420 of FIG. 4B. 2D, 3Dx and mixed display driver interface 4226 is an example of 2D, 3Dx and mixed display driver interface 422 of FIG. 4B. Shell operations 4228 is an example of shell operations 424 of FIG. 4B. 2D, 3Dx, mixed 2D and 3Dx, and mixed 3Dx and 3Dy translation services 4230 is an example of 2D, 3Dx, mixed 2D and 3Dx, and mixed 3Dx and 3Dy translation services 426 of FIG. 4B. API supporting regional 2D/3Dx 4232 is an example of API supporting regional 2D/3Dx 428 of FIG. 2B. 2D only driver variant 4234 is an example of 2D only driver variant 434, 3Dx only driver variant 4236 is an example of 3Dx only driver variant 436, and mixed 2D and 3Dx driver variant 4238 is an example of mixed 2D and 3Dx driver variant 438 of FIG. 4B.

User input devices 4206 includes one or more user input devices that a user may use to interact with display system 4200. Examples of user input devices are described elsewhere herein, such as a keyboard, a mouse/pointer, etc.

Display processing circuitry 4208 may be included in host processing circuitry 4204, or may be separate from host processing circuitry 4204 as shown in FIG. 42. For instance, display processing circuitry 4208 may include one or more processors (e.g., graphics processors), further circuitry and/or other hardware, software, firmware, or any combination thereof. Display processing circuitry 4208 may be present to perform graphics processing tasks. For instance, as shown in FIG. 42, display processing circuitry 4208 may optionally include 2D, 3Dx, mixed 2D and 3Dx, and mixed 3Dx and 3Dy translation services 4240 to perform 2D/3D related translation services in addition or alternatively to translation services 4230.

Adaptable display driver circuitry 4210 includes one or more display driver circuits for an adaptable display. Examples of adaptable display driver circuitry 4210 are described above, such as with regard to FIGS. 4B, 22, 23, 36, and 39.

Adaptable 2D, 3Dx and mixed display 4212 includes a display that is adaptable, and is capable of displaying 2D content, 3D content, and a mixture of 2D and/or 3D content. Examples of adaptable 2D, 3Dx and mixed display 4212 are described elsewhere herein.

First-third interface circuitry 4214-4218 is optional. For instance, as shown in FIG. 42, a communication infrastructure (e.g., a signal bus) 4234 may be present to couple signals of media input interfaces 4202, host processing circuitry 4204, user input devices 4206, display processing circuitry 4208, adaptable display driver circuitry 4210, and display 4212. In an embodiment, if display processing circuitry 4208, adaptable display driver circuitry 4210, and/or display 4212 are contained in a common housing/structure with host processing circuitry 4204 (e.g., in a handheld device, etc.) interface circuitry 4214-4218 may not be needed to be present. If display processing circuitry 4208, adaptable display driver circuitry 4210, and/or display 4212 are in a separate housing/ structure from host processing circuitry 4204, corresponding interface circuitry 4214-4218 may be present to provide an interface. For instance, host processing circuitry 4204 may be in a game console, a desktop computer tower, a home audio receiver, a set top box, etc., and display processing circuitry 4208, adaptable display driver circuitry 4210, and/or display 4212 may be included in a display device structure. In such case, interface circuitry 4214-4218 may not be present. When present, first-third circuitry 4214-4218 may each include circuitry, such as receivers and/or transmitters (wired or wireless), for enabling communications between the respective one of display processing circuitry 4208, adaptable display driver circuitry 4210, and display 4212, and the other components of system 4200 (e.g., host processing circuitry 4204, etc.).

Note that the embodiment of display system 4200 shown in FIG. 42 is provided for purposes of illustration, and is not intended to be limiting. In further embodiments, display system 4200 may include fewer, additional, and/or alternative features than shown in FIG. 42.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by one or more processors and used in an operating system to support simultaneous display on a screen of both two-dimensional content and three-dimensional content, the method comprising:
   receiving, by the operating system, from a first application a first command directing display of the two-dimensional content within a first region of the screen;
   responding, by the operating system, to the first command by sending a first control signal that places the screen in a two-dimensional mode within the first region;
   receiving, by the operating system, from a second application a second command directing display of the three-dimensional content within a second region of the screen;
   responding, by the operating system, to the second command by sending a second control signal that places the screen in a three-dimensional mode within the second region, wherein the first region of the screen is configured to display the two-dimensional content and the second region of the screen is configured to display the three-dimensional content simultaneously with the two-dimensional content;
   receiving an input signal from a user input interface;
   generating a third control signal in response to the input signal, the third control signal relating to a configurable depth of the three-dimensional content; and
   delivering the third control signal to cause the adjustment of the configurable depth of the three-dimensional content being displayed within the second region of the screen.

2. The method of claim 1, further comprising receiving user input directing movement of the three-dimensional content from the second region of the screen to a third region of the screen, and sending a third control signal directing the movement via corresponding modifications to the screen.

3. The method of claim 1, further comprising delivering three-dimensional content to a pixel array of the screen that corresponds with the second region of the screen in which an adaptable light manipulator of the screen is operating in the three-dimensional mode.

4. The method of claim 1, wherein the first command and second command are part of an application program interface.

5. The method of claim 1, further comprising:
   receiving an indication from the screen of whether the second control signal was successful;
   generating a response to the second command based on the indication; and
   providing the response to the second application.

6. The method of claim 5, wherein said providing comprises:
   providing a window handle in the response to the second application, the window handle being a handle for a window opened in the second region to display the three-dimensional content.

7. The method of claim 1, wherein the second command includes one or more parameters, wherein said receiving comprises:
   generating the second control signal to configure the screen based on the one or more parameters.

8. The method of claim 7, wherein the second command is configured to cause a window that displays the three-dimensional content to be opened in the second region.

9. The method of claim 7, wherein said generating comprises:
  filtering out a parameter of the one or more parameters that is incompatible with the screen.

10. The method of claim 1, further comprising:
  receiving a request from the second application for an indication of at least one characteristic of the screen; and
  providing the requested indication of the at least one characteristic to the second application.

11. An operating system that supports a plurality of software applications that are at least partially executed by one or more processors and at least one of a plurality of screens, a first of the plurality of screens supporting at least three-dimensional display on a first screen region of the first of the plurality of screens and at least two-dimensional display on a second screen region of the first of the plurality of screens simultaneously, and a second of the plurality of screens supporting at least two-dimensional display, the operating system comprising:
  an application programming interface through which a first of the plurality of software applications can deliver at least one first request to the operating system that defines the first screen region and a three-dimension indicator that causes the displaying of three-dimensional content in the first screen region, at least one second request to the operating system that defines the second screen region of the first of the plurality of screens and a two-dimension indicator that causes the displaying of two-dimensional content in the second screen region, the three-dimensional content in the first screen region and the two-dimensional content in the second screen region being caused to be displayed simultaneously, and at least one third request to the operating system configured to cause the displaying of three-dimensional content in the second of the plurality of screens;
  a display driver interface through which at least one configuration command corresponding to at least one of the at least one first request, the at least one second request, and the at least one third request are passed;
  a first display driver, associated with the first screen of the plurality of screens, that receives the at least one configuration command and responds by generating one or more screen control signals to adjust the first screen to support the first screen region of the first of the plurality of screens; and
  a second display driver, associated with the second of the plurality of screens, that receives and responds to the at least one configuration command by translating incoming three-dimensional data to two-dimensional data for display on the second screen of the plurality of screens.

12. The operating system of claim 11, wherein the at least one configuration command causes the display driver to manipulate incoming pixel data before delivery to the plurality of screens.

13. The operating system of claim 11, wherein the display driver is configured to receive an indication from the first screen of whether a screen control signal was successful, to generate a response to the at least one request that includes the indication, and to transmit the response to the first application via the application programming interface.

14. The operating system of claim 11, wherein a first request of the at least one request defines the first screen region, and includes the three-dimension indicator and one or more parameters.

15. The operating system of claim 14, wherein the display driver interface is configured to filter out a parameter of the one or more parameters that is incompatible with the first screen.

16. The operating system of claim 14, wherein the first request is an open window command, and the one or more parameters includes at least one of a window size parameter, a window position parameter, a display resolution parameter, a window type parameter, a three-dimensional display type parameter, or a three-dimensional content source indication parameter.

17. The operating system of claim 11, further comprising:
  a user input interface configured to receive a user input directed to three-dimensional content displayed in the first screen region, to generate a second configuration command based on the user input, the second configuration command being configured to adjust a three-dimensional characteristic of three-dimensional content displayed by the first screen region, the display driver interface being configured to pass the second configuration to the first display driver, the first display driver receiving the generated configuration command and generating a screen control signal to adjust the three-dimensional characteristic of the three-dimensional content being displayed within the first screen region.

18. A non-transitory computer readable storage medium having computer program instructions embodied in said computer readable storage medium for enabling a processor to execute an operating system to support simultaneous display on a screen of both two-dimensional content and three-dimensional content, the computer program instructions including instructions executable to perform operations comprising:
  receiving, by the operating system, from a first application a first command directing display of the two-dimensional content within a first region of the screen;
  responding, by the operating system, to the first command by sending a first control signal that places the screen in a two-dimensional mode within the first region;
  receiving, by the operating system, from a second application a second command directing display of the three-dimensional content within a second region of the screen;
  responding, by the operating system, to the second command by sending a second control signal that places the screen in a three-dimensional mode within the second region, wherein the first region of the screen is configured to display the two-dimensional content and the second region of the screen is configured to display the three-dimensional content simultaneously with the two-dimensional content;
  receiving an input signal from a user input interface;
  generating a third control signal in response to the input signal, the third control signal relating to a configurable depth of the three-dimensional content; and
  delivering the third control signal to cause the adjustment of the configurable depth of the three-dimensional content being displayed within the second region of the screen.

19. The non-transitory computer readable storage medium of claim 18, the operations further comprising receiving user input directing movement of the three-dimensional content from the second region of the screen to a third region of the screen, and sending a third control signal directing the movement via corresponding modifications to the screen.

20. The non-transitory computer readable storage medium of claim 18, the operations further comprising delivering three-dimensional content to a pixel array of the screen that corresponds with the second region of the screen in which an adaptable light manipulator of the screen is operating in the three-dimensional mode.

* * * * *